US012284953B2

(12) United States Patent
Shanmuganathan

(10) Patent No.: US 12,284,953 B2
(45) Date of Patent: Apr. 29, 2025

(54) MODULAR HEXAGONAL ENCLOSURE AND COUPLING APPARATUS THEREFOR

(71) Applicant: The Dunya Project Inc., Toronto (CA)

(72) Inventor: Sugeevan Shanmuganathan, Toronto (CA)

(73) Assignee: The Dunya Project, Inc., Toronto (CA)

( * ) Notice: Subject to any disclaimer, the term of this patent is extended or adjusted under 35 U.S.C. 154(b) by 460 days.

(21) Appl. No.: 17/441,098

(22) PCT Filed: Mar. 21, 2020

(86) PCT No.: PCT/IB2020/052658
§ 371 (c)(1),
(2) Date: Sep. 20, 2021

(87) PCT Pub. No.: WO2020/194161
PCT Pub. Date: Oct. 1, 2020

(65) Prior Publication Data
US 2022/0167574 A1    Jun. 2, 2022

Related U.S. Application Data

(60) Provisional application No. 62/823,934, filed on Mar. 26, 2019.

(51) Int. Cl.
*A01G 31/02* (2006.01)
*E04B 1/343* (2006.01)
(Continued)

(52) U.S. Cl.
CPC .............. *A01G 31/02* (2013.01); *E04B 1/343* (2013.01); *E04H 1/1205* (2013.01); *E04B 2001/0092* (2013.01)

(58) Field of Classification Search
CPC . A01G 31/02; E04B 2001/0092; E04B 1/343; E04H 1/1205
See application file for complete search history.

(56) References Cited

U.S. PATENT DOCUMENTS

| 4,069,627 A | 1/1978 | Pegg |
| 4,275,534 A | 6/1981 | Porter |

(Continued)

FOREIGN PATENT DOCUMENTS

| DE | 3202171 C1 * | 7/1983 |
| DE | 3537306 A1 | 4/1987 |

(Continued)

OTHER PUBLICATIONS

Gagnon, Marie-Claude, "International Search Report", International Application No. PCT/IB2020/052658, mailed Jul. 2, 2020, 5 pages.

(Continued)

*Primary Examiner* — Adriana Figueroa
(74) *Attorney, Agent, or Firm* — Foley IP Law, PLLC

(57) ABSTRACT

What is disclosed is a modular hydroponic enclosure comprising a hexagonally shaped base; a set of pillars attached to the hexagonally shaped base and to a hexagonally shaped roof, wherein the set of pillars support the roof. A method for a modular hydroponic enclosure comprising providing a hexagonally shaped base; providing a set of pillars attached to the hexagonally shaped base; and providing a hexagonally shaped roof attached to the set of pillars, and wherein the set of pillars support the roof.

20 Claims, 42 Drawing Sheets

(51) Int. Cl.
*E04H 1/12* (2006.01)
*E04B 1/00* (2006.01)

(56) References Cited

U.S. PATENT DOCUMENTS

| | | | |
|---|---|---|---|
| 4,501,099 A | 2/1985 | Boaz | |
| 8,806,810 B2 * | 8/2014 | Barragan | E04B 1/3445 52/79.5 |
| 10,499,574 B2 * | 12/2019 | Lu | G08B 21/18 |
| 10,524,433 B2 * | 1/2020 | Spiro | A01G 22/00 |
| 10,555,466 B2 * | 2/2020 | Gonyer | H05B 45/20 |
| 10,631,469 B2 * | 4/2020 | Sahu | A01G 31/06 |
| 10,709,076 B2 * | 7/2020 | Pham | A01G 9/0297 |
| 10,750,689 B2 * | 8/2020 | Olesen | A01G 27/003 |
| 11,129,339 B2 * | 9/2021 | Spiro | A01G 9/20 |
| 11,304,390 B2 * | 4/2022 | Spiro | A01G 31/06 |
| 2016/0066516 A1 * | 3/2016 | Palmieri, Jr. | A01G 9/249 47/17 |
| 2018/0184602 A1 * | 7/2018 | Ofir | A01G 25/167 |

FOREIGN PATENT DOCUMENTS

| | | | | |
|---|---|---|---|---|
| FR | 2248380 A1 | | 5/1975 | |
| FR | 2667895 A1 | | 4/1992 | |
| GB | 2209548 A | * | 5/1989 | E04B 1/34315 |
| WO | 2011152741 A1 | | 12/2011 | |
| WO | WO-2012137137 A1 | * | 10/2012 | E04H 1/1205 |

OTHER PUBLICATIONS

Gagnon, Marie-Claude, "Written Opinion", International Application No. PCT/IB2020/052658, mailed Jul. 2, 2020, 9 pages.

\* cited by examiner

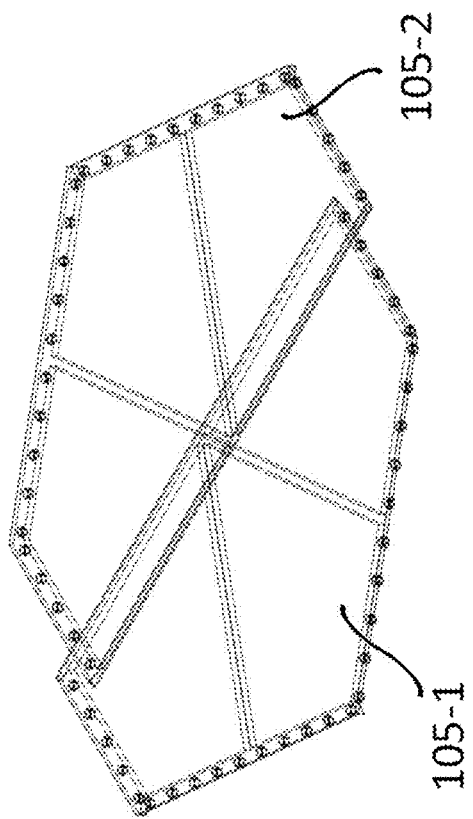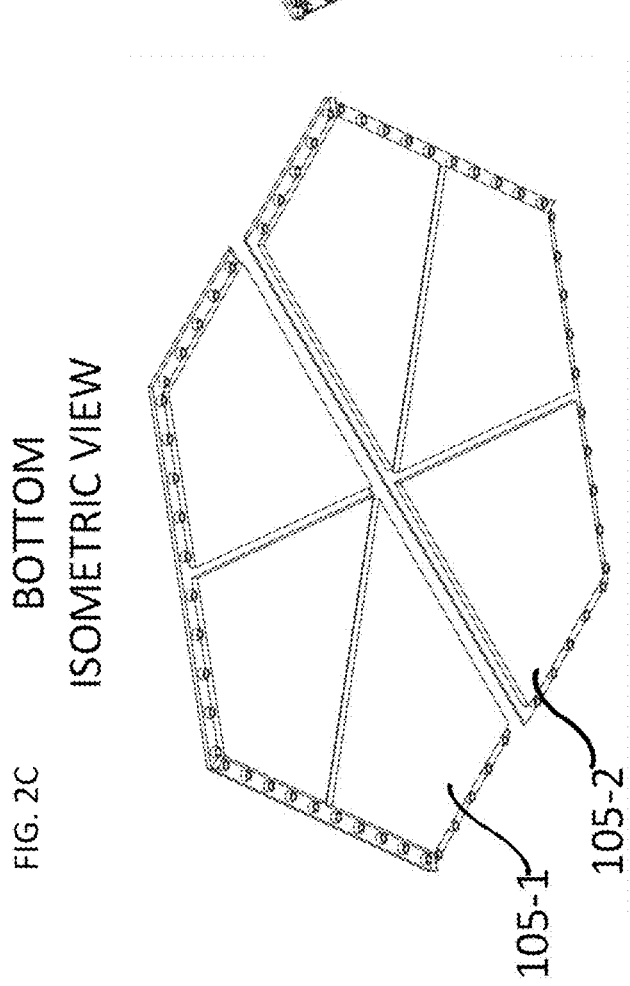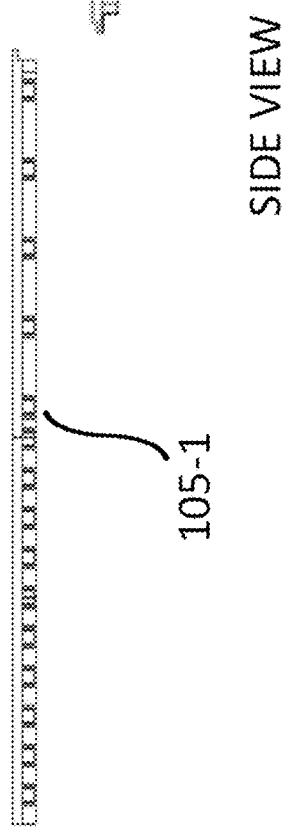
FIG. 2C

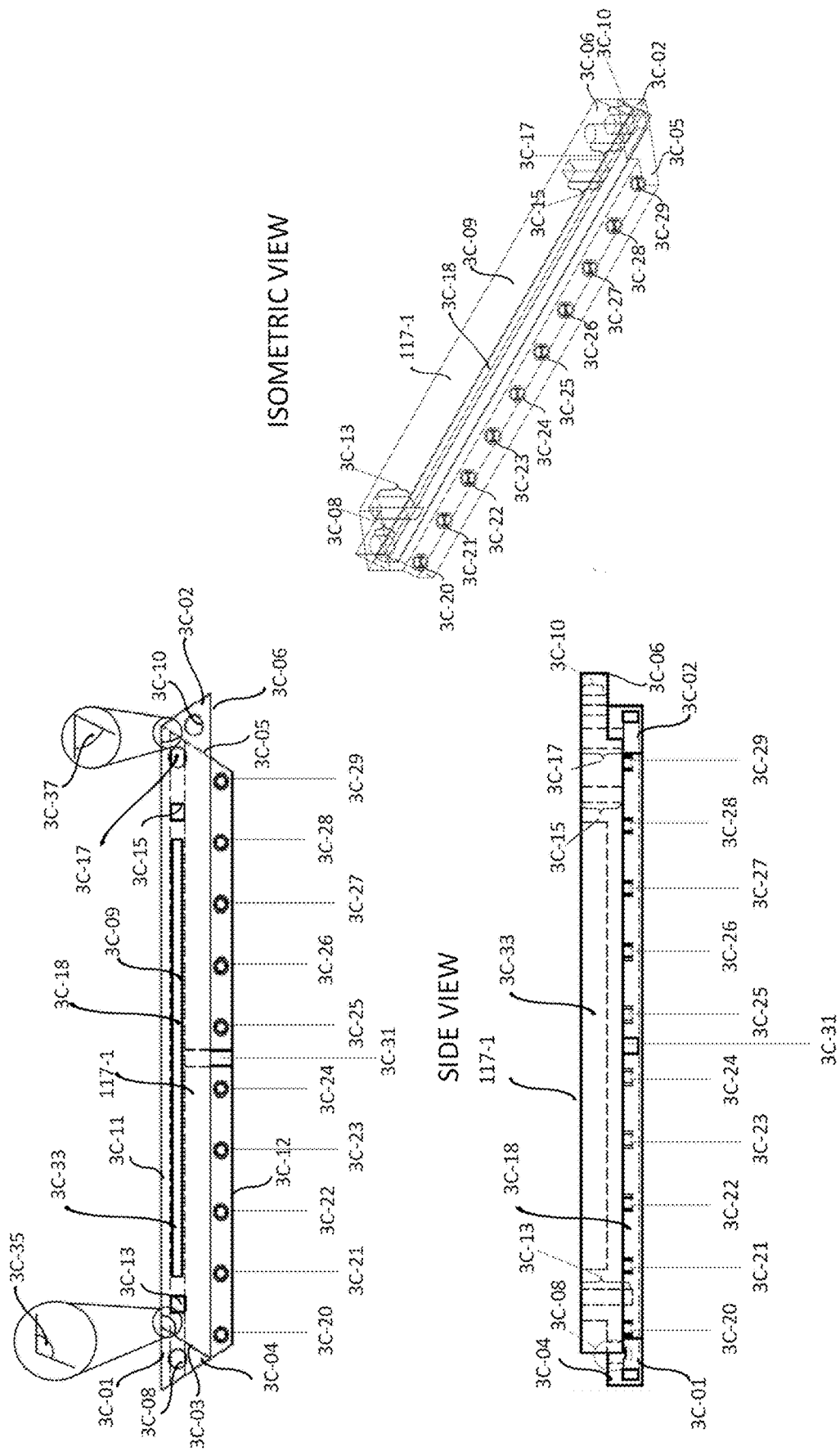

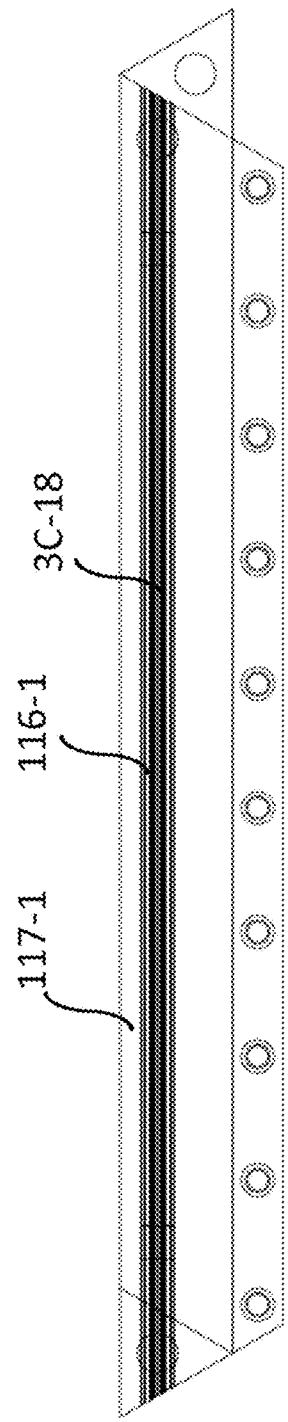
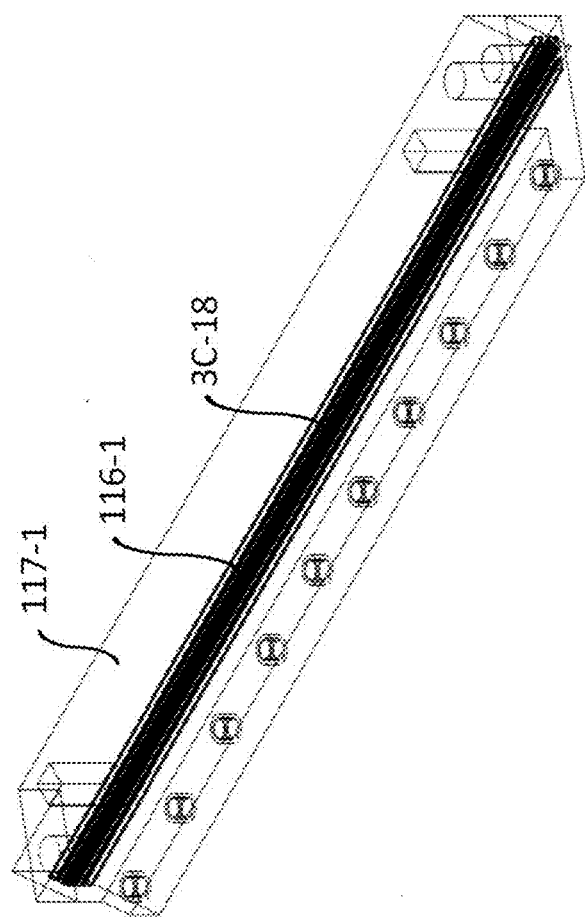
FIG. 3B

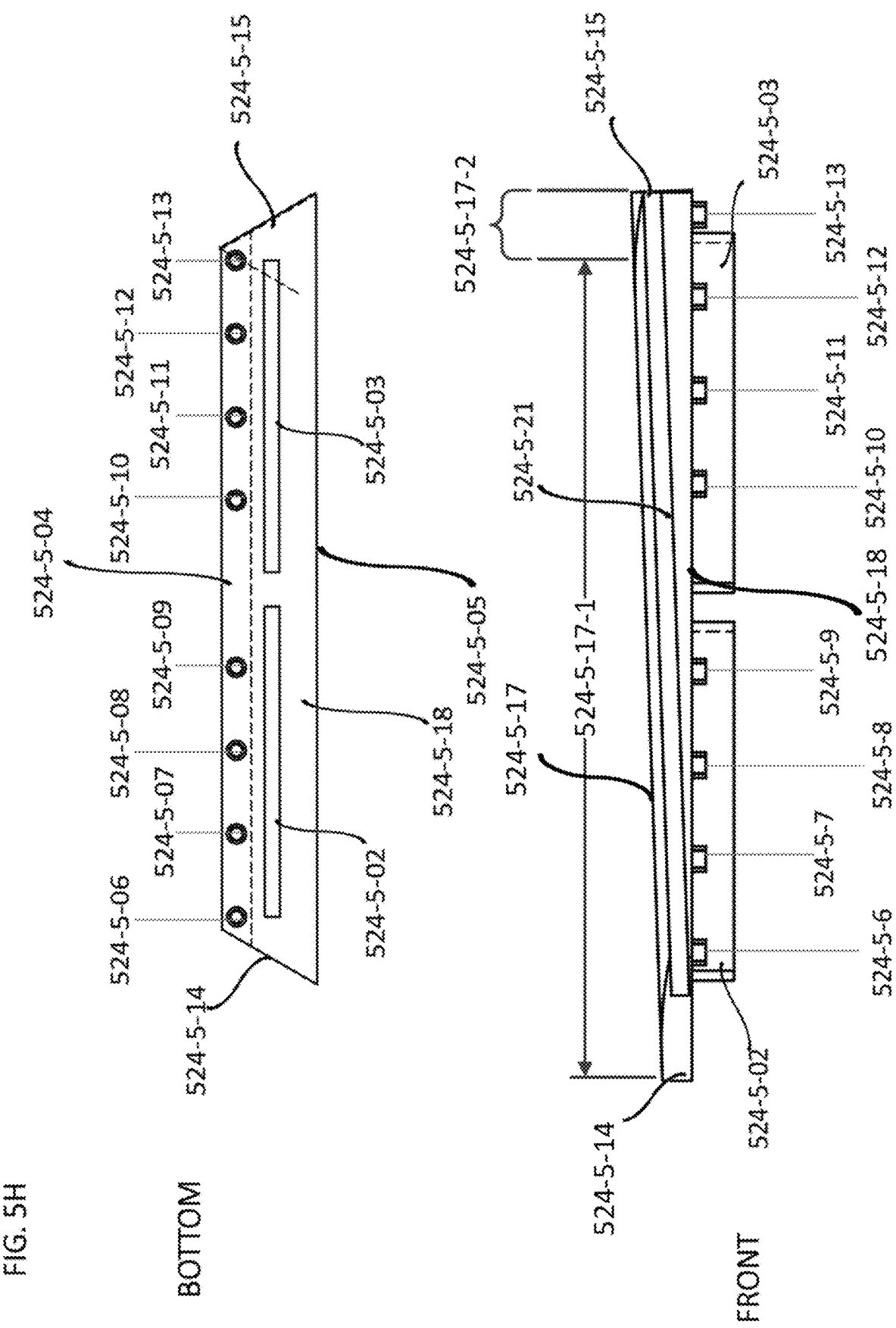

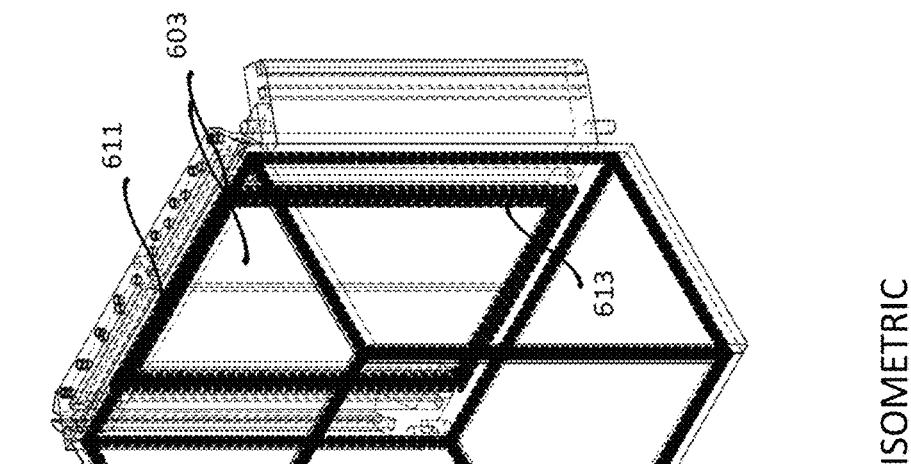
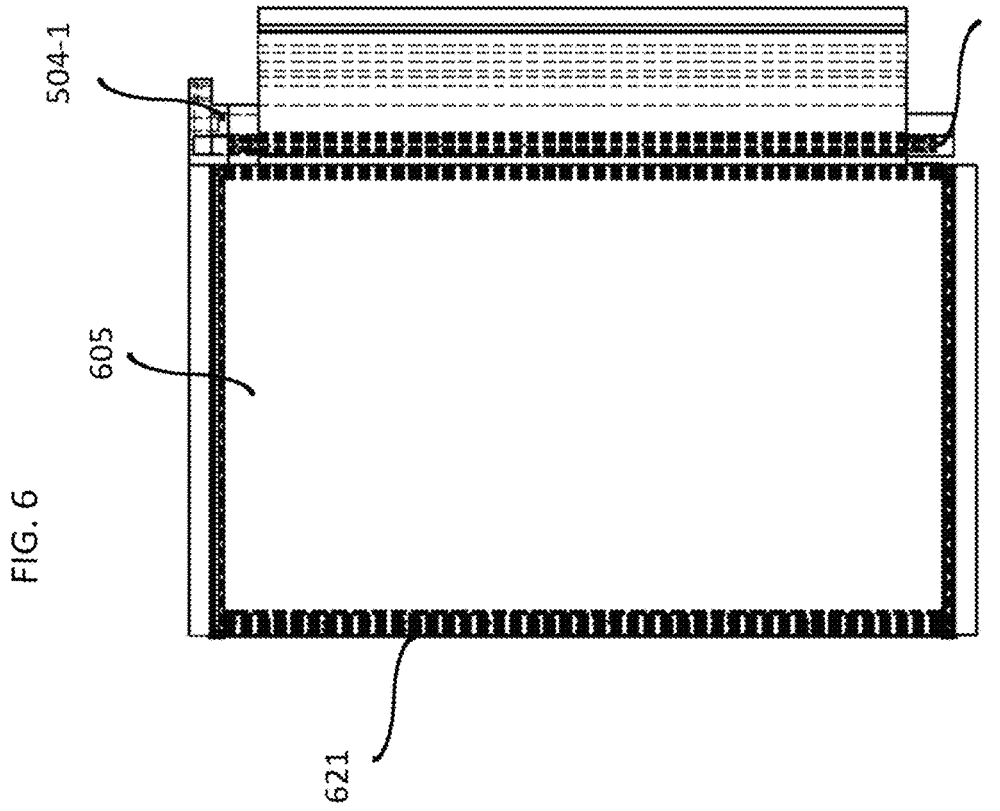
FIG. 6

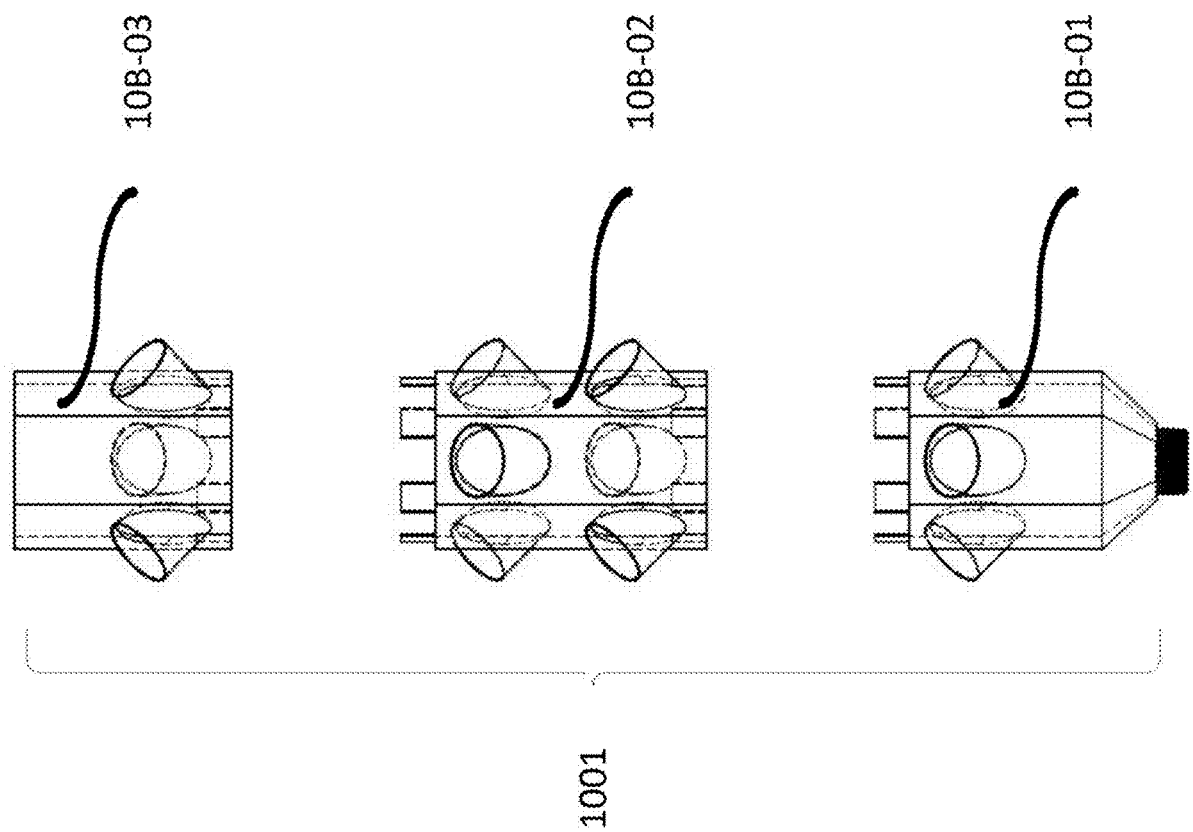

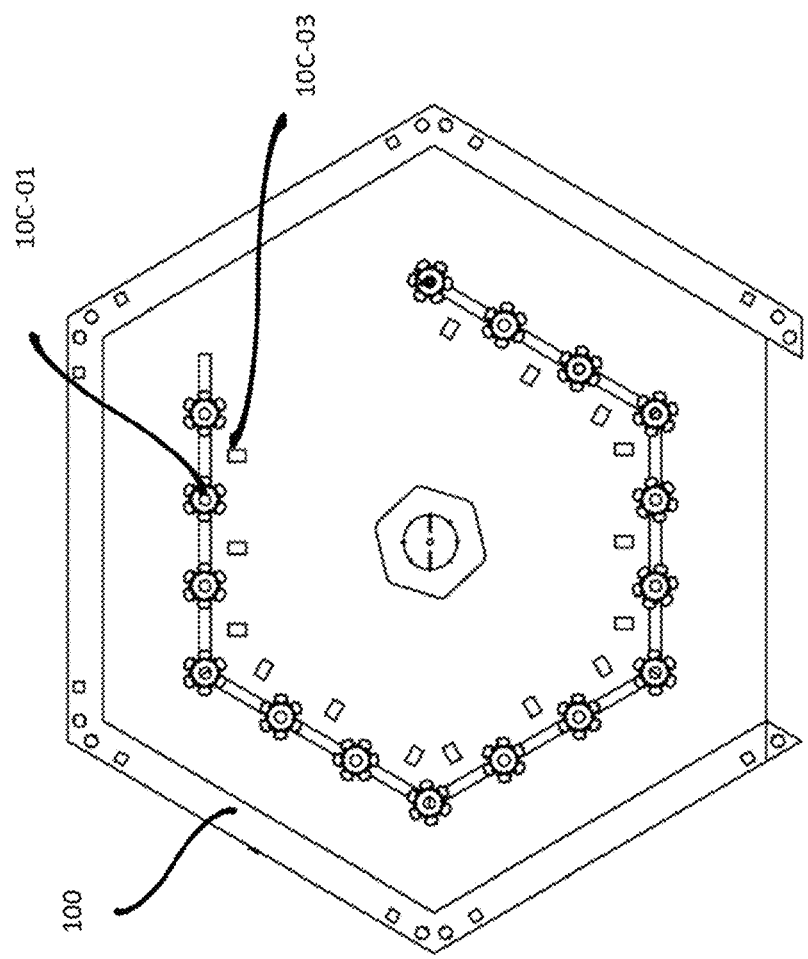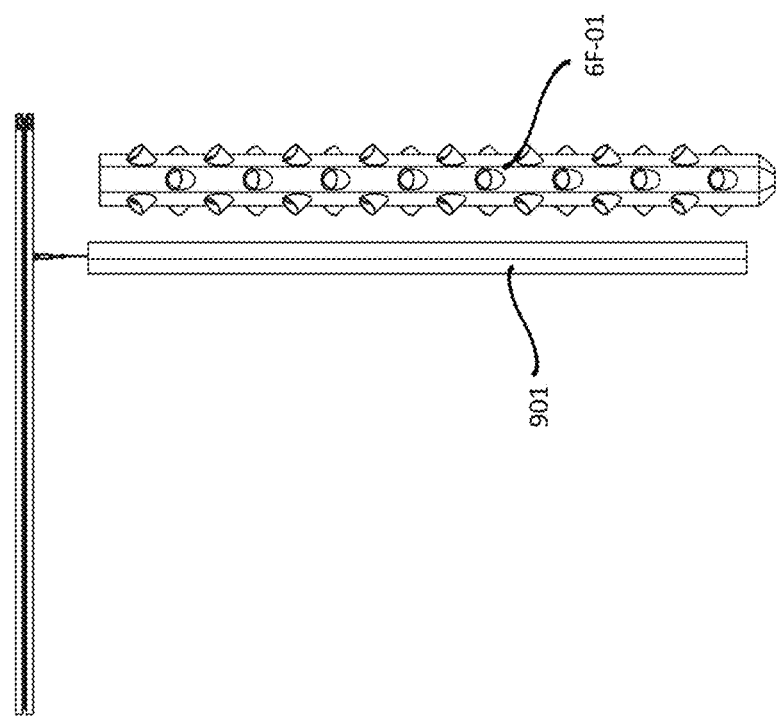
FIG. 10C

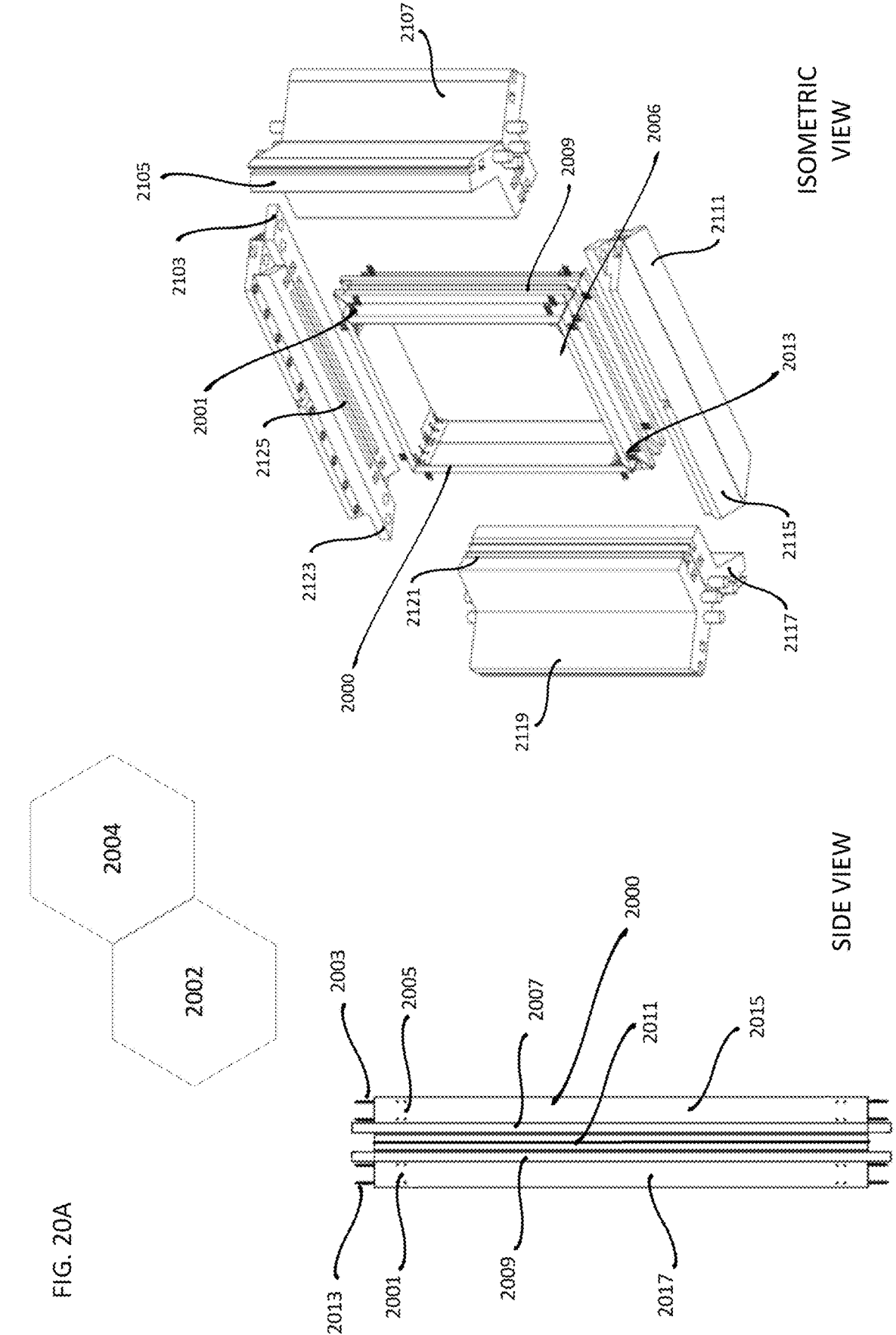

MODULAR HEXAGONAL ENCLOSURE AND COUPLING APPARATUS THEREFOR

FIELD OF THE INVENTION

This invention relates to hydroponic enclosures.

BACKGROUND

Enclosures for hydroponic crop growth have become increasingly important. Using hydroponic enclosures means that land which may have been unsuitable for agriculture due to, for example, infertility, can now be used to produce food crops.

Hydroponic enclosures can also be used to produce food crops in remote and inaccessible areas, so as to enable communities to be self-sustaining and reduce reliance on food which would have to be brought in from elsewhere.

Hydroponic enclosures have been detailed in other works of prior art. For example, U.S. Pat. No. 5,073,401 on "Automated hydroponic growing system", filed Jun. 15, 1989 to Mohr details an enclosure for hydroponic growing with temperature control, drainage, artificial lighting and reflector sections and growing areas. Similarly, U.S. Pat. No. 6,578,319 on "Hydroponic growing enclosure and method for the fabrication of animal feed grass from seed", filed Dec. 4, 2001 to Cole et al describes a self-contained hydroponic growing enclosure designed to produce grasses free from impurities with low maintenance and minimum operational manpower. Patent Cooperation Treaty (PCT) Application WO2010/102405 on "Modular hydroponic growing unit" filed 11 Mar. 2010 to Rochefort also describes a cylindrical hydroponic growing unit to grow plants and crops therein.

These prior art solutions described different types of enclosures, but did not consider how to optimize coverage of a fixed land area in terms of materials required using identical regular shaped enclosures. This is an important problem when setting up modular hydroponic enclosures in areas in remote or difficult to access locations, as reducing the amount of materials required means reduced transportation cost and/or reduced difficulties in transporting materials to such remote or difficult to access locations. Furthermore, using regular shaped modular enclosures leads to reduced cost of manufacture and assembly, further lowering the price to the end user. It may also mean easier operation.

As is known to those of skill in the art, a regular tessellation is where identical regular shapes, each having identical regular corners or vertices which have the same angle between adjacent edges, can be arranged to fill a plane without any gaps. There are only three shapes that can form such regular tessellations: the equilateral triangle, square, and regular hexagon.

It is known to those of skill in the art, that using regular hexagons to fill a fixed area minimizes the total perimeter. This principle is known as the honeycomb conjecture and was proven in Hales, Thomas C. "The honeycomb conjecture." Discrete & Computational Geometry 25, no. 1 (2001): 1-22.

Applying the honeycomb conjecture to hydroponic enclosures, it is clear that: Since using hexagonally shaped enclosures to cover an area minimizes the total perimeter, consequently the amount of materials needed to construct the enclosures to cover a fixed area is also minimized. This reduces the transportation requirements and costs of building hydroponic enclosures to cover an area. Therefore not only is it cheaper to cover an area, it reduces the difficulty of transporting materials to areas in remote and inaccessible locations. This makes such a product attractive to an end user.

Hexagonal structures for hydroponic applications have been considered before. For example, US Patent Application 2016/0059938 on "Smart floating platforms" filed Aug. 26, 2015 to Momayez et al details hexagonal modular floating platforms which can be joined together to cover surfaces of natural and artificial bodies of water and other liquids. These hexagonal modular floating platforms can be used to accommodate hydroponic planters. U.S. Pat. No. 5,599,136 on "Structure for topography stabilization and runoff control" filed Apr. 7, 1993 to Wilke details hexagonal pods to provide soil stabilization of a sloped topography. The pods can accommodate hydroponic plants.

While these works of prior art consider using hexagonal structures for hydroponic plants, these works neither disclose nor contemplate a fully functioning hydroponic enclosure designed for hydroponic crops. Furthermore, these works of prior art do not contemplate modular products for assembly in remote and inaccessible locations.

SUMMARY

A modular hydroponic enclosure comprising: a hexagonally shaped base; and a set of pillars attached to the hexagonally shaped base and to a hexagonally shaped roof, wherein the set of pillars support the roof.

A method for a modular hydroponic enclosure comprising: providing a hexagonally shaped base; providing a set of pillars attached to the hexagonally shaped base; and providing a hexagonally shaped roof attached to the set of pillars, and wherein the set of pillars support the roof.

A method to assemble a modular hexagonal enclosure comprising: assembling a hexagonal base; inserting a set of pillars and a set of panels into the assembled base; assembling a hexagonal roof; and attaching the assembled roof to the set of pillars.

An apparatus to couple a first and a second modular hexagonal enclosures together comprising: a first side section and a second side section coupled to each other, wherein the first side section comprises: a first plurality of horizontal fastening members to attach the first side section to a lower roof support shell member and a lower floor support shell member belonging to the first modular hexagonal enclosure, a first plurality of vertical fastening members to attach the first side section to a first pillar and a second pillar belonging to the first modular hexagonal enclosure, a first attachment member for insertion into: a first groove located on a first pillar belonging to the first modular hexagonal enclosure, a second groove located on a second pillar belonging to the first modular hexagonal enclosure, a panel insertion space located on a lower floor support shell member coupled to the first and second pillars belonging to the first modular hexagonal enclosure, and a panel insertion space located on a lower roof support shell member coupled to the first and second pillars belonging to the first modular hexagonal enclosure, and the second side section comprises: a second plurality of horizontal fastening members to attach the second side section to the lower roof support shell member and the lower floor support shell member belonging to the second modular hexagonal enclosure, a second plurality of vertical fastening members to attach the second side section to a first pillar and a second pillar belonging to the second modular hexagonal enclosure, and a second attachment member for insertion into a groove located on a first pillar belonging to the second modular hexagonal enclosure, a groove located on a second pillar belonging to the second modular hexagonal enclosure, a panel insertion space located on a lower floor support shell member coupled to the first and second pillars belonging to the second modular hexagonal enclosure, and a panel insertion space located on a lower roof support shell member coupled to the first and second pillars belonging to the second modular hexagonal enclosure; and an opening extending through the first side section and the second side section.

BRIEF DESCRIPTION OF THE DRAWINGS

The foregoing and other advantages of the disclosure will become apparent upon reading the following detailed description and upon reference to the drawings.

FIG. 2C illustrates top isometric, bottom isometric and side views of a floor with panels.

FIG. 3A illustrates top, side and isometric views of a lower floor support shell member.

FIG. 3B illustrates top and isometric views of a lower floor support shell member with an lower floor outer support beam inserted.

FIG. 5H illustrates views looking at a bottom surface, and from a side of an upper roof support shell member.

FIG. 5I illustrates views looking at a bottom surface, and from two sides of an upper roof support shell member.

FIG. 6 illustrates side and isometric views of an airlock.

FIG. 10B illustrates an example of a tower comprised of a plurality of sections.

FIG. 10C illustrates a combination of towers and lighting in an enclosure.

FIG. 20A illustrates side and isometric views of a connection apparatus to couple two hexagonal enclosures together.

Figure 1:
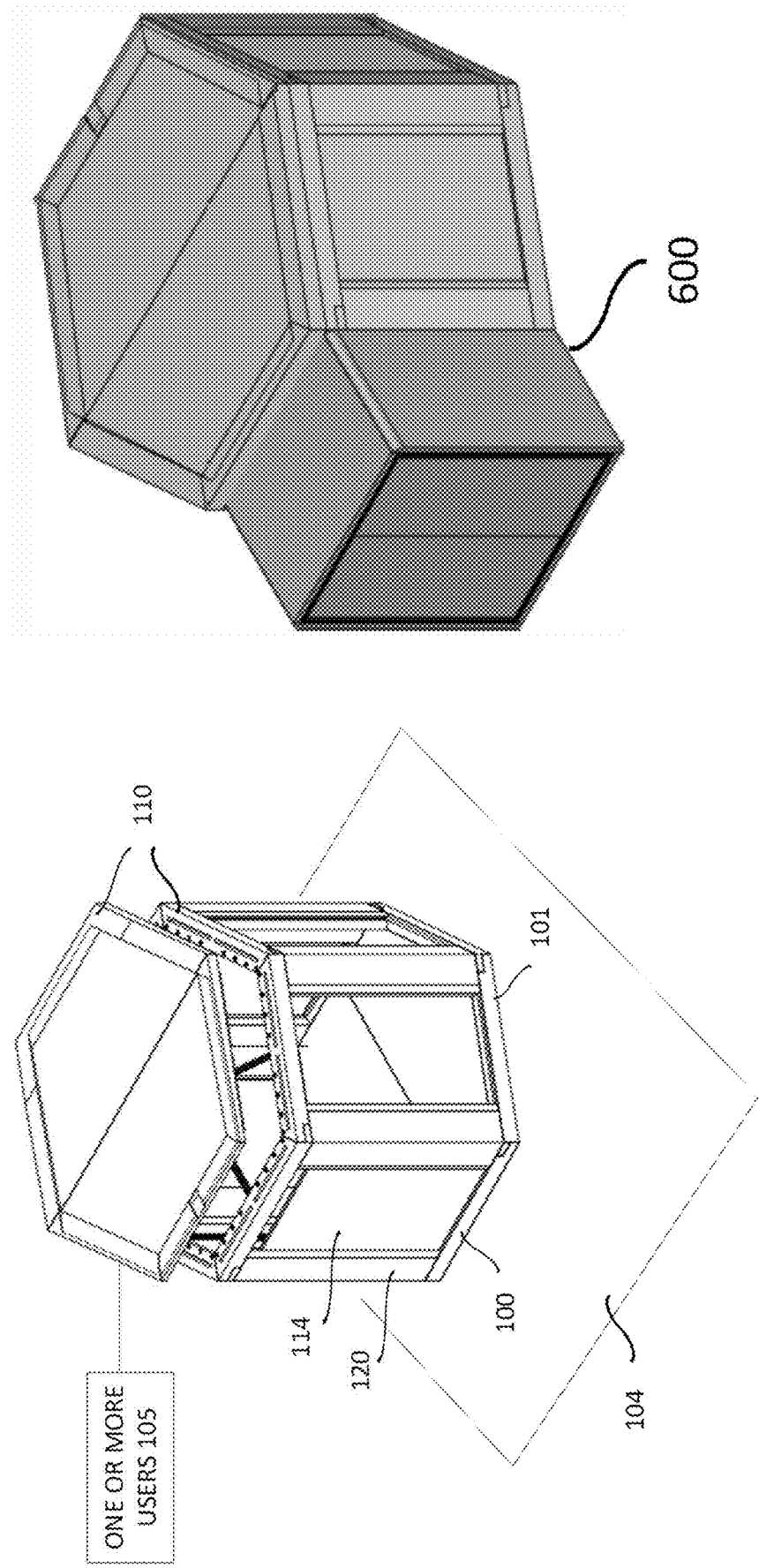
FIG. 1 illustrates two examples of a regular hexagonal enclosure.

While the present disclosure is susceptible to various modifications and alternative forms, specific embodiments or implementations have been shown by way of example in the drawings and will be described in detail herein. It should be understood, however, that the disclosure is not intended to be limited to the particular forms disclosed. Rather, the disclosure is to cover all modifications, equivalents, and alternatives falling within the spirit and scope of an invention as defined by the appended claims.

DETAILED DESCRIPTION

The foregoing and additional aspects and embodiments of the present disclosure will be apparent to those of ordinary skill in the art in view of the detailed description of various embodiments and/or aspects, which is made with reference to the drawings, a brief description of which is provided next.

The following details a system and method for a modular regular hexagonal hydroponic enclosure which overcomes the shortcomings posed by the prior art solutions discussed above.

FIG. 1 shows two example embodiments of a regular hexagonal enclosure 100 which is the subject of this description. One or more users 105 are associated with the hexagonal enclosure 100. The one or more users 105 use the hexagonal enclosure 100 to produce hydroponic crops such as fruit, vegetables, herbs, flowers or any type of crop suitable for growth in such an enclosure. The one or more users 105 are, for example, farmers, agricultural workers, settlers, gardeners, homeowners and restaurateurs. As shown in FIG. 1, enclosure 100 is attached to a surface 104. Enclosure 100 is attached to the surface 104 using techniques known to those of skill in the art. Surface 104 is, for example, the ground, a cement surface, a wooden surface or any surface suitable for attachment of enclosure 100. An alternative embodiment of enclosure 100 with airlock 600 is also shown in FIG. 1. The individual components of enclosure 100 will now be described:

Base

Referring to FIG. 1, enclosure 100 comprises a base 101, roof 110, set of panels 114 and set of pillars 120. The base 101 and roof 110 are hexagonally shaped. The set of pillars 120 and set of panels 114 are attached to the base 101 and roof 110. The set of pillars 120 support the roof 110.

Figure 2A:
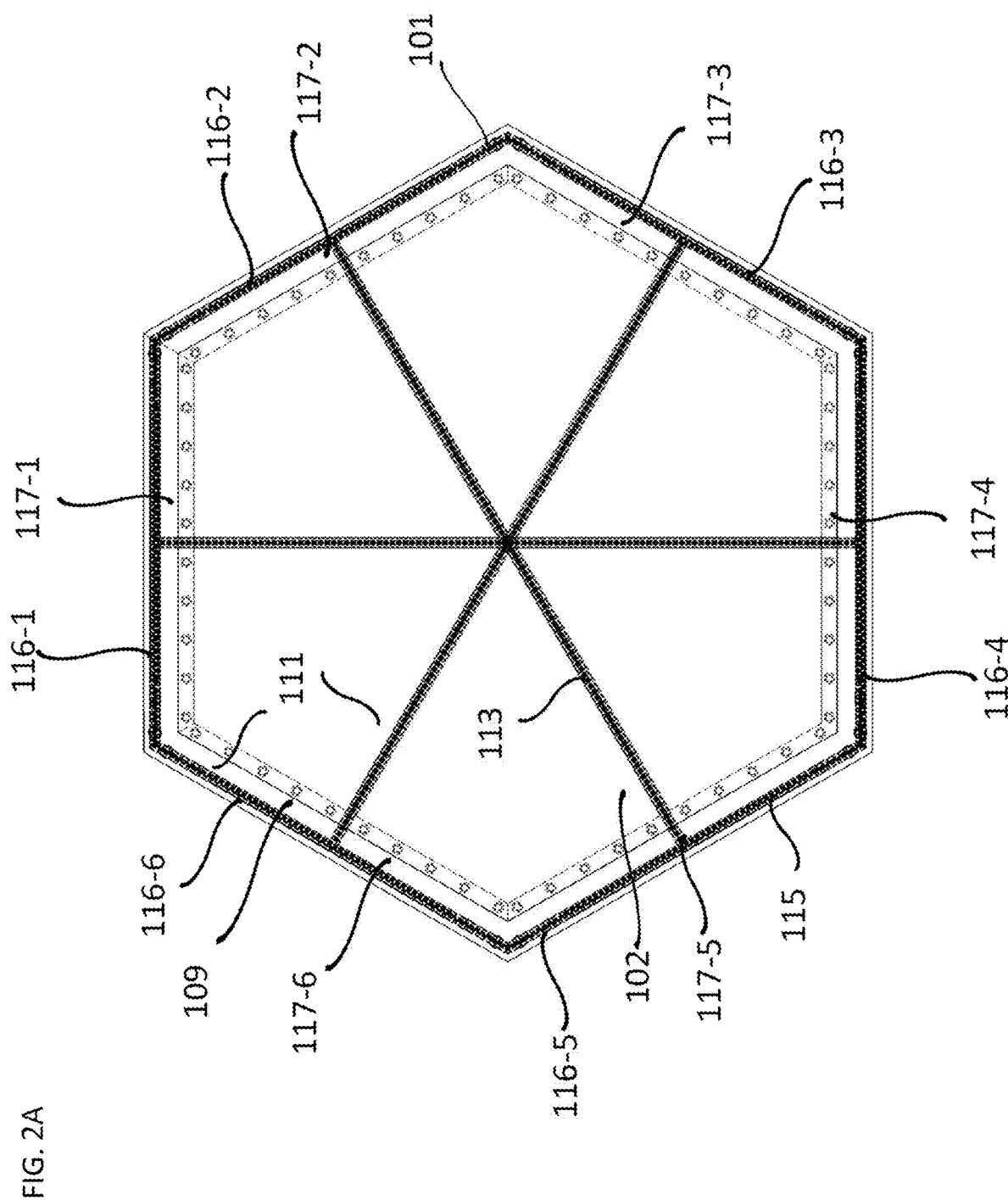
FIG. 2A illustrates a base of a hexagonal enclosure.

FIG. 2A shows a detailed illustration of an embodiment of base 101. Base 101 comprises floor 102, lower floor support shell 109, a set of lower floor support beams 111 comprising a set of lower floor inner beams 113 and a set of lower floor outer support beams 115. The set of lower floor outer support beams 115 comprises outer support beams 116-1 to 116-6.

Figure 2B:
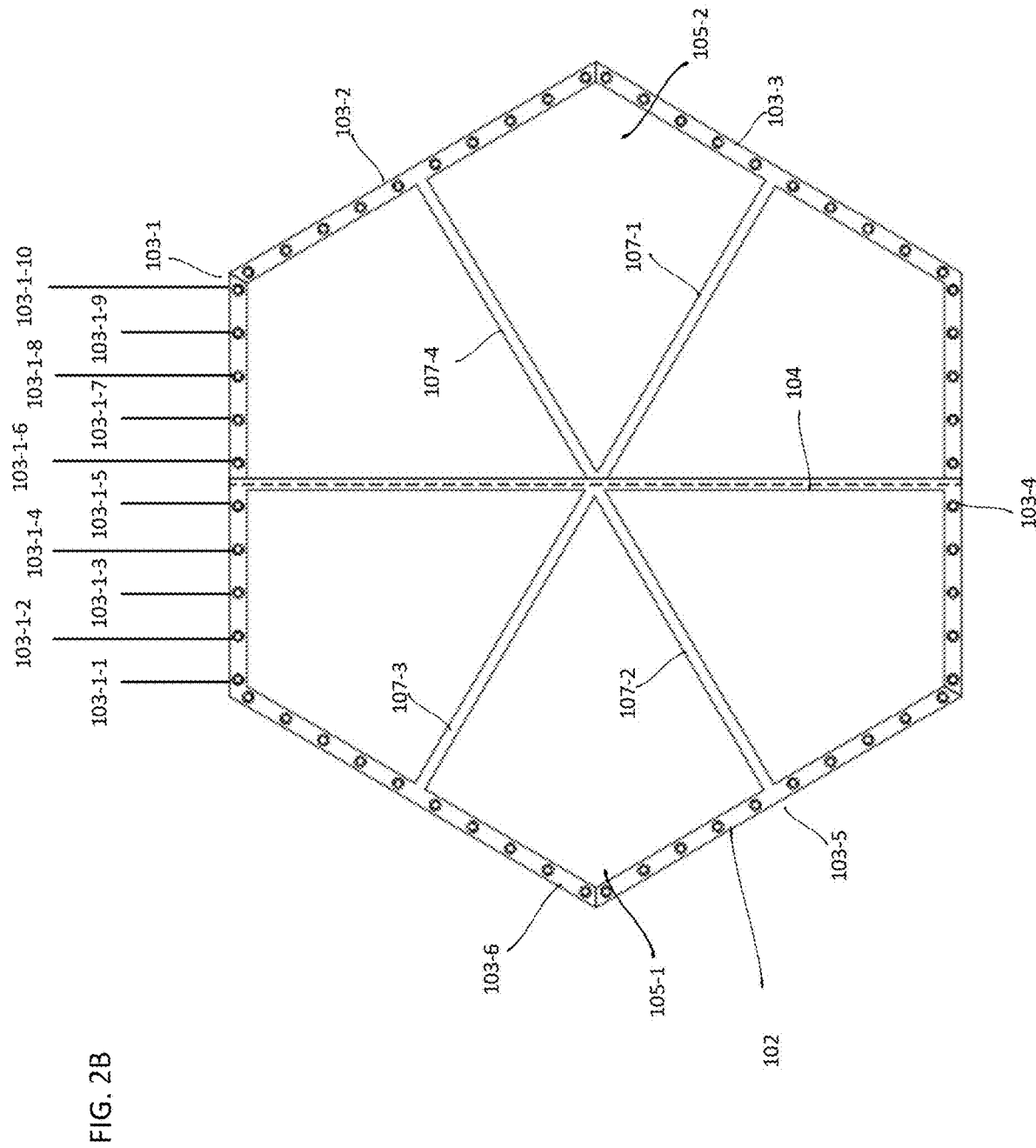
FIG. 2B illustrates a top view of a floor of a base of a hexagonal enclosure.

FIG. 2B shows a top view of floor 102 of base 101. Floor 102 is shaped as a regular hexagon, with sides 103-1 to 103-6. Then, the angle between each side of floor 102 and an adjacent side is 120°. In some embodiments, each of sides 103-1 to 103-6 are between 2 to 8 feet or 0.6 to 2.4 metres in length. In further embodiments, floor 102 can be made using, for example, plastic or other polymeric materials, wood, metal, or any material suitable for construction. In some embodiments, each of sides 103-1 to 103-6 comprises one or more floor connection members. For example, with reference to FIG. 2B, the floor connection members of side 103-1 are connection points 103-1-1 to 103-1-10. These enable floor 102 to attach to side 103-1, as will be described below.

As shown in FIG. 2B, floor 102 comprises two separate panels 105-1 and 105-2. To form floor 102, these separate panels are connected at connection point 104. FIG. 2C shows top isometric, bottom isometric and side views of floor 102 with panels 105-1 and 105-2.

In additional embodiments, floor 102 comprises cut-out spaces to accommodate a set of lower floor inner beams, which will be described below. For example, with reference to FIG. 2B, panel 105-1 comprises cut out spaces 107-2 and 107-3; and panel 105-2 comprises cut out spaces 107-1 and 107-4. In other embodiments, connection point 104 comprises a space to accommodate at least one inner beam, which will also be described below.

As explained previously, base 101 of FIG. 2A comprises a lower floor support shell 109. Lower floor support shell 109 is a regularly shaped hexagon so as to support floor 102. As shown in FIG. 2A, lower floor support shell 109 further comprises six (6) lower floor support shell members 117-1 to 117-6 arranged in a hexagonal shape, so as to conform to the shape of floor 102. In some embodiments, each lower floor support shell member encases one of the set of outer support beams. For example, as shown in FIG. 2A, lower floor support shell member 117-1 encases outer support beam 116-1, lower floor support shell member 117-2 encases outer support beam 116-2, and so on.

Each outer support beam is adjacent to two (2) other outer support beams, one at each end. Each outer support beam is configured for coupling to one or more columns and one or more inner beams, as will be discussed further below.

FIG. 3A shows top, side and isometric views of an embodiment of lower floor support shell member 117-1. In FIG. 3A the lower floor support shell member 117-1 has ends 3C-01 and 3C-02. End 3C-01 has edge 3C-03, and end 3C-02 has edge 3C-05. Member 117-1 has outer side 3C-11 and inner side 3C-12. Member 117-1 also has top surface 3C-09. In order to form a regular shaped hexagonal lower floor support shell 109, the angle 3C-37 between outer side 3C-11 and edge 3C-05 is 60°, and the angle 3C-35 between outer side 3C-11 and edge 3C-03 is 120°.

To enable insertion of pillars, pillar insertion receiving members are used to form pillar connection members. An example is shown in FIG. 3A. End 3C-01 comprises extrusion 3C-04 with pillar insertion receiving member 3C-08. Member 3C-08 comprises an opening with a space, the purpose of which will be detailed below. End 3C-02 comprises extrusion 3C-06, and pillar insertion receiving member 3C-10. Pillar insertion receiving member 3C-10 comprises an opening with a space, the purpose of which will be detailed below. Extrusions 3C-04 and 3C-06 are equilateral triangles.

As can be seen in the side view shown in FIG. 3A, extrusion 3C-06 is positioned higher relative to extrusion 3C-04. To enable insertion of pillars, an extrusion from an end of the lower floor support shell member 117-1 is positioned either above or below the corresponding extrusion from an end of the shell member to be coupled to, so that the openings belonging to the pillar insertion receiving members are in vertical alignment to form a pillar connection member. Since the extrusions are equilateral triangles, the angle formed between the lower floor support shell members after coupling is 120°.

Additionally, each lower floor support shell member comprises one or more floor connection members to enable coupling to a floor. In some embodiments, one or more floor fastening members are used together with the one or more floor connection members to enable coupling to a floor. As shown in FIG. 3A, inner side 3C-12 comprises floor connection members 3C-20 to 3C-29 which in turn comprise one or more openings and spaces for a side of the floor to couple to the lower floor support shell member 117-1. For example, with reference to FIG. 2B, if lower floor support shell member 117-1 is to be coupled to side 103-1, then, openings 103-1-1 to 103-1-10 on side 103-1 are vertically aligned with these openings in members 3C-20 to 3C-29 respectively, and one or more floor fastening members are inserted into these aligned openings to enable a strong coupling between the side 103-1 and the lower floor support shell member 117-1. To couple floor 102 to lower floor support shell 109, then the same operation is performed for the remaining members 117-2 to 117-6 and the other sides 103-2 to 103-6.

Referring to FIG. 3A, member 117-1 comprises space 3C-18 for insertion of outer support beam 116-1. FIG. 3B illustrate top and isometric views of lower floor support shell member 117-1 with outer support beam 116-1 inserted into space 3C-18.

The lower floor support shell member also comprises one or more pillar connection members to enable coupling to one or more pillars. In some embodiments, one or more pillar fastening members are used with the one or more pillar connection members to enable coupling to one or more pillars. A specific embodiment is shown in FIG. 3A. In FIG. 3A the pillar connection member 3C-17 in lower floor support shell member 117-1 comprises an opening and a space for a fastening member. Additionally, pillar insertion receiving members 3C-08 and 3C-10 also form part of pillar connection members. An example of a pillar fastening member is a dowel. An example which utilizes a dowel attached to a pillar will be described later.

The lower floor support shell member also comprises one or more column connection members to enable coupling of the outer beams to one or more columns. In some embodiments, the one or more columns comprise one or more column fastening members which are used with the column connection members to enable coupling to one or more columns. In further embodiments, the column fastening members work together with the previously discussed column receiving members on each of the outer beams to enable coupling of the outer beams to the one or more columns A specific embodiment is shown in FIG. 3A. In FIG. 3A the lower floor support shell member 117-1 comprises column connection members 3C-13 and 3C-15. Each of these members comprises an opening and a space for a column to couple to. The openings and spaces which are part of members 3C-13 and 3C-15 extend through to space 3C-18 to enable a column to couple to outer beam 116-1 when inserted in space 3C-18.

The lower floor support shell member also comprises one or more inner beam connection members to enable coupling of each of the outer beams to one or more inner beams. A specific embodiment is shown in FIG. 3A. In FIG. 3A, the lower floor support shell member 117-1 comprises an inner beam connection member 3C-31 in the form of an opening for an inner beam to enter. Inner beam connection member 3C-31 extends through to space 3C-18 to enable coupling between an inner beam and outer beam 116-1. Then, an inner beam is inserted into the opening 3C-31, and coupled to the outer beam 116-1. The coupling of the inner beam to the outer beam is achieved using techniques known to those of skill in the art, such as screws.

The lower floor support shell member also comprises a panel insertion space to enable insertion of a panel. A specific embodiment is shown in FIG. 3A, where lower floor support shell member 117-1 comprises panel insertion space 3C-33.

Pillars and Panels

As previously explained with reference to FIG. 1, enclosure 100 comprises set of pillars 120, which are used to attach the base 101 to the roof 110 of the enclosure. These pillars support the roof of the enclosure. In some embodiments a pillar encases one or more columns to further support the roof.

Figure 4A:
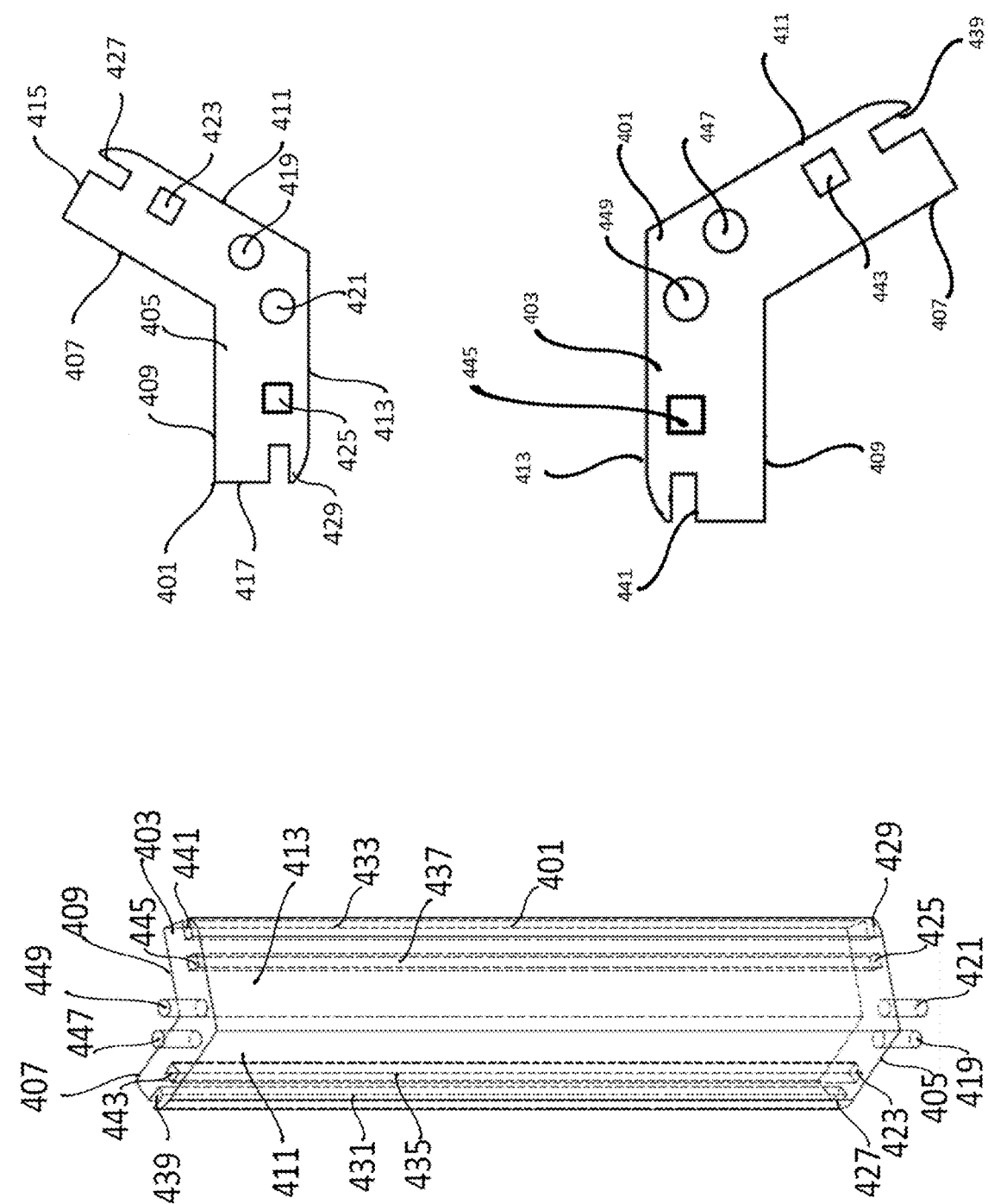
FIG. 4A illustrates top, bottom and side views of a pillar without columns inserted.
Figure 4B:
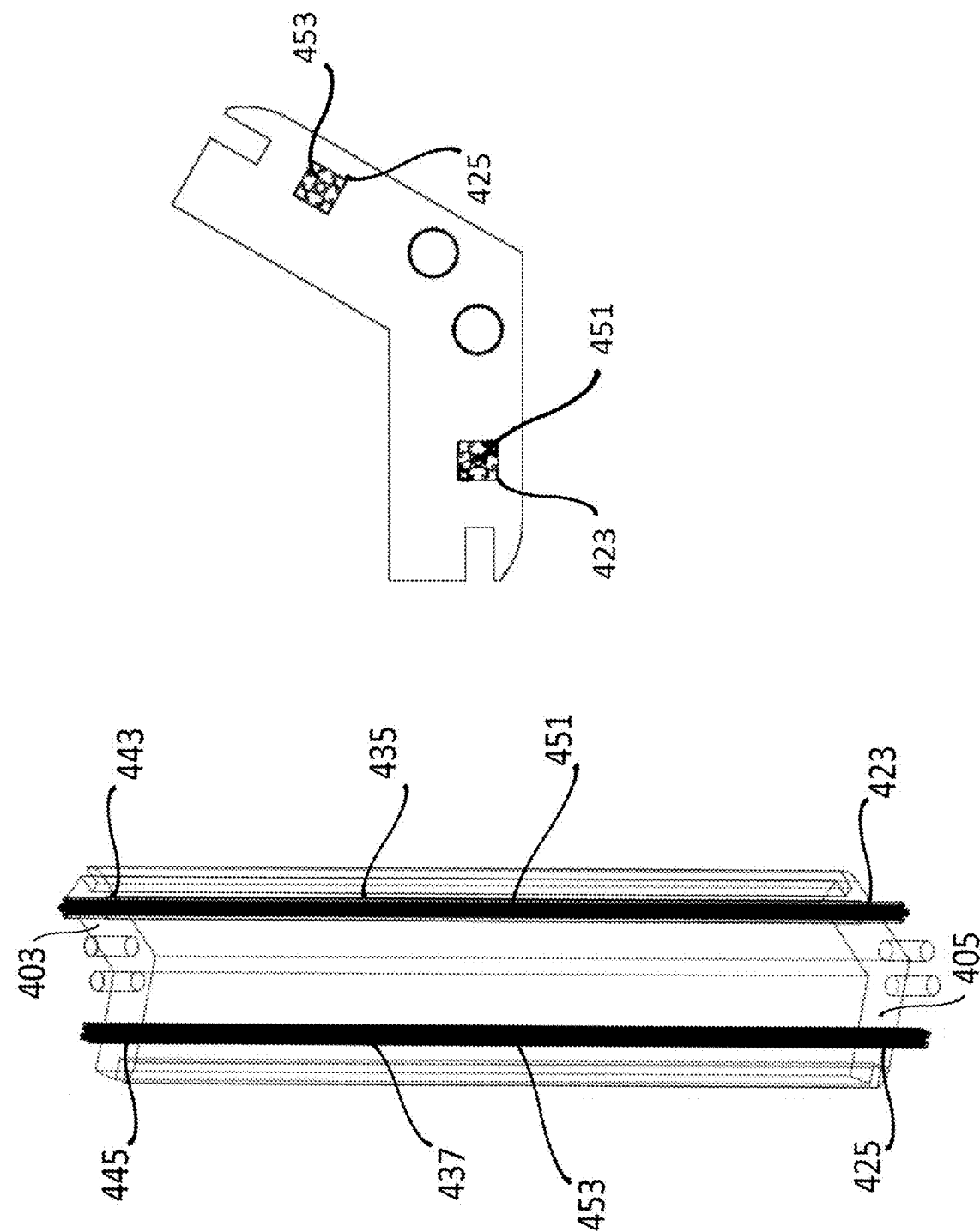
FIG. 4B illustrates bottom and side views of a pillar with columns inserted.

FIG. 4A show top, bottom and side views of an embodiment of a pillar 401 which encases two (2) columns, without columns inserted. FIG. 4B shows bottom and side views of pillar 401, with columns inserted. With reference to FIG. 4A, pillar 401 comprises a top surface 403; a bottom surface 405; inner surfaces 407 and 409; outer surfaces 411 and 413; and side surfaces 415 and 417.

Bottom side 405 comprises pillar fastening members in the form of dowels 419 and 421. Both these dowels 419 and 421 are used to attach pillar 401 to two lower floor support shell members.

There is a 120° angle between inner surfaces 407 and 409, and outer surfaces 411 and 413. While FIG. 4A shows one particular shape used for pillar 401, one of skill in the art would recognize that a variety of shapes are possible for pillar 401.

Grooves 431 and 433 are cut into side surfaces 415 and 417 respectively. Groove 431 is connected to opening 427 on the bottom surface 405 and opening 439 on top surface 403. Groove 433 is connected to opening 429 on the bottom surface 405 and opening 441 on top surface 403. These grooves are designed to hold panels.

Openings 423 and 425 in bottom surface 405 allow columns to be inserted into spaces 435 and 437 respectively. Spaces 435 and 437 extend from the bottom surface 405 to the top surface 403, and are connected to openings 443 and 445 respectively on the top surface 403. This allows columns to be inserted into spaces 435 and 437 respectively.

FIG. 4A shows a top view of pillar 401 and top surface 403. Top side 403 comprises pillar fastening members in the form of dowels 447 and 449. Both these dowels 447 and 449 are used to attach pillar 401 to two lower roof support shell members. Additionally, one of these dowels 447 and 449 are used to join two lower floor support shell members together depending on the location of the connection. As explained previously, there is a 120° angle between inner surfaces 407 and 409, and outer surfaces 411 and 413.

FIG. 4B shows pillar 401 with columns 451 and 453 inserted into spaces 435 and 437. When column 451 is inserted, it protrudes from opening 423 on the bottom surface 405, and from opening 443 on top surface 403. When column 453 is inserted, it protrudes from opening 425 on bottom surface 405, and from opening 445 on top surface 403.

Figure 4C:
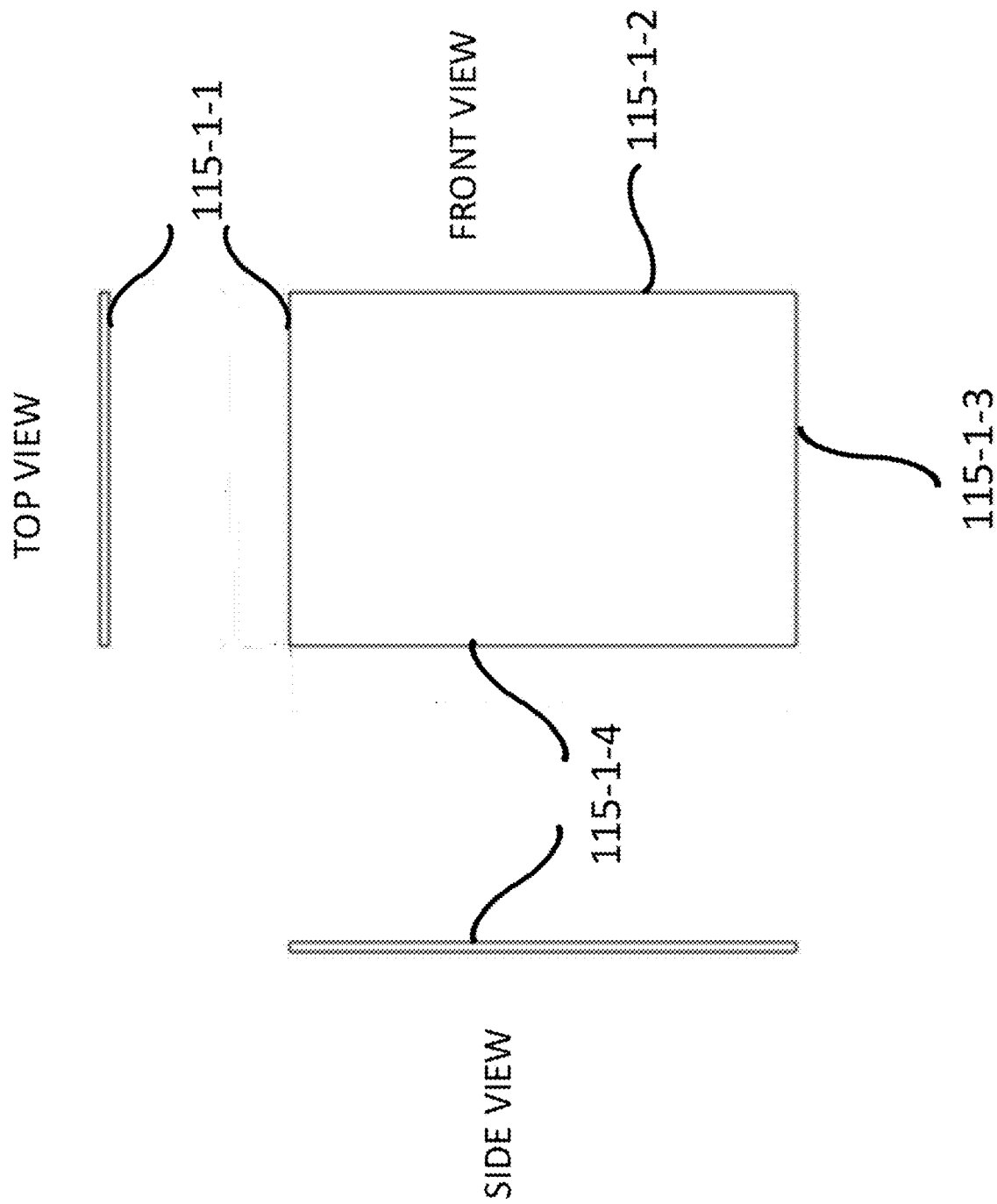
FIG. 4C illustrates top, side and front views of a panel.

As previously explained with reference to FIG. 1, enclosure 100 further comprises a set of panels 114. These panels attach to the pillars, the lower floor support shell members and lower roof support shell members, as will be explained later. The set of panels 114 separate the interior of enclosure 100 from an exterior. FIG. 4C is a detailed illustration of top, side and front views of a single panel 115-1. As shown in FIG. 4C, panel 115-1 comprises two (2) horizontal sides 115-1-1 and 115-1-3; and two (2) vertical sides 115-1-2 and 115-1-4. Then the vertical sides 115-1-2 and 115-1-4 are attached to the pillars using the previously described pre-cut grooves in the pillars. The horizontal sides 115-1-1 and 115-1-3 attach to the lower roof support shell member and lower floor support shell member respectively using the panel insertion spaces in these members.

The materials used to construct set of panels 114 may depend on the temperature exterior to the enclosure. In some embodiments, when temperatures exterior to the enclosure fall within a certain range, then set of panels 114 are windows. In some embodiments, this range is from 0° C. to 50° C. (32° F. to 122° F.). In some of the embodiments where set of panels 114 are windows, set of panels 114 are rectangular shaped polycarbonate windows. In some of these embodiments where set of panels 114 are windows, one of the set of panels has a hole for an external water supply tubing to fit through. In other embodiments, when it is likely for temperatures exterior to the enclosure to fall below a certain threshold temperature, for example below 0° C. (32° F.), then set of panels 114 comprise solid, opaque, heat retaining walls. In yet other embodiments, when it is likely for temperatures exterior to the enclosure to rise above a certain threshold temperature, for example above 50° C. (122° F.), then set of panels 114 comprises shade curtains to prevent overheating and block out certain spectrums of sunlight. In some embodiments, the set of panels 114 are made of reflective surfaces so as to ensure that light generated within the enclosure is reflected within the enclosure.

In some embodiments, the enclosure 100 is insulated. In some of the embodiments where enclosure 100 is insulated, at least some of the set of panels 114 comprise phase change materials for regulation of temperature interior to the enclosure. In some of the embodiments where phase change materials are used, the number of panels using the phase change materials will depend on one or more of:

The temperature exterior to the enclosure, and
Fluctuations in the temperature exterior to the enclosure.

Roof

Figure 5A:
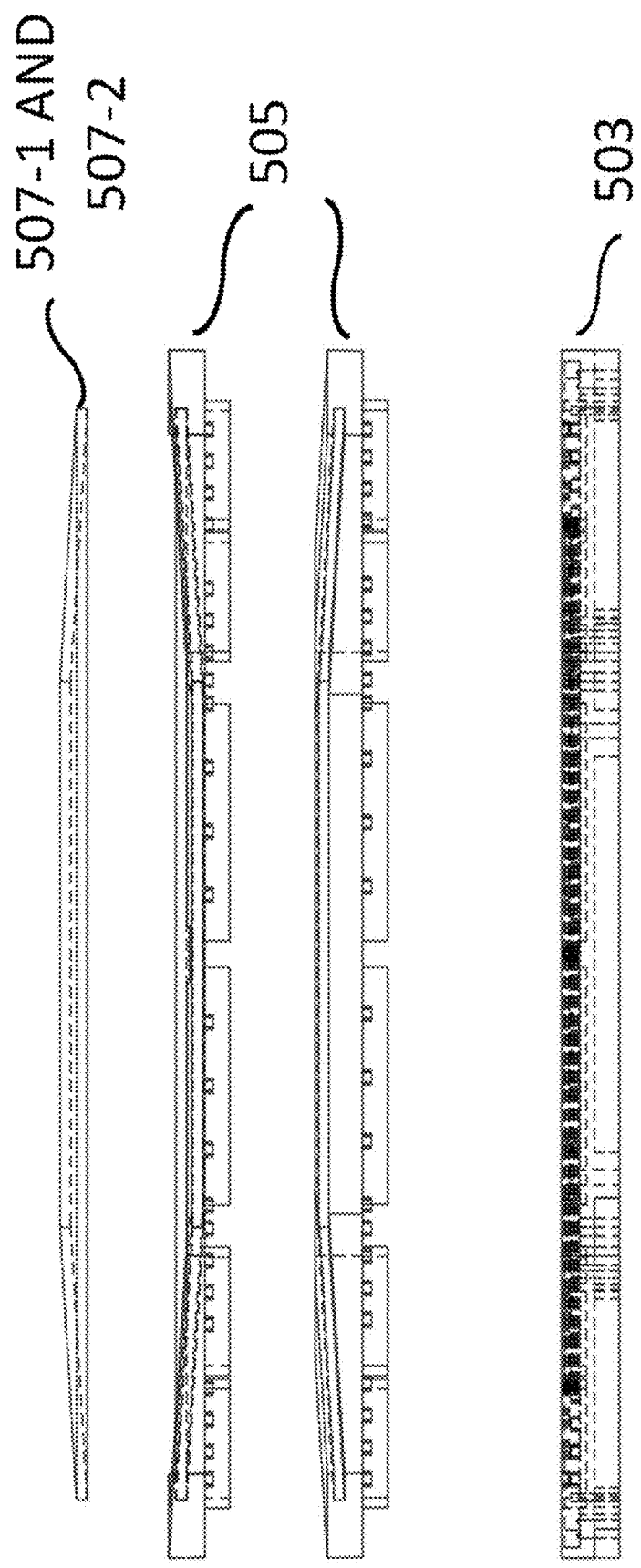
FIG. 5A illustrates a roof of a regular hexagonal enclosure.

As shown in FIG. 1, enclosure 100 further comprises a roof 110. FIG. 5A illustrates roof 110. With reference to FIG. 5A, roof 110 comprises lower roof support shell 503 and upper roof support shell 505 which supports roof panels 507-1 and 507-2.

Figure 5B:
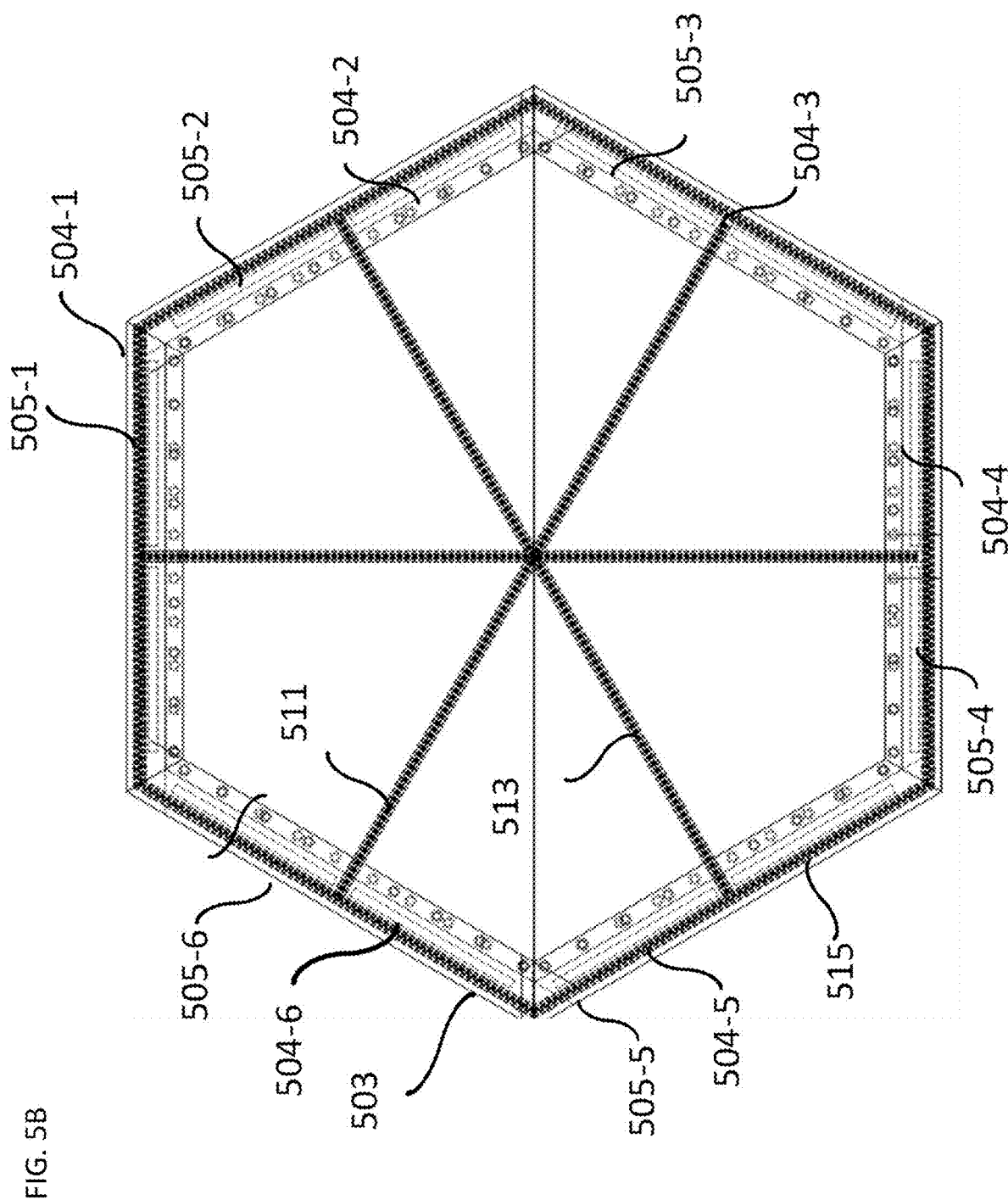
FIG. 5B illustrates a lower roof support shell in detail.

Lower roof support shell 503 is detailed further in FIG. 5B. Lower roof support shell 503 comprises a set of support beams 511, further comprising a set of lower roof inner beams 513, and a set of lower roof outer beams 515. As is shown in FIG. 5B, lower roof support shell 503 is shaped as a regular hexagon so as to conform to the shape of enclosure 100. In FIG. 5B, lower roof support shell 503 further comprises six (6) lower roof support shell members 504-1 to 504-6. Then, the angle between each lower roof support shell member and an adjoining member is 120°. In some embodiments, each of the members 504-1 to 504-6 are between 2 to 8 feet or 0.6 to 2.4 metres in length. In further embodiments, lower roof support shell 503 can be made using, for example, plastic or other polymeric materials, or other materials suitable for construction.

The set of lower roof outer support beams 515 comprises lower roof outer support beams 505-1 to 505-6. In some embodiments, each lower roof support shell member encases one of the set of lower roof outer support beams 515. For example, as shown in FIG. 5B, lower roof support shell member 504-1 encases lower roof outer support beam 505-1, lower roof support shell member 504-2 encases lower roof outer support beam 505-2, and so on. In some embodiments, these lower roof outer support beams are inserted into the lower floor support shell members via openings, as will be detailed later.

Figure 5C:
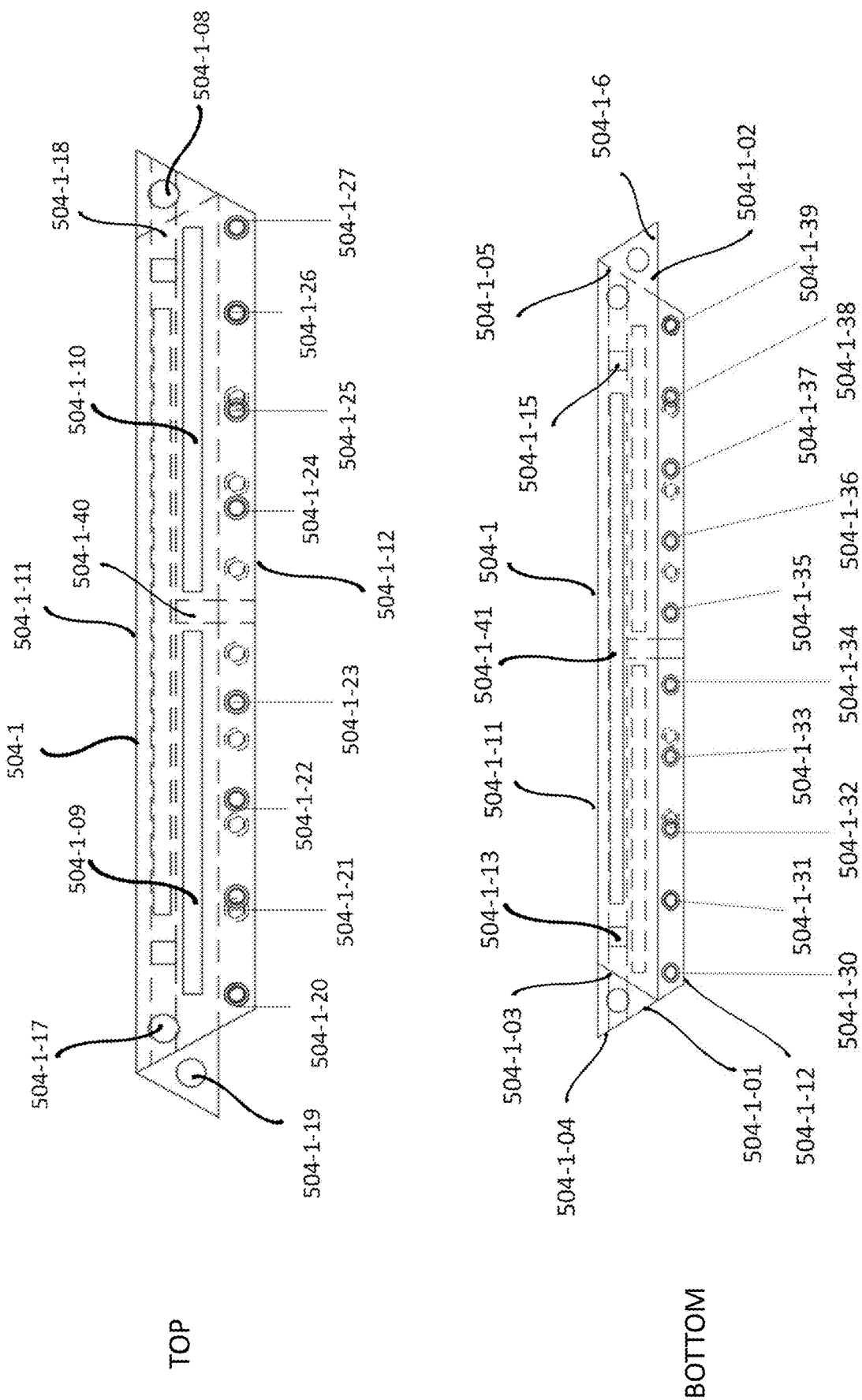
FIG. 5C illustrates the top and bottom of a lower roof support shell member.

FIG. 5C shows detailed diagrams of the top and bottom of lower roof support shell member 504-1. Referring to the view of the top: Lower roof support shell member 504-1 has an outer side 504-1-11 and an inner side 504-1-12. In some embodiments, each of the members 504-1 to 504-6 comprises one or more upper roof support shell connection members to enable connection to an upper roof support shell member. For example, with reference to FIG. 5C, the upper roof support shell connection members of member 504-1 are upper roof support shell connection points 504-1-20 to 504-1-27; and upper roof support shell connection grooves 504-1-09 and 504-1-10.

Referring to the diagram of the bottom shown in FIG. 5C, the lower roof support shell member 504-1 has ends 504-1-01 and 504-1-02. Each end has an edge. End 504-1-01 has edge 504-1-03, and end 504-1-02 has edge 504-1-05. As explained previously, member 504-1 has outer side 504-1-11 and inner side 504-1-12. In order to form a regular shaped hexagonal lower roof support shell, the angle between outer side 504-1-11 and edge 504-1-05 is 60°, and the angle between outer side 504-1-11 and edge 504-1-03 is 120°, similar to that shown for angles 3C-35 and 3C-37 for lower floor support shell member 117-1 in FIG. 3A.

Figure 5D:
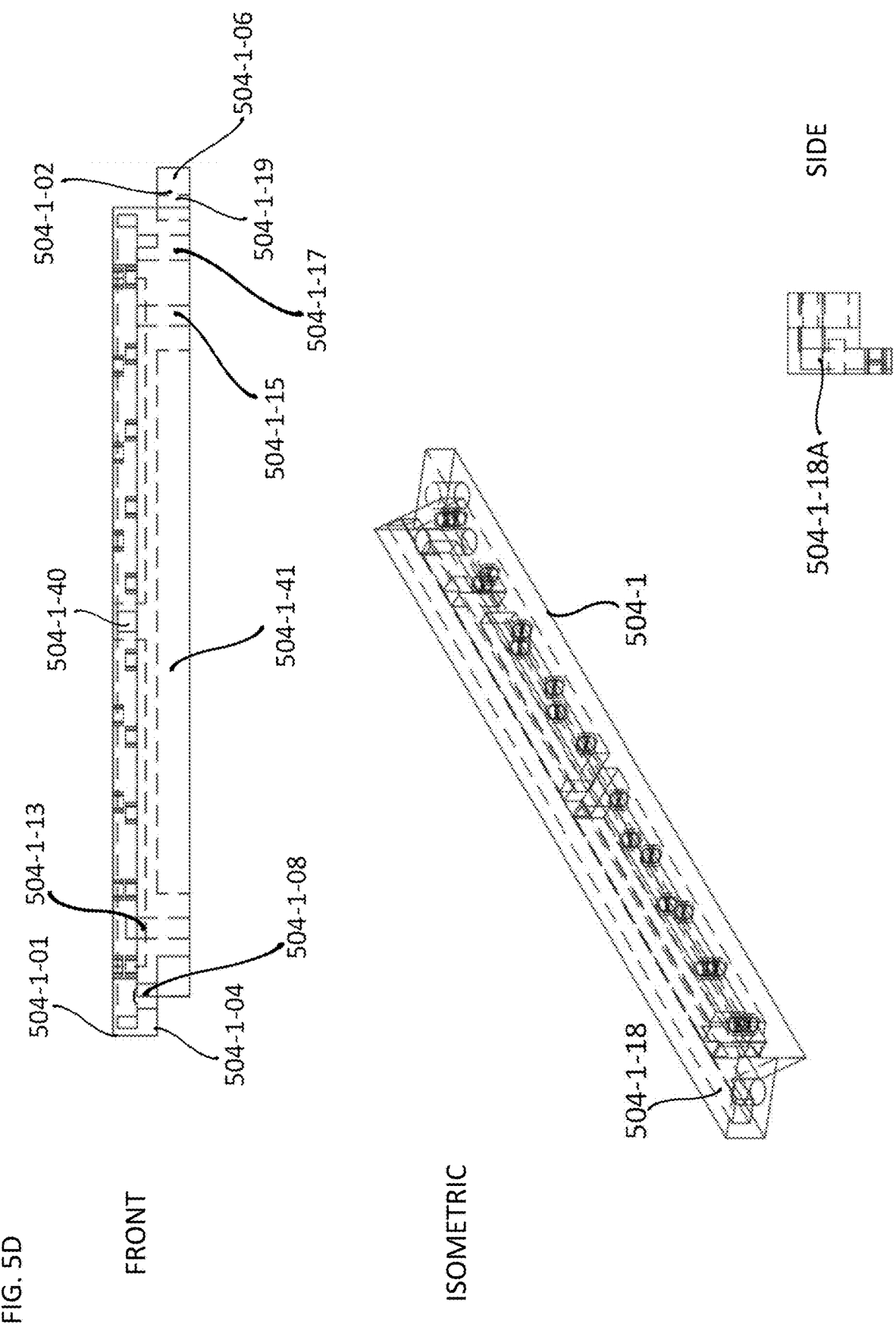
FIG. 5D illustrates front, isometric and side views of a lower roof support shell member.

As with the lower floor support shell members, the lower roof support shell member also comprises one or more pillar connection members to enable insertion of one or more pillars using pillar fastening members. An example embodiment is shown in FIGS. 5C and 5D. FIG. 5D shows front, isometric and side views of lower roof support shell member 504-1. In FIGS. 5C and 5D the pillar connection member 504-1-17 in lower roof support shell member 504-1 comprises an opening and a space for a pillar fastening member.

Similar to the lower floor support shell members, pillar insertion receiving members are used to form pillar connection members. Referring to FIGS. 5C and 5D, end 504-1-01 comprises extrusion 504-1-04 with pillar insertion receiving member 504-1-08, which in turn comprises an opening with a space. End 504-1-02 comprises extrusion 504-1-06 with pillar insertion receiving member 504-1-19, which comprises an opening with a space. As can be seen, extrusions 504-1-04 and 504-1-06 are equilateral triangles. As can be seen in the front view in FIG. 5D, extrusion 504-1-04 is positioned higher relative to extrusion 504-1-06. To enable insertion of pillars, an extrusion from an end of the lower roof support shell member 504-1 is positioned either above or below the corresponding extrusion from an end of the shell member to be coupled to, so that the openings belonging to the pillar insertion receiving members are in vertical alignment to form a pillar connection member. Since the extrusions are equilateral triangles, the angle formed between the lower roof support shell members after coupling is 120°. An example of a pillar fastening member is a dowel. An example which utilizes a dowel attached to a pillar will be described later.

In some embodiments, each lower roof support shell member comprises one or more auxiliary connection members. As shown in the bottom view in FIG. 5C, inner side 504-1-12 comprises auxiliary connection members 504-1-30 to 504-1-39. These may be used to couple other components or structures as necessary.

With reference to FIG. 5B, each of the outer beams 505-1 to 505-6 also couples to one of the set of inner beams 513. This is achieved in the following way: Each lower roof support shell member comprises one or more inner beam connection members to enable coupling of each of the outer beams to one or more inner beams. For example, with reference to FIG. 5D, lower roof support shell member 504-1 comprises inner beam connection member 504-1-40 in the form of an opening and a space to enable insertion of an inner beam. The coupling of the inner beam to the outer beam is achieved using techniques known to those of skill in the art, such as screws.

Referring to the front view of member 504-1 shown in FIG. 5D, member 504-1 comprises panel insertion space 504-1-41 for insertion of a panel such as panel 115-1 shown in FIG. 4C.

Referring to the view of the top surface of member 504-1 shown in FIG. 5C; and isometric and side views of member 504-1 shown in FIG. 5D, member 504-1 comprises space 504-1-18 for insertion of outer support beam 505-1. Referring to the side view shown in FIG. 5D, space 504-1-18 has opening 504-1-18A for insertion of the outer support beam.

The lower roof support shell member also comprises one or more column connection members to enable coupling of the outer beams to one or more columns. In some embodiments, the one or more columns comprise one or more column fastening members which are used with the column connection members to enable coupling to one or more columns. In further embodiments, the column fastening members work together with the previously discussed column receiving members on each of the outer beams to enable coupling of the outer beams to the one or more columns A specific embodiment is shown in FIGS. 5C and 5D. In FIG. 5C the lower roof support shell member 504-1 comprises column connection members 504-1-13 and 504-1-15. Each of these members comprises an opening and a space for a column to couple to. The openings and spaces which are part of members 504-1-13 and 504-1-15 extend through to space 504-1-18 to enable a column to couple to an outer beam inserted in space 504-1-18.

Figure 5E:
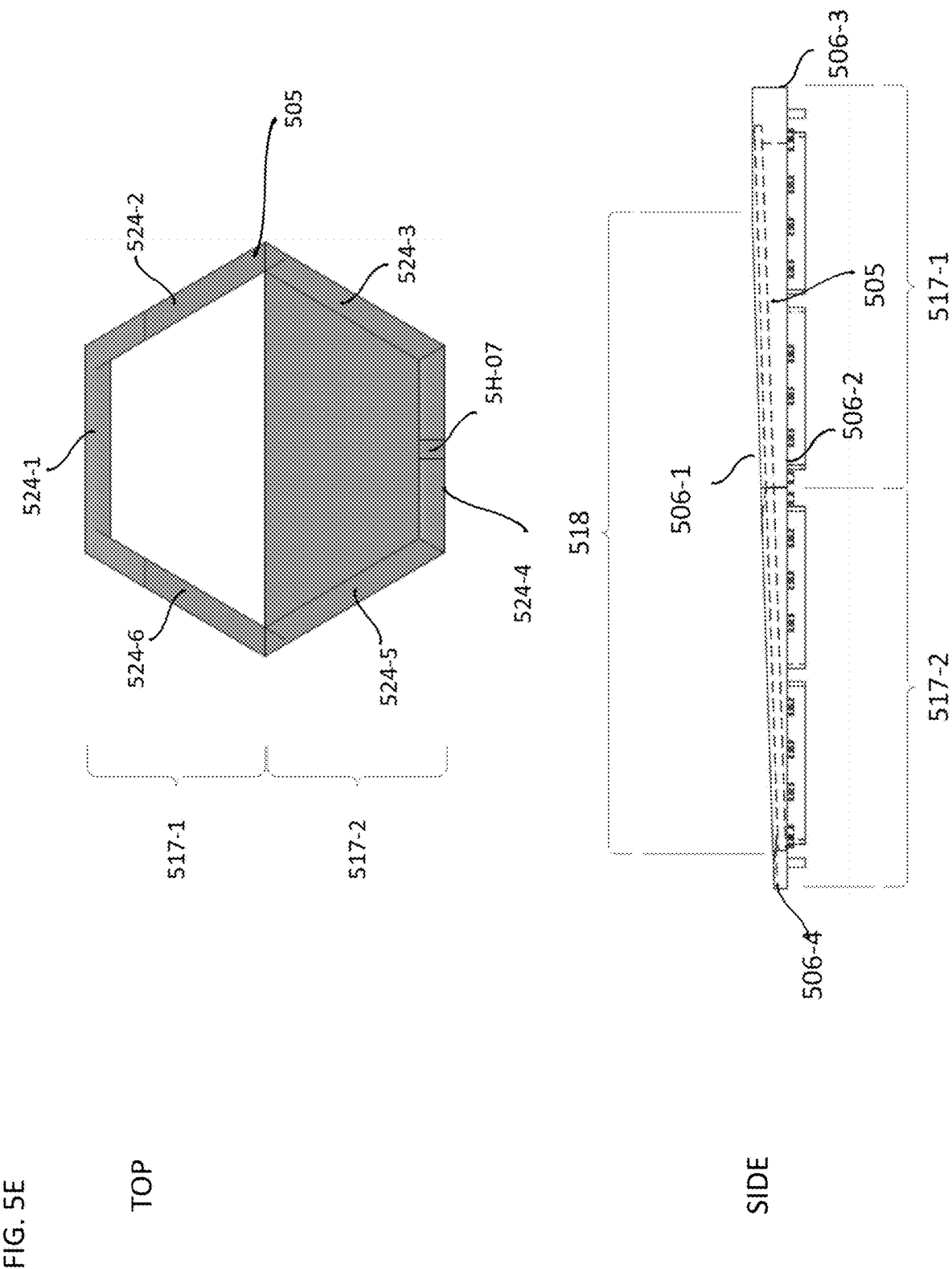
FIG. 5E illustrates top and side views of an upper roof support shell.

FIG. 5E shows top and side views of upper roof support shell 505, which is designed to couple to lower roof support shell 503 and accommodate roof panels 507-1 and 507-2. Upper roof support shell 505 is constructed using upper roof support shell members 524-1 to 524-6. As can be seen, each upper roof support shell member has two adjoining upper roof support shell members. For example, upper roof support shell member 524-1 is adjoined by members 524-2 and 524-6. Then these adjoining members are at an angle of 120° to member 524-1, so as to enable the upper roof support shell to be hexagonal shaped. In some embodiments, upper roof support shell member 505 is designed to allow a slant in roof panels 507-1 and 507-2. This is slant is, for example, in the range of 0.1 to 5°. This enables water to be drained away from the roof in case of rain or melting snow. For example, in FIG. 5E there is a water drainage outlet 5H-07 at this low point of upper roof support shell 505. In some embodiments, the water that is drained away is collected into a receptacle such as a rainwater barrel, and can then be used to irrigate the crops within the enclosure 100.

The side view shown in FIG. 5E illustrates the slant. Upper roof support shell 505 has top surface 506-1 and bottom surface 506-2, right surface 506-3 and left surface 506-4. Top surface 506-1 has a slanted section 518 located between right edge 506-3 and the left edge 506-4. The lower end of the slanted section 518 is closer to left edge 506-4 while the higher end of the slanted section 518 is closer to right edge 506-3. Upper roof support shell 505 is divided into two portions, first portion 517-1 and second portion 517-2. With reference to the top and side views, the three upper roof support shell members 524-1, 524-2 and 524-6 form the first portion 517-1 of the upper roof support shell 505. Members 524-2 and 524-6 comprise slots which slant away from member 524-1. The slot on member 524-1 is also slanted so as to enable roof panel 507-1 to be inserted at the same slant. When the roof panel 507-1 is inserted into the slots in each of these upper roof support shell members, the panel will slant away from member 524-1. The three upper roof support shell members 524-3, 524-4 and 524-5 form the second portion 517-2 of the upper roof support shell 505. Members 524-3 and 524-5 comprise slots which slant towards member 524-4. Member 524-4 comprises a groove which is slanted to receive roof panel 507-2. Then, the low point of this slant is within the groove in upper roof support shell member 524-4.

Figure 5F:
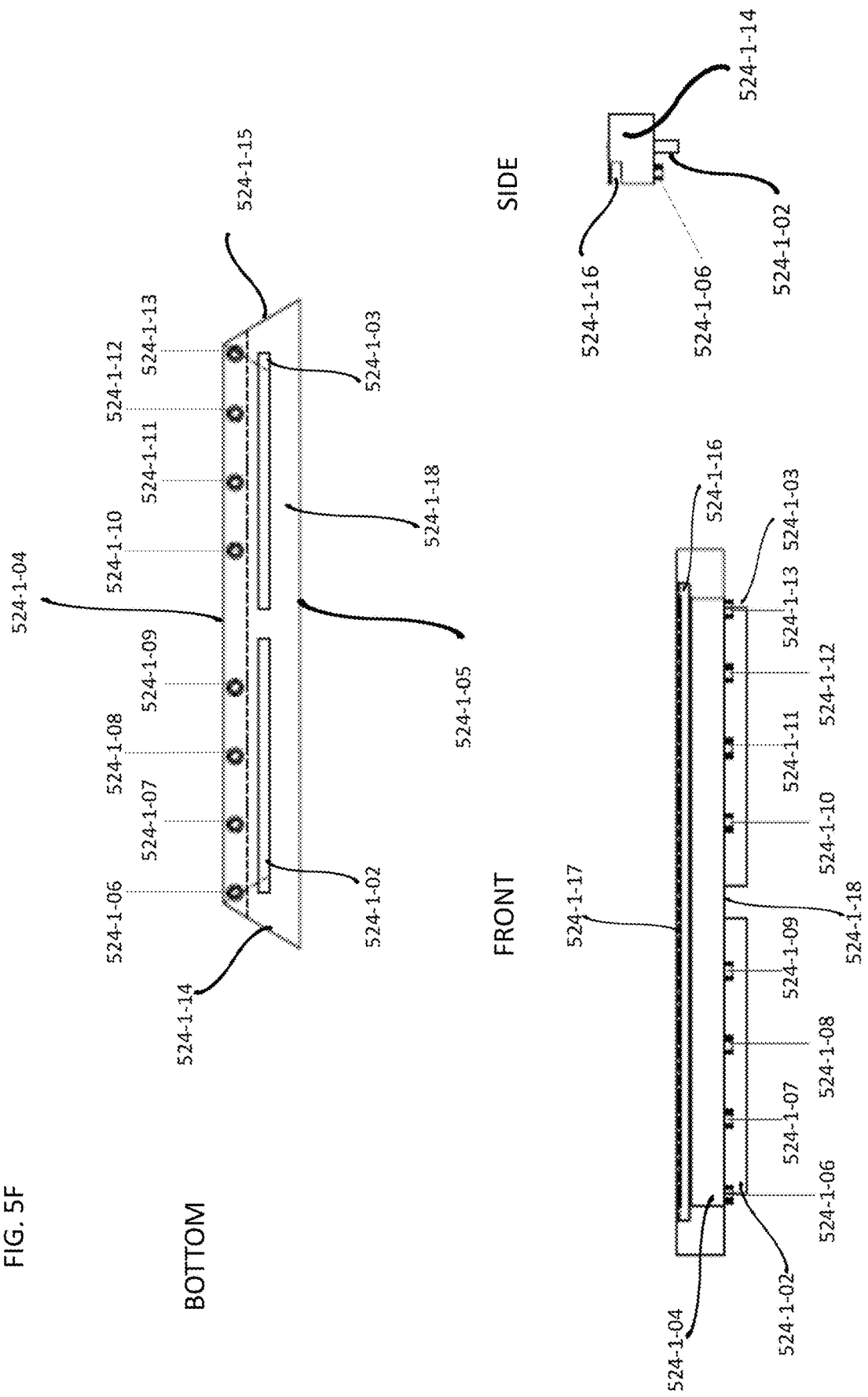
FIG. 5F illustrates views from a bottom surface, front surface and side surface of an upper roof support shell member.

A detailed description of upper roof support shell member 524-1 to 524-6 are given below. For upper roof support shell member 524-1, a detailed description is given below and with reference to FIG. 5F. FIG. 5F shows views from the bottom surface 524-1-17, front surface 524-1-04, and side surface 524-1-14 of upper roof support shell member 524-1. Side 524-1-04 is the shorter side and side 524-4-05 is the longer side. Then side 524-1-05 makes 60° angles with sides 524-1-14 and 524-1-15; and side 524-1-04 makes 120° angles with side 524-1-14 and 524-1-15, to facilitate a hexagonal shaped roof as seen in FIG. 5F. Each upper roof support shell member comprises lower roof support shell connection members to enable coupling to the corresponding lower roof support shell member. For example, for shell member 524-1, the lower roof support shell connection members comprise lower roof support shell connection fastening members 524-1-06 to 524-1-13 and lower roof support shell connection tabs 524-1-02 and 524-1-03. These connect into the corresponding connection points and connection grooves on lower roof support shell member 504-1, as will be explained later. Then, groove 524-1-16 is positioned to receive roof panel 507-2. As explained above, roof panel 507-1 slants away from upper roof support shell member 524-1. As shown in FIG. 5F, groove 524-1-16 is angled to maintain roof panel 507-1 in this slanted orientation.

Figure 5G:
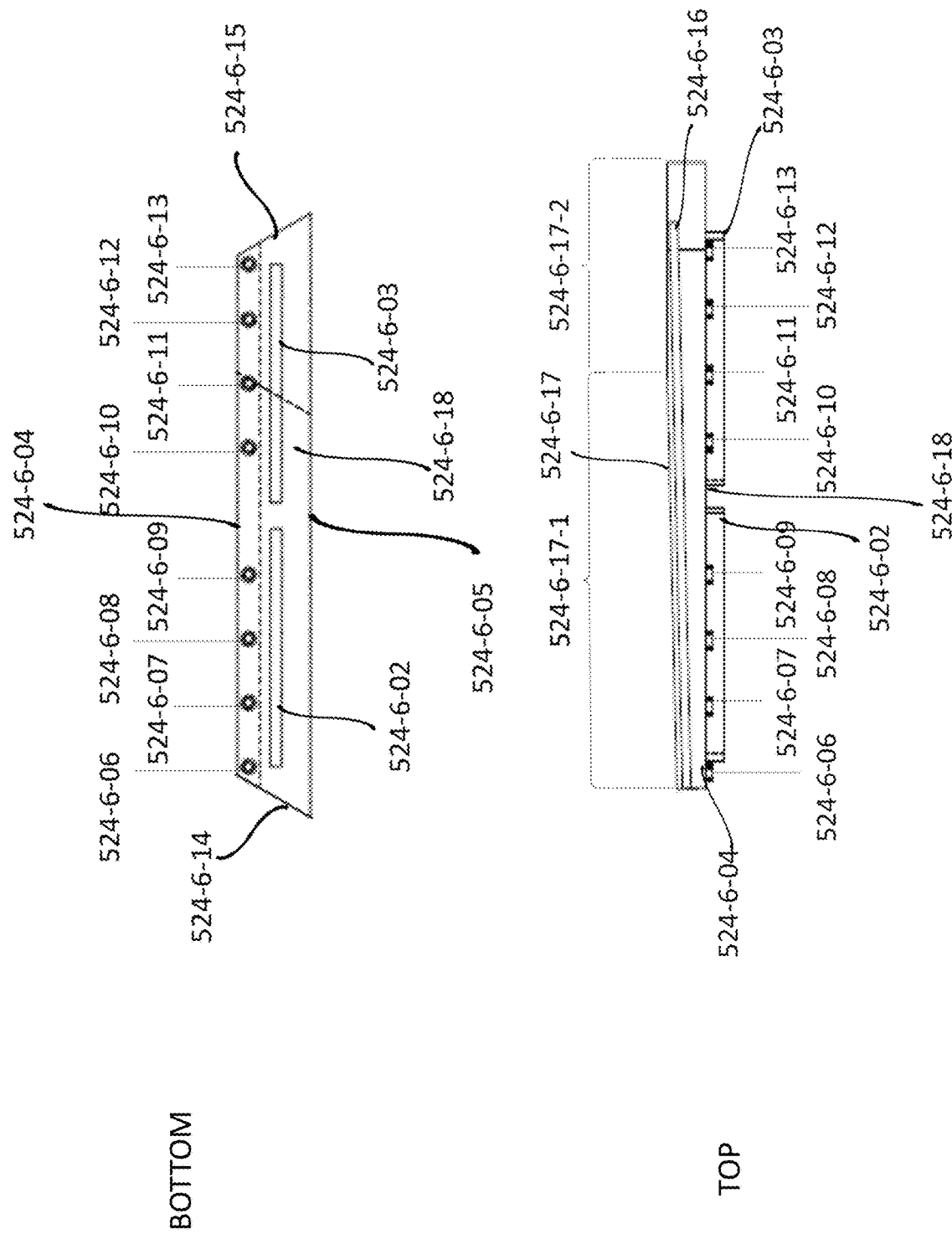
FIG. 5G illustrates views looking at a bottom surface and an inner surface of an upper roof support shell member.
Figure 51:
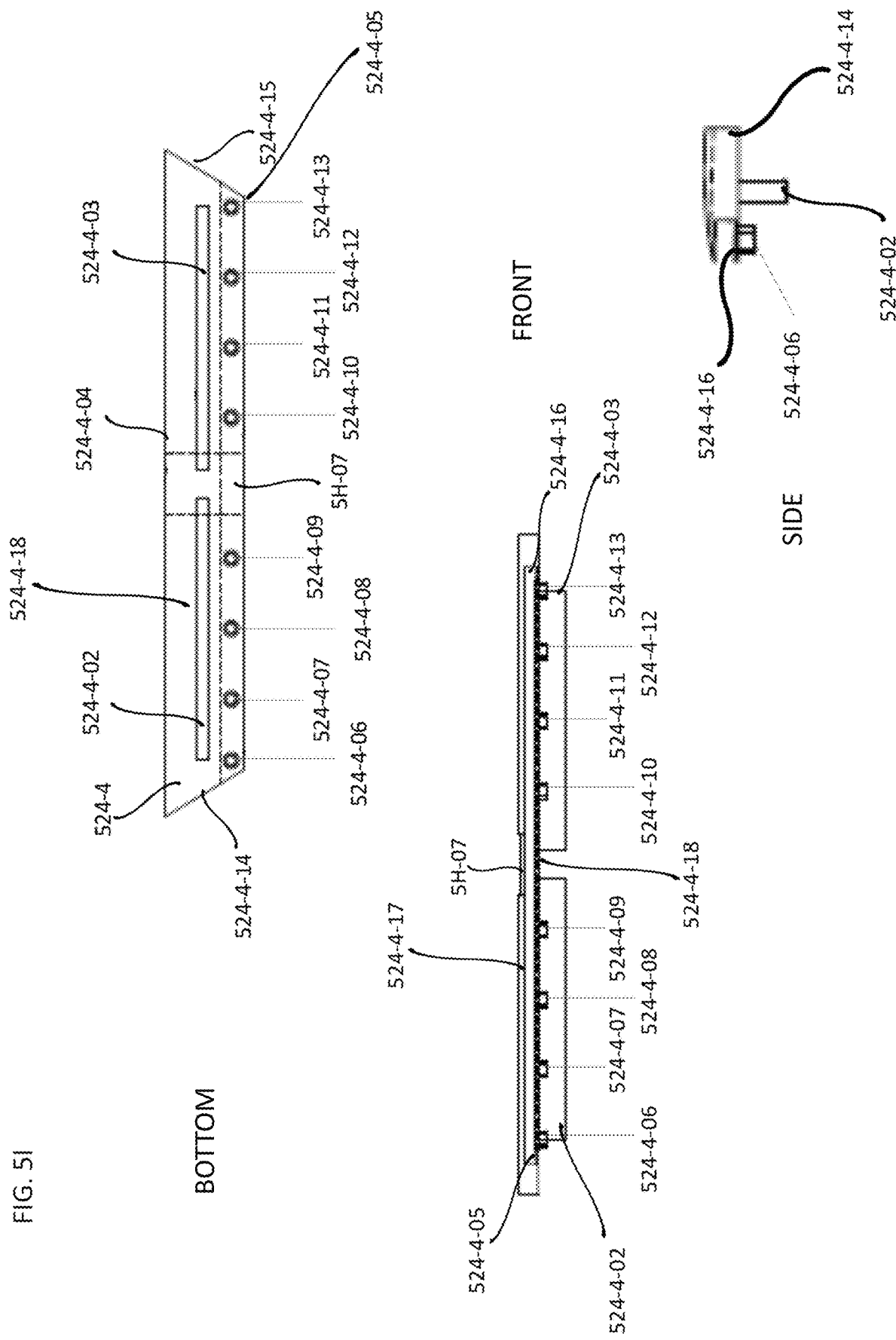

For upper roof support shell member 524-6, a detailed description is given below and with reference to FIGS. 5E and 5G. One of skill in the art would note that lower roof support shell member 524-2 shown in FIG. 5E is constructed in a similar fashion. FIG. 5G shows views looking at the bottom surface 524-6-18 and at inner surface 524-6-04. Surface 524-6-04 is shorter compared to surface 524-6-05. Then side 524-6-05 makes 60° angles with sides 524-6-14 and 524-6-15; and side 524-6-04 makes 120° angles with side 524-6-14 and 524-6-15, to facilitate a hexagonal shaped roof. Upper roof support shell member 524-6 also comprises lower roof support shell connection members to enable coupling to corresponding lower roof support shell member 504-6. These connection members comprise connection fastening members 524-6-06 to 524-6-13 and lower roof support shell connection tabs 524-6-02 and 524-6-03, which connect into the corresponding connection points and connection grooves on lower roof support shell member 504-6. Groove 524-6-16 is designed to hold panel 507-1 at the same angle as groove 524-1-16. Referring to the view of inner surface 524-6-04, it can be seen that top surface 524-6-17 of upper roof support shell member 524-6 comprises two sections 524-6-17-1 and 524-6-17-2. Section 524-6-17-1 is slanted at the same angle as groove 524-1-16. Section 524-6-17-2 is coplanar with the top surface of upper roof support shell member 524-1.

A detailed description of upper roof support shell member 524-5 is given below and with reference to FIGS. 5E and 5H. One of skill in the art would note that upper roof support shell member 524-3 is constructed in a similar fashion. FIG. 5H show views looking at bottom surface 524-5-18, and from side 524-5-04 of upper roof support shell member 524-5. Side 524-5-04 is the shorter side and side 524-5-05 is the longer side. Then side 524-5-05 makes 60° angles with sides 524-5-14 and 524-5-15; and side 524-5-04 makes 120° angles with side 524-5-14 and 524-5-15, to facilitate a hexagonal shaped roof. Upper roof support shell member 524-5 also comprises lower roof support shell connection members to enable coupling to corresponding lower roof support shell member 504-5. These connection members comprise connection fastening members 524-5-06 to 524-5-13 and lower roof support shell connection tabs 524-5-02 and 524-5-03, which connect into the corresponding connection points and connection grooves on lower roof support shell member 504-5.

Looking from front side 524-5-04, groove 524-5-21 is positioned to receive roof panel 507-2. As explained above, roof panel 507-2 slants towards upper roof support shell member 524-4. As shown in FIG. 5H, groove 524-5-21 is angled to maintain roof panel 507-2 in this slanted orientation, and ensure that the slant matches that of roof panel 507-1. Top surface 524-5-17 comprises two sections 524-5-17-1 and 524-5-17-2. The slant in section 524-5-17-2 matches the slant in section 524-6-17-1, so as to ensure that sections 524-5-17-2 and 524-6-17-1 are coplanar. Section 524-5-17-1 has a different slant to section 524-5-17-2 to ensure that the junction of upper roof support shell member 524-4 with side 524-5-14 is coplanar with the top surface of upper roof support shell member 524-4.

A detailed description of upper roof support shell member 524-4 is given below and with reference to FIG. 5I. FIG. 5I show views looking at the bottom surface 524-4-18, from side 524-4-04, and from side 524-04-14 of upper roof support shell member 524-4. Side 524-4-04 is the longer side, and side 524-4-05 is the shorter side. Then sides 524-4-14 and 524-4-15 make 60° angles with side 524-4-04 and 120° angles with side 524-4-05, so as to facilitate a hexagonal roof. For upper roof shell member 524-4, the lower roof support shell connection members comprise lower roof support shell connection fastening members 524-4-06 to 524-4-13 and lower roof support shell connection tabs 524-4-02 and 524-4-03. These connect into the corresponding connection points and connection grooves on lower roof support shell member 504-4. As shown in FIG. 5I, water drainage outlet 5H-07 is located on top surface 524-4-17 and extends from side 524-4-04 to side 524-4-05 to enable water to be drained away. In some embodiments, water drainage outlet 5H-07 slants from side 524-4-05 to side 524-4-04.

Looking at the front view of side 524-4-05, slot 524-4-16 is positioned to receive roof panel 507-2. As shown in FIG. 5I, slot 524-4-16 is angled to maintain roof panel 507-2 in a slanted orientation and therefore enable water to be drained into drainage outlet 5H-07.

One of skill in the art would understand that there are a variety of ways to realize upper roof support shell members 524-1 to 524-6. For example, in some embodiments, one or more of the upper roof support shell members comprise sloping sections in their top surfaces to ensure that water is drained into the roof panels and into water drainage outlet 5H-07.

Airlock

As shown in the alternative embodiment in FIG. 1, the door to the enclosure 100 is constructed using an airlock such as airlock 600. This serves the following purposes:

When control of the temperature of the interior of the enclosure is vital for the growth of the crops inside the enclosure, the airlock helps reduce heat loss to, or heat gain from the exterior of the enclosure.

So as to avoid users bringing in contaminants from the exterior of the enclosure, the airlock will be sufficiently large to, for example, allow users to change footwear or wear appropriate protective clothing to avoid or reduce contamination from the exterior of the enclosure.

Side and isometric views of an exemplary embodiment of the airlock is shown in FIG. 6. In FIG. 6, referring to the side view of airlock 600, it can be seen that airlock 600 comprises outer side 621, inner chamber 605, and inner side 625. Outer side 621 comprises outer door 601 attached to the outer door frame 607 via outer hinges 609. Inner side 625 comprises inner door 603 attached to the inner door frame 611 via inner hinges 613. As would be known to one of skill in the art, when outer door 601 opens, inner door 603 remains closed and vice versa. The temperature and/or pressure the inner chamber of the airlock 605 is controlled to enable the airlock to function. The inner side 625 is attached to lower roof support shell member 504-1, the pillars coupled to lower roof support shell member 504-1 and the lower floor support shell member coupled to these pillars. In this way, the airlock 600 is connected to the side of the enclosure 100 where the highest point of the roof panel 107-1 is located.

One of skill in the art would know that different types of airlocks to the one shown in FIG. 6 are also possible. In some embodiments, to avoid contamination from the exterior of the enclosure, the interior of the enclosure can be maintained at a higher air pressure compared to the exterior of the enclosure. Then the airlock can serve to ensure maintenance of this pressure differential using techniques known to those of skill in the art.

Subsystems

Figure 7:
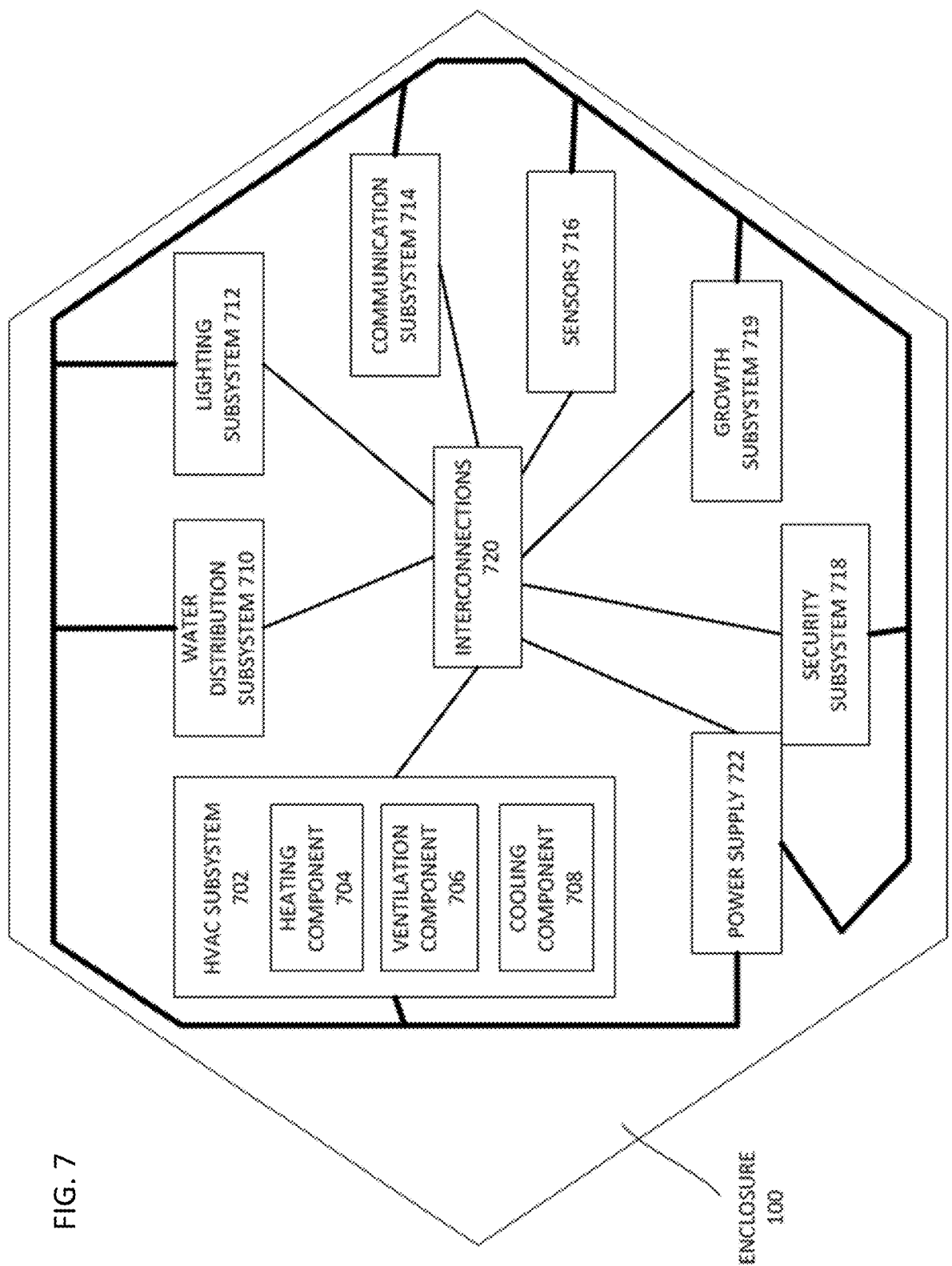
FIG. 7 illustrates one or more subsystems to facilitate the operation of an enclosure.

One or more subsystems used to facilitate the operation of enclosure 100 are detailed in FIG. 7. In FIG. 7, HVAC subsystem 702 comprises heating, ventilation and air conditioning components. The heating component 704 comprises heating devices and systems to heat the interior of the enclosure to a suitable ambient temperature. Examples of heating devices include, for example, a ceramic heater, space heating, gas-fired, propane and geothermal heating devices. In some embodiments, heating component 704 comprises heating systems which use excess heating produced by other buildings nearby. HVAC subsystem 702 enables homogenization and equal distribution of air flow to all the plants within the enclosure.

The ventilation component 706 comprises ventilation devices and systems to maintain the desired composition of air in the interior of the enclosure, and additionally assist in cooling as necessary. In some embodiments, the ventilation component 706 comprises a plurality of bee-wax piston-controlled vents are used to allow for passive venting. In some of the embodiments where the bee-wax piston-controlled vents are used, these bee-wax piston controlled vents are placed on opposite walls at different heights. In additional embodiments, the ventilation component 706 comprises an oscillating fan for active ventilation. In yet other embodiments, the ventilation component 706 comprises mechanical venting for cases where the enclosure exterior temperature is below a threshold temperature, for example 0° C. (32° F.). In yet other embodiments, the ventilation component 606 comprises oxygen and carbon recycling subsystems.

The cooling component 708 comprises cooling devices and systems to cool the interior of the enclosure to a suitable ambient temperature. The cooling component 708 includes, for example, air-conditioning (AC) devices and systems and fans. As explained above, the ventilation component 706 may additionally assist with cooling.

Water distribution subsystem 710 plays the role of ensuring that an appropriate amount of water is supplied to enclosure 100 to enable proper crop growth, and that wastewater is appropriately drained or removed from enclosure 100. Water distribution subsystem 710 comprises, for example, pipes, valves, tubes, pumps, taps, water purification units and other devices and systems necessary to ensure proper supply of water and removal of wastewater.

Figure 8A:
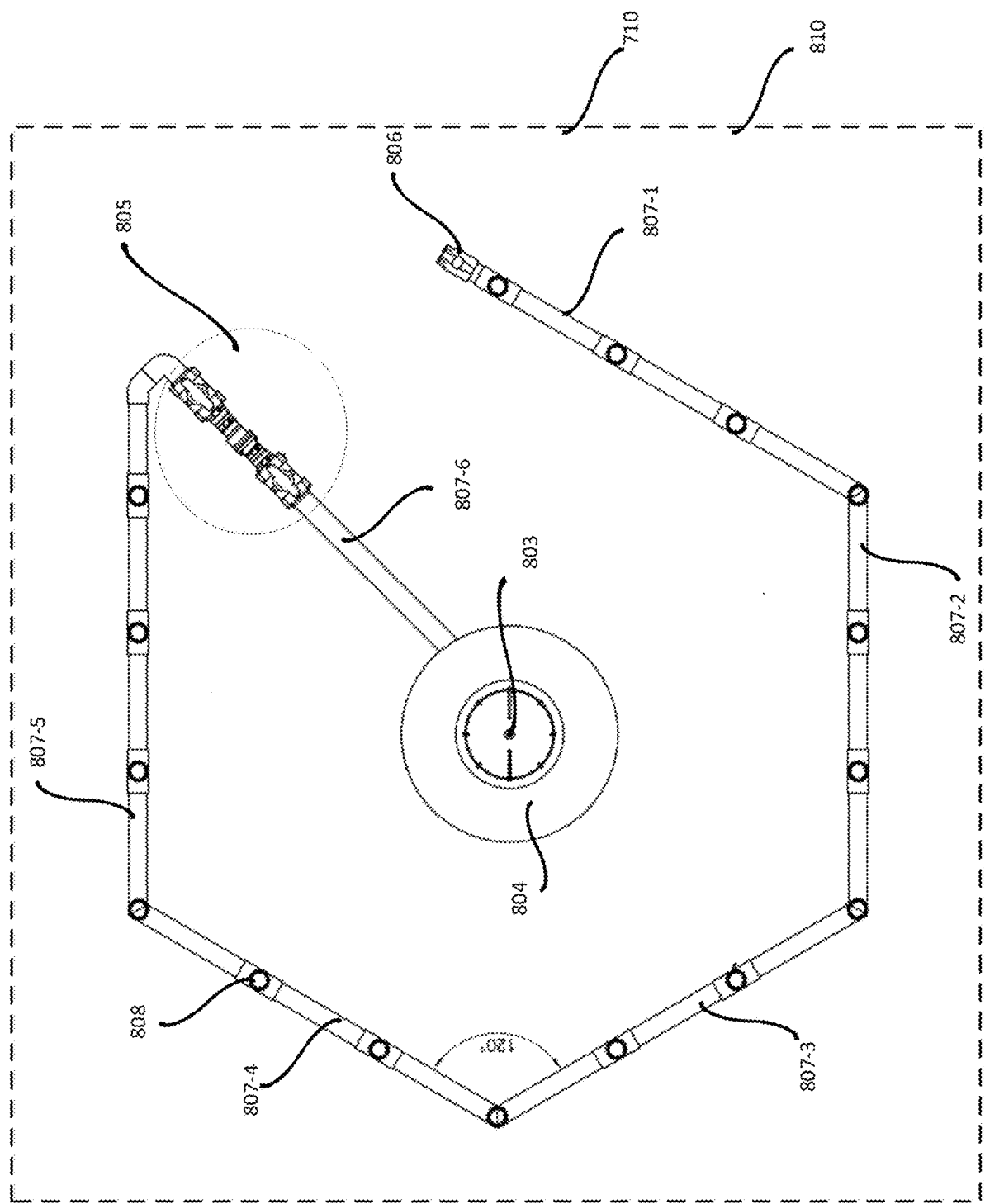
FIGS. 8A and 8B illustrate a lower water return distribution subsystem for an enclosure.
Figure 8B:
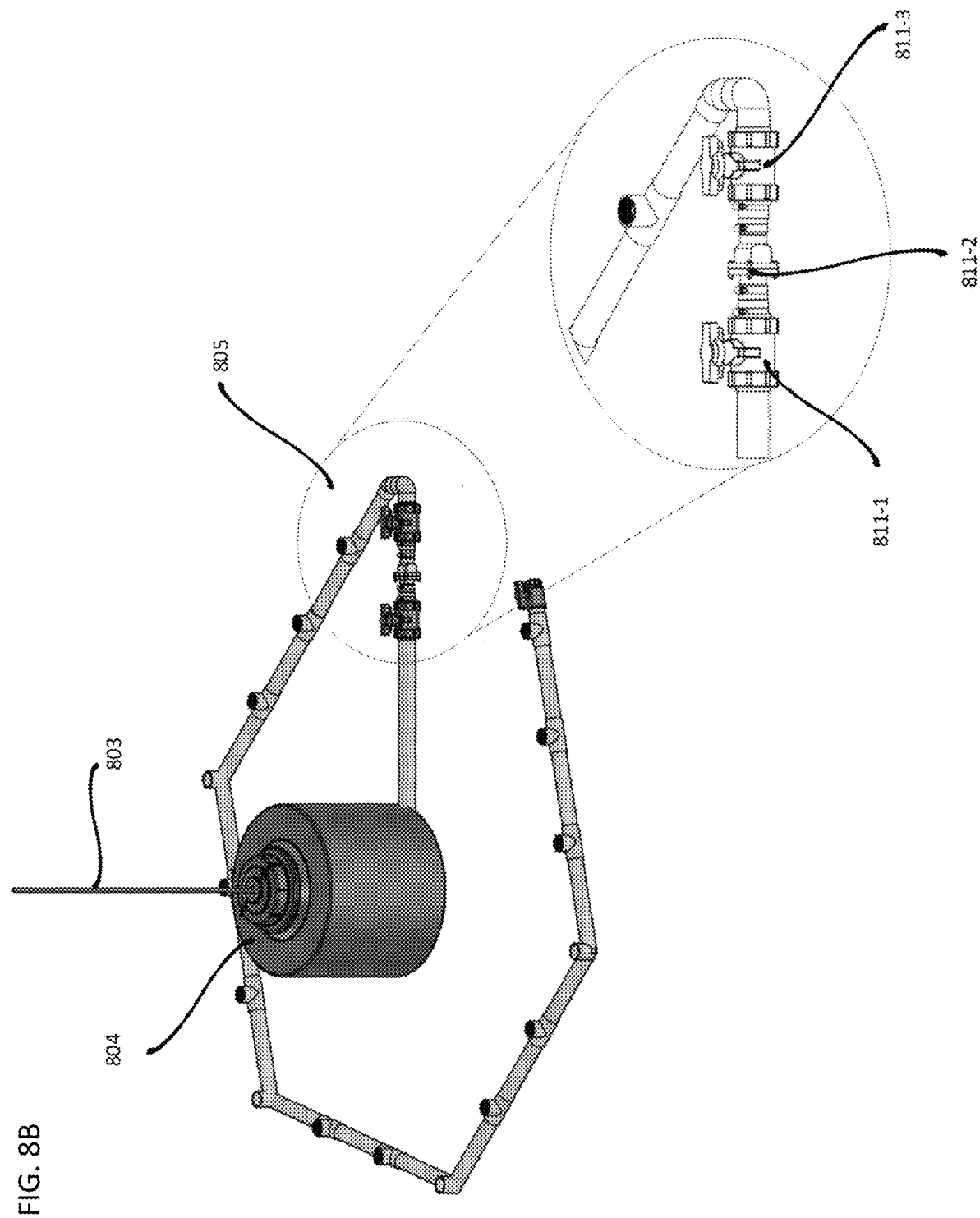
Figure 8C:
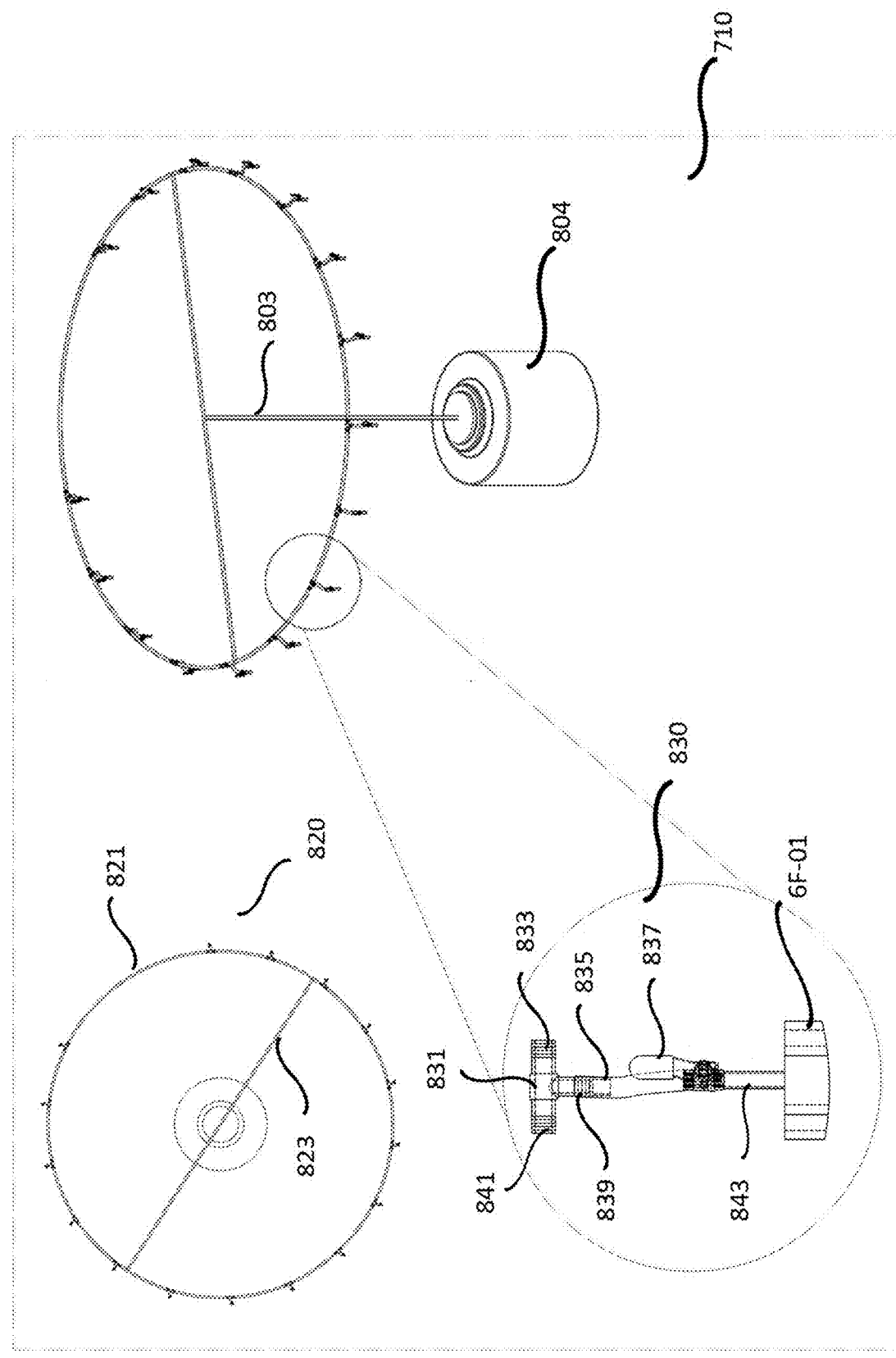
FIG. 8C illustrates an upper water return distribution subsystem for an enclosure.

FIGS. 8A, 8B and 8C show detailed illustrations of an embodiment of a water distribution subsystem 710 comprising a lower water return distribution subsystem 810 and an upper water return distribution subsystem 820. As shown in FIGS. 8A and 8B, the lower water return distribution subsystem 810 comprises a water tank 804 having a sump pump to distribute water through a pipe 803 that runs vertical to upper water return distribution subsystem 820. The water tank 804 has, for example, a capacity of 15-30 gallons (56.7 to 113.6 litres). Then as shown in FIG. 8B the bottoms of the towers are connected to the return water pipe 806 via connections such as outlet 808. The return water pipe 806 comprising segments 807-1 to 807-5 is configured to conform to the shape of the enclosure, that is, the segments are coupled to each other to form a hexagon shape, and have angles of 120° with each other. For example, as shown in FIG. 8A, return water pipes 807-3 and 807-4 have an angle of 120° with each other. In some embodiments, the return water pipes have a unidirectional flow control system. For example, as shown in FIG. 8A, unidirectional flow control system 805 maintains unidirectional flow of water into central tank 804. In some embodiments, as shown in FIG. 8B, the unidirectional flow control system 805 comprises a ball valve 811-1 followed by a check valve 811-2 followed by a ball valve 811-3 which connects back to the water tank 804. The water tank 804 will have a connector for tubing to connect to an external water source to fill up the tank without having to enter enclosure 100. An example of an external water source is, for example, an external water supply or the receptacle used to collect the water drained away via water drainage outlet 5H-07 in FIG. 5E.

An exemplary embodiment of the upper water return distribution subsystem 820 is shown in FIG. 8C. Water from pipe 803 is fed into pipe 823 and subsequently into upper distribution pipe 821. While upper distribution pipe 821 is shown to be circular, one of skill in the art would know that pipe 821 can take any shape to allow for distribution of water to the towers within the enclosure 100. A plurality of water feed subsystems are attached to pipe 821. A detailed view of a water feed subsystem 830 to feed water into tower 6F-01 is shown in FIG. 8C. Water feed subsystem 830 comprises inlets 833 and 841 to enable coupling to upper distribution pipe 821 and water to enter feed subsystem 830. Water then enters upper T-pipe connection 831 which is connected to flexible hose 835 at end 839. The other end of flexible hose 835 is coupled to ball valve 837. Ball valve 837 enables water flow into tower 6F-01 while in an ON state and disables water flow into tower 6F-01 while in an OFF state. While in an ON state, water is directed to tower 6F-01 from ball valve 837 via flexible hose 843. The water exits a tower such as tower 6F-01 via an outlet such as outlet 808.

Figure 9:
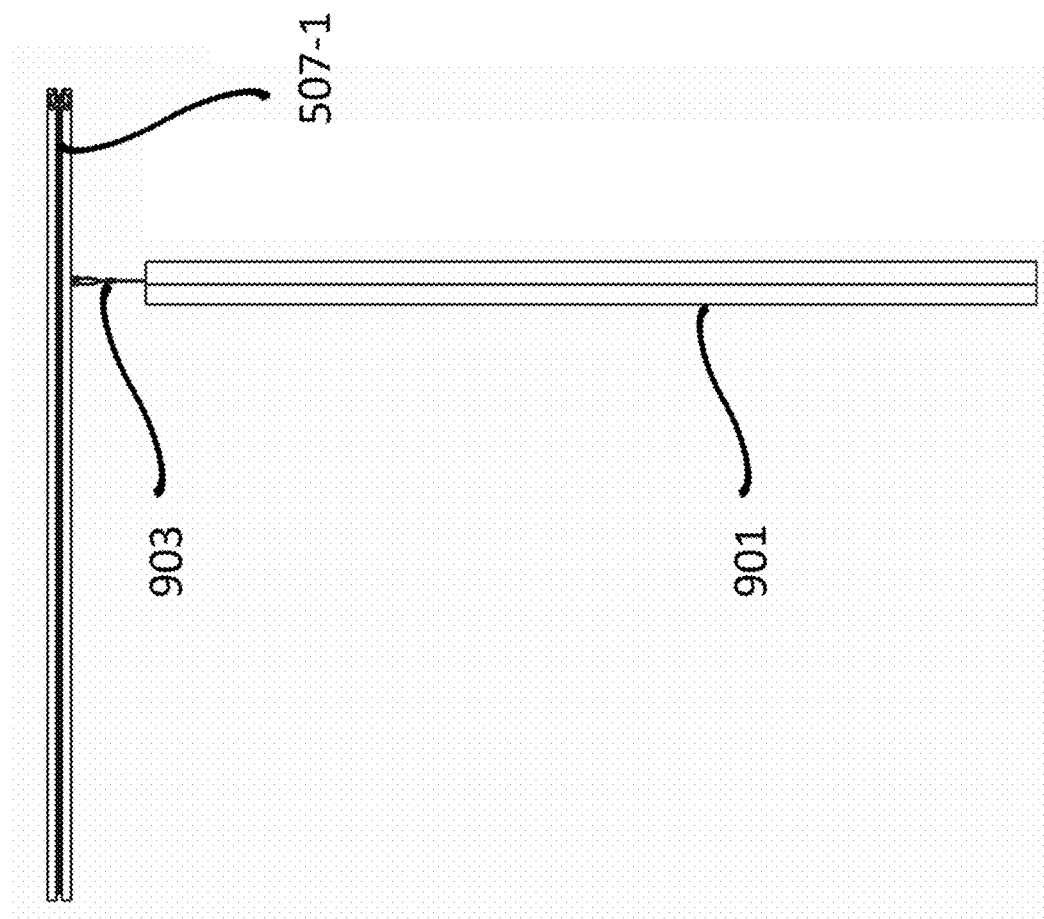
FIG. 9 illustrates a light emitting diode (LED) for an enclosure.

Lighting subsystem 712 comprises devices and systems necessary to provide sufficient illumination to ensure proper crop growth and also for one or more users 105 to work within the enclosure 100. In some embodiments, lighting subsystem 612 comprises light emitting diodes (LED) spectrum lighting of 4 to 6 feet (1.21 to 1.83 m) in length. FIG. 9 illustrates a detailed embodiment of an LED 901 in enclosure 100. In some embodiments, LEDs are suspended from either set of inner beams 511 or roof panels 507-1 and 507-2. As shown in FIG. 9, LED 901 is attached to roof panel 507-1 via attachment 903.

Communication subsystem 714 enables the subsystems and components of enclosure 100 to communicate with devices, systems and networks external to enclosure 100. Communications subsystem 714 allows for reception and transmission of communications via at least one of wired and wireless communications technologies using systems and methods known to those of skill in the art. This includes communications using various available network technologies including, for example, Campus Area Network (CAN), Local Area Network (LAN), BLUETOOTH®, Wi-Fi, Near Field Communications (NFC), Radio Frequency Identification (RFID), 3G, Long Term Evolution (LTE), 5G, Universal Serial Bus (USB) and other protocols known to those of skill in the art.

Sensors 716 are responsible for detecting environmental conditions both inside and outside the enclosure 100. Examples of sensors 716 include:
pH sensors,
electrical conductivity sensors to perform water tests and determine nutrient concentrations,
enclosure interior temperature sensors,
enclosure exterior temperature sensors,
humidity sensors,
water level and flow rate sensors,
nutrient level and rates of change sensors,
lighting level sensors,
carbon dioxide ($CO_2$) level sensors,
door open/closed sensors,
power consumption sensors,
solar condition sensors,
wind condition sensors,
battery level sensors, and
generator fuel level sensors.

Security subsystem 718 is utilized to help secure enclosure 100 against unwanted intruders such as thieves or animals. Security subsystem 718 comprises one or more security devices and subsystems such as cameras, alarms, motion sensors, intruder detection subsystems, electrified fences, door locking systems.

Growth subsystem 719 concerns the equipment necessary to ensure proper growth of the hydroponic crops within enclosure 100. This may include, for example, nutrient delivery systems and the towers. The towers have been previously described above. In some embodiments, these are optimized for the hexagonal shape of the enclosure.

As previously explained, enclosure 100 has a plurality of towers. In some embodiments, at least one of this plurality of towers is shaped cylindrically. In other embodiments, at least one of this plurality of towers is shaped hexagonally.

Figure 10A:
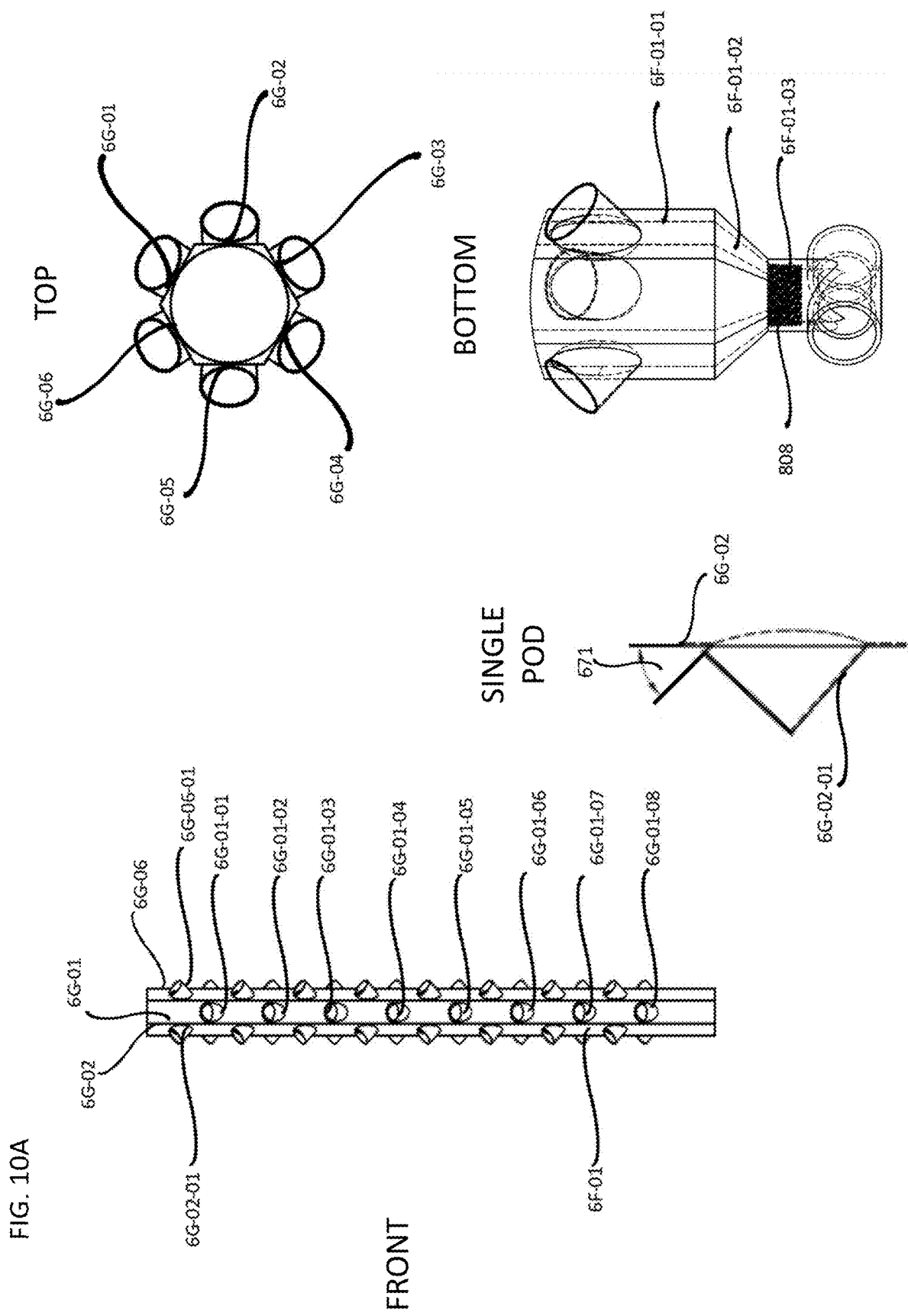
FIG. 10A illustrates the top, front and bottom of a tower; and a single pod of a tower.

FIG. 10A shows a detailed illustration of the top, the front, bottom of tower 6F-01, and a single pod 6G-02-01. As can be seen from FIG. 10A, tower 6F-01 is shaped hexagonally and comprises six (6) surfaces 6G-01 to 6G-06. The surfaces are arranged such that each surface is at a 120° angle to the adjoining surfaces, thereby providing a hexagonal shape to tower 6F-01. For example, surface 6G-01 is at a 120° angle to adjoining surfaces 6G-02 and 6G-06.

As is shown in FIG. 10A, tower 6F-01 comprises a plurality of pods such as pods 6G-02-01 and 6G-06-01. Individual plants are placed into each of the plurality of pods. As is further shown in FIG. 10A, in some embodiments, the plurality of pods is divided into groups, and each group of pods is arranged on the outside of one of the surfaces. For example, in FIG. 11A, surface 6G-01 comprises pods 6G-01-01 to 6G-01-08. In other embodiments, the pods are oriented at an angle to the surface that they are located on. A detailed example is shown using pod 6G-02-01. For example, pod 6G-02-01 is oriented at an angle 671 to surface 6G-02. In some embodiments, angle 671 falls within an optimal range, that is, between a minimum value and a maximum value. If angle 671 exceeds the maximum value, then the pod 6G-02-01 is not supported correctly. If angle 671 is less than the minimum value, this reduces the amount of pods that can be placed on the surface.

The bottom 6F-01-01 of tower 6F-01 is also shown in FIG. 10A. With reference to FIG. 8A and FIG. 10A, 6F-01-01 is coupled to outlet 808 of pipe 806 via cone connection 6F-01-02 and threaded connection 6F-01-03. The tower is sufficiently light to enable it to be screwed into outlet 808.

In some embodiments, the tower is comprised of a plurality of sections. Then, prior to use, the tower must be assembled. An example embodiment is shown in FIG. 10B. In FIG. 10B, tower 1001 is comprised of a plurality of sections comprising sections 10B-01, 10B-02 and 10B-03. 10B-01 is the lowest section of the tower, and it must be attached to the lower return water pipe by being screwed in as previously described. Then next section 10B-02 is connected to section 10B-01, section 10B-03 is connected to section 10B-02 until the tower assembly is complete.

FIG. 10C shows a combination of towers and lighting in enclosure 100. In some embodiments, each tower is associated with an LED. For example, in FIG. 10C, LED 901 is associated with tower 6F-01. Then LED 901 provides sufficient light for the plants in the pods in tower 6F-01 to grow. Also in FIG. 10C, a plurality of towers 10C-01 together with a plurality of LEDs 10C-03, wherein each LED is proximate to one of the plurality of towers, is shown.

Interconnections 720 electrically couples the subsystems and components of enclosure 100. Interconnections 720 allows for signals other than power to be transmitted between the subsystems as necessary.

Enclosure 100 is powered using the power supplied by power supply 722. Power supply 722 powers the other subsystems of enclosure 100 including HVAC subsystem 702, water distribution subsystem 710, lighting subsystem 712, communication subsystem 714, sensors 716 and security subsystem 718. In some embodiments, the power supply 722 comprises at least one renewable power source such as solar, wind or geothermal power. In some of the embodiments where the power supply comprises power drawn from solar energy, power is drawn from solar panels placed on the roof 110. In some of the embodiments where the power supply 722 comprises power drawn from wind energy, the power is drawn from wind turbines. In some other embodiments, the power supply 722 comprises at least one non-renewable power source such as a diesel power generator. In further embodiments, the power supply 722 comprises a connection to a power grid to draw power from a power grid. In yet other embodiments, the power supply 722 comprises at least one primary and at least one secondary source. Then, if the at least one primary source supplies insufficient power, power is drawn from the at least one secondary source. In yet other embodiments, the power supply 722 comprises at least one battery. In some of these embodiments, the at least one battery is rechargeable to allow storage of surplus power. This is useful in, for example, environments where the power source is intermittent. For example, if the enclosure 100 is supplied using solar power, then during times when more solar power than necessary for the operation of the enclosure is generated, the at least one battery is charged using the surplus power. Then if insufficient solar power is generated, power can be drawn from the at least one battery to supply the enclosure. A similar arrangement can be used for other power sources such as wind power.

Assembly of Enclosure

Figure 11:
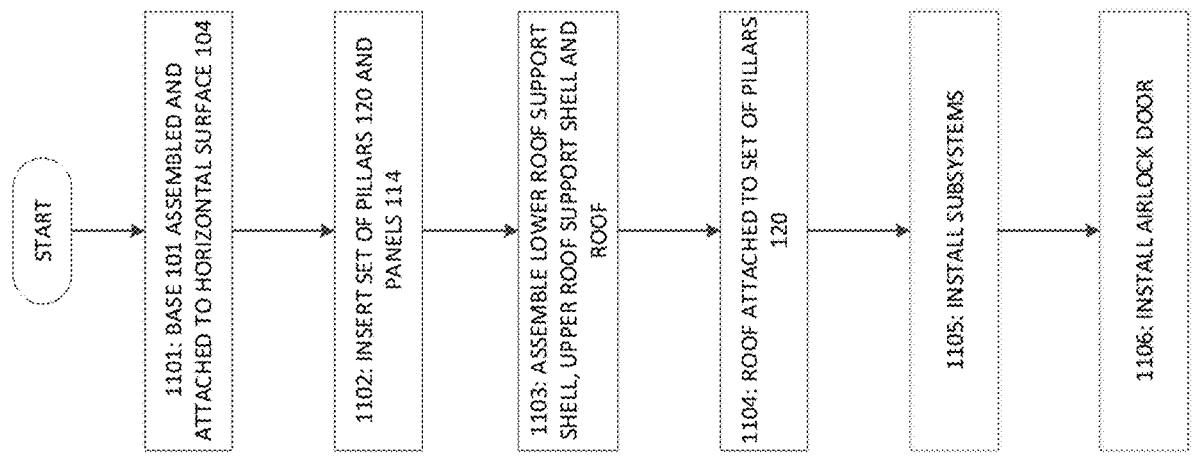
FIG. 11 illustrates a flowchart for assembling an enclosure.

The enclosure 100 is designed to be modular, meaning that the individual components described above can be transported to and then assembled in a location as necessary. FIG. 11 shows a flowchart for assembling enclosure 100.

In step 1101, base 101 is assembled and attached to surface 104. Assembly of the base 101 is demonstrated with reference to FIG. 12 and FIGS. 1, 2A, 2B 2C, 3A, 3B and 13.

Figure 12:
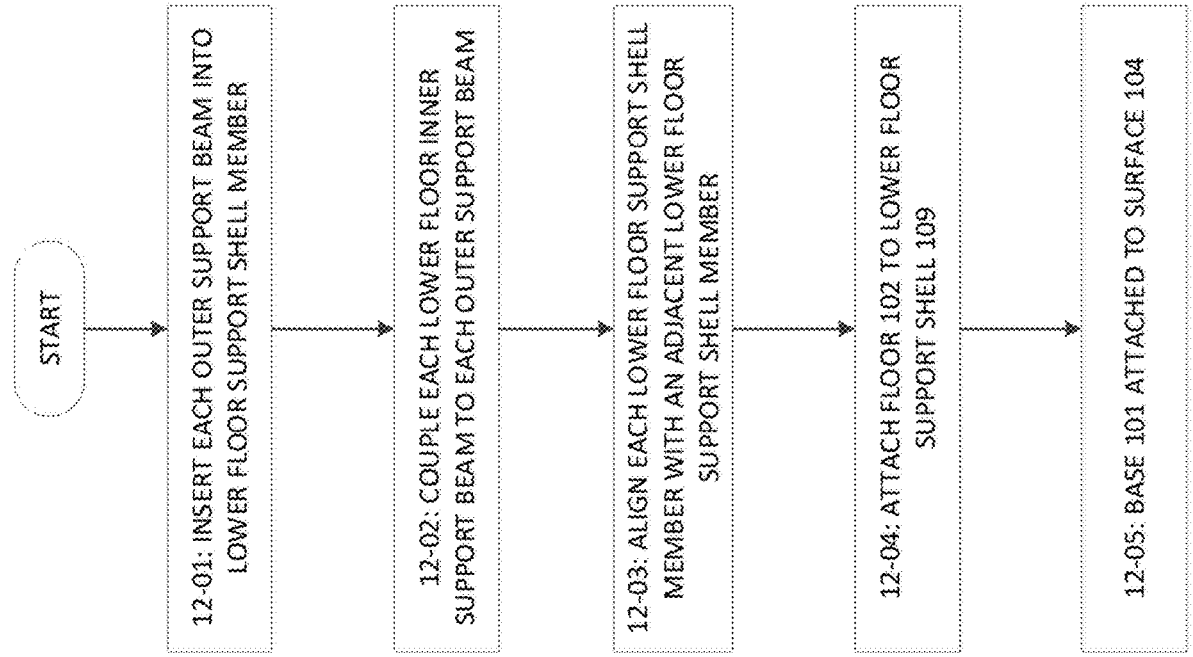
FIG. 12 illustrates a flowchart for assembly of a base of an enclosure.

With reference to FIG. 12, the assembly of lower floor support shell 109 comprises steps 12-01 to 12-03. In step 12-01 of FIG. 12, referring back to FIG. 2A, each of the set of outer support beams 115 is inserted into the lower floor support shell member that will encase it. For example, outer support beam 116-1 is inserted into lower floor support shell member 117-1, outer support beam 116-2 is inserted into lower floor support shell member 117-2, and so on.

In step 12-02 of FIG. 12, referring back to FIG. 2A, each of the set of lower floor inner beams 113 is coupled to each of the set of outer beams via insertion into an inner beam connection member. For example, with reference to FIGS. 2A and 3A. one of set of lower floor inner beams 113 is inserted into opening 3C-31 of lower floor support shell member 117-1 and coupled to outer support beam 116-1.

Figure 13:
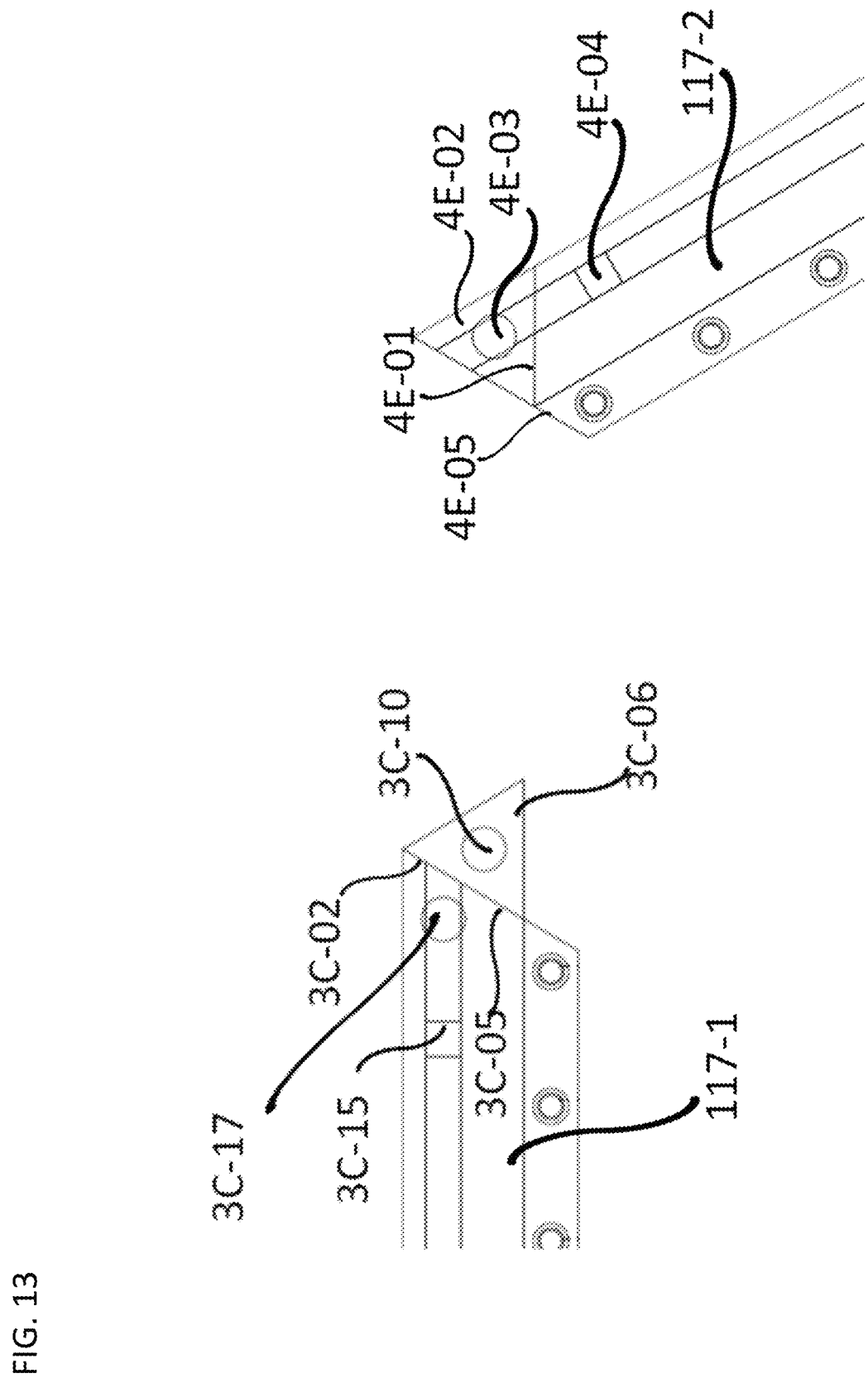
FIG. 13 illustrates an example of alignment of a lower floor support shell member with an adjacent lower floor support shell member.

In step 12-03 of FIG. 12 each of the lower floor support shell members is aligned with an adjacent lower floor support shell member. This is performed by positioning an extrusion either above or below the corresponding extrusion from an end of the shell member to be coupled to. In this way, the openings belonging to the pillar insertion receiving members are in vertical alignment to form a pillar connection member. An example is demonstrated with reference to FIG. 13. In FIG. 13 shell member 117-2 has end 4E-01. End 4E-01 comprises extrusion 4E-02 with pillar insertion receiving member 4E-03. End 4E-01 also comprises edge 4E-05. Pillar insertion receiving member 4E-03 comprises an opening and a space for insertion of a pillar fastening member. Edge 4E-05 of shell member 117-2 is aligned with edge 3C-05 of shell member 117-1. Since extrusion 4E-02 is lower relative to extrusion 3C-06, it is positioned below extrusion 3C-06, thereby allowing the opening belonging to pillar insertion receiving member 3C-10 to be vertically aligned with the corresponding opening belonging to pillar insertion receiving member 4E-03 to form a pillar connection member. This is performed for all the shell members, to partially assemble lower floor support shell 109.

In step 12-04, floor 102 is attached to the partially completed lower floor support shell 109. This is explained with reference to FIGS. 2A, 2B 2C, and 3A. Floor panels 105-1 and 105-2 are connected at connection point 104, and each of the set of inner beams 113 are accommodated within the cut-out spaces 107-1 to 107-4 and connection point 104. Then, each side 103-1 to 103-6 of floor 102 is attached to the lower floor support shell members 117-1 to 117-6 of lower floor support shell 109 respectively. As previously explained, with reference to FIGS. 2B and 3A if, for example lower floor support shell member 117-1 is to be coupled to side 103-1, then:

The floor connection members on side 103-1, that is, connection points 103-1-1 to 103-1-10 are vertically aligned with floor connection members 3C-20 to 3C-29;

Floor fastening members are inserted into these aligned connection points and connection members to enable a strong coupling between side 103-1 and lower floor support shell member 117-1.

The same operation is performed for the remaining members 117-2 to 117-6 and the other sides 103-2 to 103-6 to complete the coupling of floor 102 to the lower floor support shell 109.

In step 12-05, with reference to FIG. 1, base 101 is attached to surface 104.

In step 1102, with reference to FIG. 1, the set of pillars 120 and panels 114 are inserted. Pillar and panel insertion is demonstrated with reference to FIG. 14; and FIGS. 2A, 3A, 4A, 4B, 4C and 15, for the case where a pillar is to be placed at the coupling of shell members 117-1 and 117-2.

Figure 14:
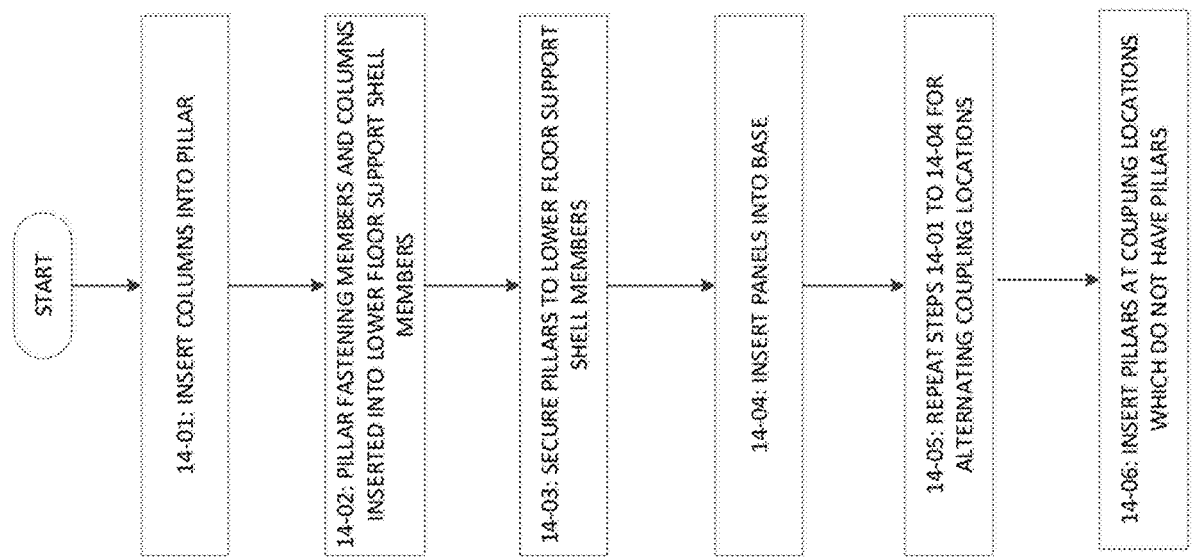
FIG. 14 illustrates a flowchart for insertion of a set of pillars and a set of panels.

In step 14-01 of FIG. 14, referring to FIG. 4B, columns 451 and 453 are inserted into pillar 401. For column 451, this comprises inserting column 451 into space 435 via either opening 443 or 423, so that it protrudes from top surface 403 and bottom surface 405. Similarly, for column 453, this comprises inserting column 453 via either opening 445 or 425 into space 437 so that it protrudes from top surface 403 and bottom surface 405.

Figure 15:
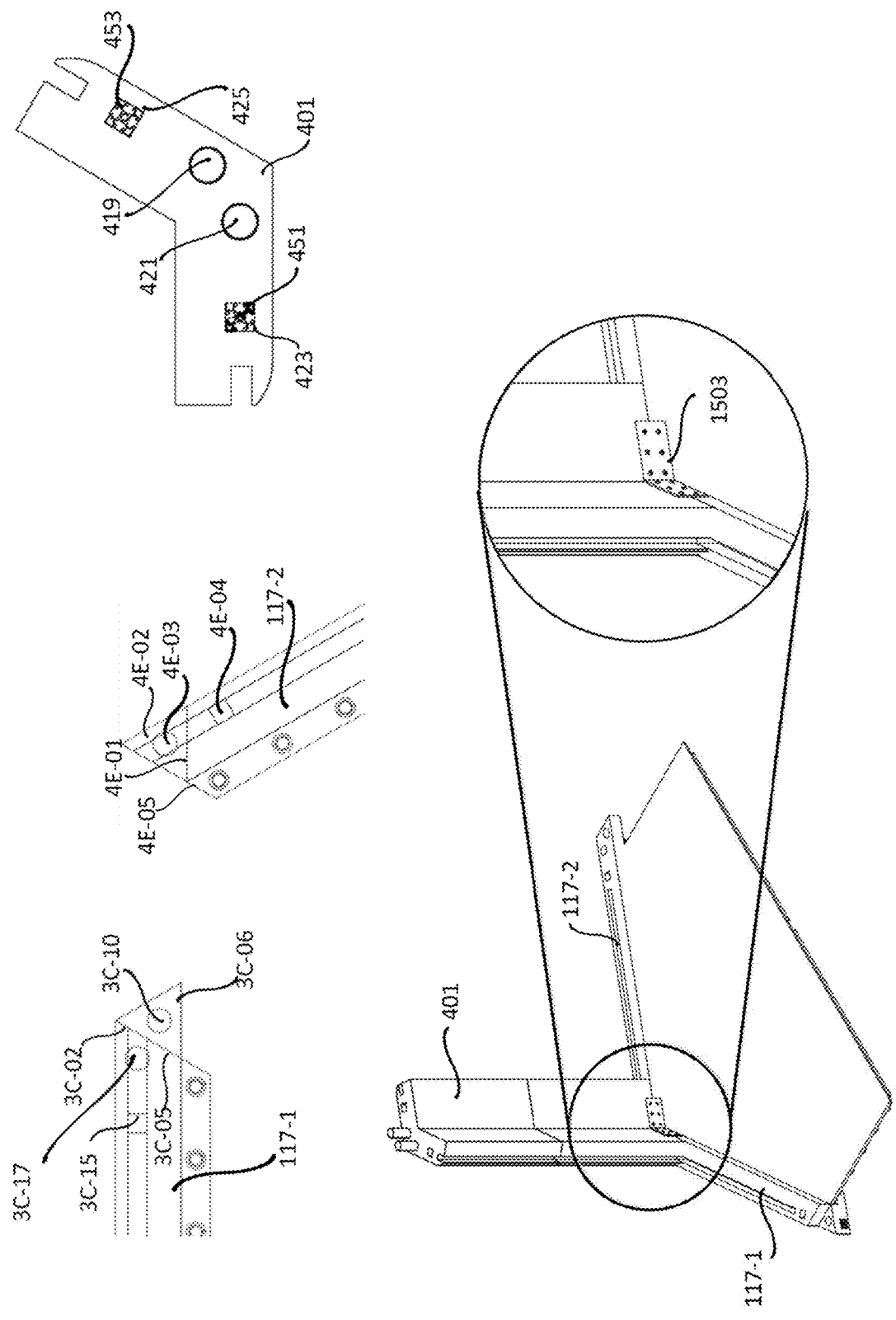
FIG. 15 illustrates a securing member to secure a pillar to lower floor support shell members.

In step 14-02 of FIG. 14, the pillar fastening members and columns are inserted into lower floor support shell members 117-1 and 117-2. This comprises inserting the pillar fastening members into the corresponding pillar connection members, and the columns into the corresponding column connection members, belonging to shell members 117-1 and 117-2. Referring to FIG. 15, the inserting of the pillar fastening members comprises inserting dowel 421 of pillar 401 into the opening which is part of pillar connection member 3C-17, so that dowel 421 occupies the space which is part of member 3C-17. Similarly, dowel 419 is inserted into the pillar connection member formed by the aligned openings belonging to members 3C-10 and 4E-03. The inserting of the columns comprises inserting columns 451 and 453 into column connection members 3C-15 and 4E-04 of shell members 117-1 and 117-2 respectively, to enable coupling to the corresponding outer support beams. As explained at the end of step 14-01, the column 451 will be protruding from opening 423. Then, this column 451 is inserted into column connection member 3C-15 of shell member 117-1, so as to enable column 451 to contact outer support beam 116-1 for coupling. Similarly, column 453 is inserted to occupy the space belonging to column connection member 4E-04 and enable contact with outer support beam 116-2 for coupling.

Step 14-03 of FIG. 14 comprises securing the pillar to the lower floor support shell members. This comprises:
Coupling the two columns 451 and 453 with outer support beams 116-1 and 116-2 using techniques known to those of skill in the art, such as screws; and
As shown in FIG. 15, a securing member such as base plate 1503 is used to secure the pillar 401 to the lower floor support shell members 117-1 and 117-2; and couple lower floor support shell members 117-1 and 117-2 together.

In step 14-04 of FIG. 14, panels are inserted into the base. An example is shown with reference to panel 115-1 of FIG. 4C, pillar 401 as shown in FIG. 4A, and the lower floor support shell member 117-1 as shown in FIG. 3A. Side 115-1-2 of panel 115-1 of FIG. 4C is inserted into groove 431 via opening 439 on top surface 403, and is slid through opening 427 on bottom surface 405, such that side 115-1-3 is inserted into the panel insertion space 3C-33 on member 117-1. Similarly, another panel is inserted into groove 433 via opening 441 on top surface 403 and is slid through opening 429 on bottom surface 405 into the panel insertion space corresponding to member 117-2.

In step 14-05 of FIG. 14, steps 14-01 to 14-04 are repeated for alternating coupling locations of lower support shell members. For example, with reference to FIG. 2A, steps 14-01 to 14-04 are repeated at:
the coupling location of lower support shell members 117-3 and 117-4; and
the coupling location of lower support shell members 117-5 and 117-6.

In step 14-06 of FIG. 14, pillars are inserted at the coupling locations which do not have pillars. For example, with reference to FIG. 2A, the coupling locations of lower support shell members which do not have pillars are:
117-2 and 117-3,
117-4 and 117-5, and
117-6 and 117-1.

Step 14-06 of FIG. 14 entails repeating step 14-01, then sliding the pillars such that the panels are inserted into the grooves of the pillars, then finally repeating steps 14-02 and 14-03 to couple the pillars to the lower support shell members.

In step 1103, the lower roof support shell 503, upper roof support shell 505 and roof 110 is assembled. Assembly of the lower roof support shell 503, upper roof support shell 505 and roof 110 is demonstrated with reference to FIGS. 5A-5I and 16.

In step 16-01, a lower roof shell outer beam is inserted into each lower roof support shell member. For example, with reference to FIGS. 5B, 5C and 5D, lower roof outer support beam 505-1 is inserted into lower roof support shell member 504-1 via opening 504-1-18A to occupy space 504-1-18. This is repeated for all lower roof support shell members 504-1 to 504-6 and each of the set of outer beams 515.

In step 16-02, each of the upper roof support shell members is coupled to a corresponding one of the lower roof support shell members. This is performed using the lower roof support shell connection members of each lower roof support shell member. For example, with reference to FIGS. 5C, 5D and 5F, upper roof support shell member 524-1 is coupled to lower roof support shell member 504-1 by:
Coupling 524-1-06 to 524-1-13 to lower roof support shell connection points 504-1-20 to 504-1-27; and
Inserting tabs 524-1-02 and 524-1-03 into lower roof support shell connection grooves 504-1-9 and 504-1-10.

Similarly, upper roof support shell member 524-2 is coupled to lower roof support shell member 504-2, upper roof support shell member 524-3 is coupled to lower roof support shell member 504-3, and so on.

In step 16-03, referring to FIG. 5B, some of the set of inner beams 511 are coupled to the outer beams related to the first portion of the upper roof support shell 517-1. The first portion of the upper roof support shell 517-1 comprises upper roof support shell members 524-1, 524-2 and 524-6. Then, the corresponding lower roof shell support members are members 504-1, 504-2 and 504-6, which encase outer beams 505-1, 505-2 and 505-6. Then, these outer beams are related to first portion 517-1. The inner beams are inserted into inner beam connection members such as member 504-1-40, then coupled to the outer beams.

In step 16-04, referring to FIG. 5A, roof panels 507-1 and 507-2 are coupled together.

Figure 17:
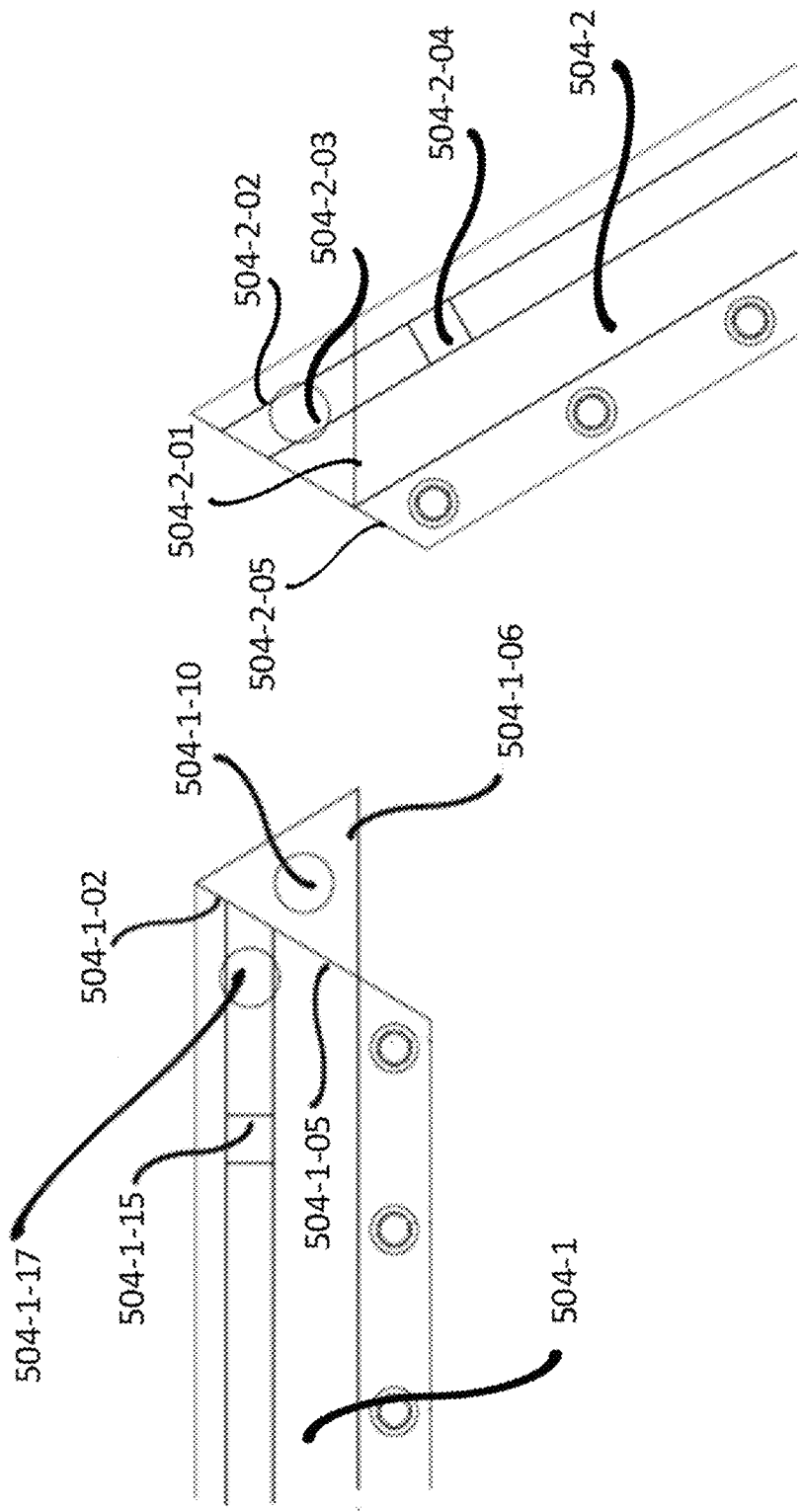
FIG. 17 illustrates an example of alignment of a lower floor support shell member with an adjacent lower floor support shell member.

In step 16-05, referring to FIG. 5E, the lower roof shell members which are coupled to the first portion of the upper roof support shell 517-1 are aligned. Then, lower roof shell support member 504-1 is aligned with member 504-2, and member 504-6 is aligned with member 504-1. Alignment is demonstrated with reference to FIG. 17 for members 504-1 and 504-2. Edge 504-2-05 of shell member 504-2 is aligned with edge 504-1-05 of shell member 504-1-1. Since extrusion 504-2-02 is higher relative to extrusion 504-1-06, it is positioned above extrusion 504-1-06. Then the opening belonging to lower support connection member 504-1-10 is aligned with the corresponding opening belonging to connection member 504-2-03.

In step 16-06, referring to FIGS. 5A and 5E, roof panel 507-1 is inserted into the grooves of the upper roof shell support members 524-1, 524-2 and 524-6 comprising the first portion 517-1 of the upper roof support shell 505. As explained previously, this ensures that the roof panels are slanted.

In step 16-07, referring to FIGS. 5B and 5E, roof panel 507-2 is inserted into the grooves of the upper roof shell support members 524-3, 524-4 and 524-5 which are part of the second portion 517-2 of the upper roof support shell 505.

In step 16-08, similar to step 16-03, the remaining uncoupled inner beams are coupled to the outer beams related to the second portion 517-2. That is, the remaining uncoupled inner beams are coupled to outer beams 505-3, 505-4 and 505-5 corresponding to lower roof support shell members 504-3, 504-4 and 504-5 respectively.

In step 16-09, referring to FIG. 5E, the lower roof shell members which are coupled to the second portion of the upper roof support shell 517-2 are aligned with each other in a similar fashion to that described in step 16-05. Then, lower roof shell support member 504-3 is aligned with member 504-4, and member 504-4 is aligned with member 504-5. As part of this process, lower roof shell members at the boundary of the first portion 517-1 and second portion 517-2 are aligned with each other. For example, lower roof shell member 524-6 is aligned with lower roof shell member 524-5, and lower roof shell member 524-3 is aligned with lower roof shell member 524-2.

Figure 16:
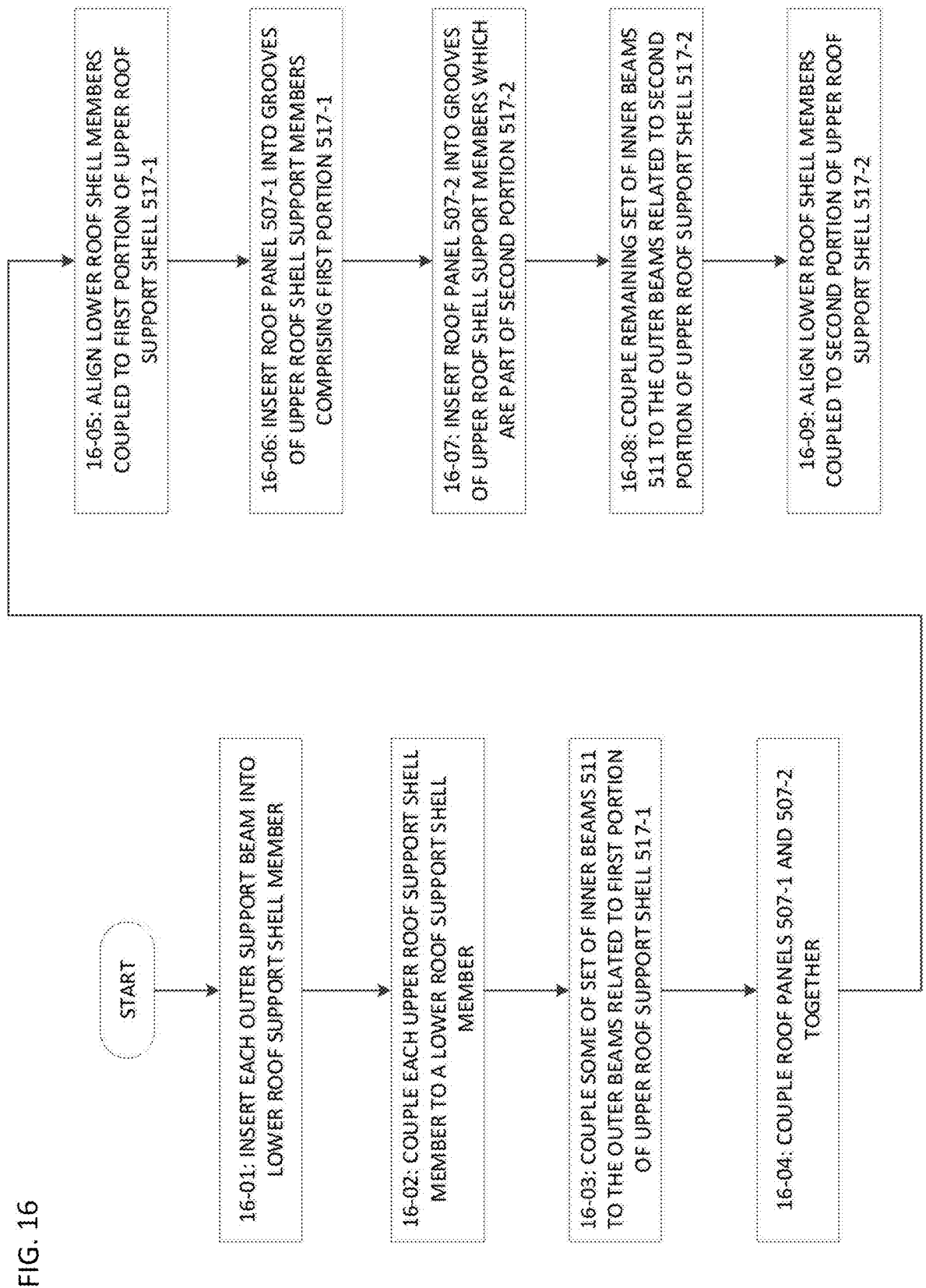
FIG. 16 illustrates a flowchart for assembly of a lower roof support shell, upper roof support shell and a roof.

One of skill in the art would know that there are a variety of ways of carrying out the process demonstrated in FIG. 16. For example, in some embodiments, steps 16-01, 16-02 and 16-04 are performed first.

In step 1104, roof 110 is coupled to the set of pillars 120. This entails coupling each individual pillar to two adjacent lower roof support shell members. An example process for coupling a pillar 401 to adjacent lower roof support shell members 504-1 and 504-2 is demonstrated in FIG. 18 and FIGS. 4B, 4C, 5C and 19.

Figure 18:
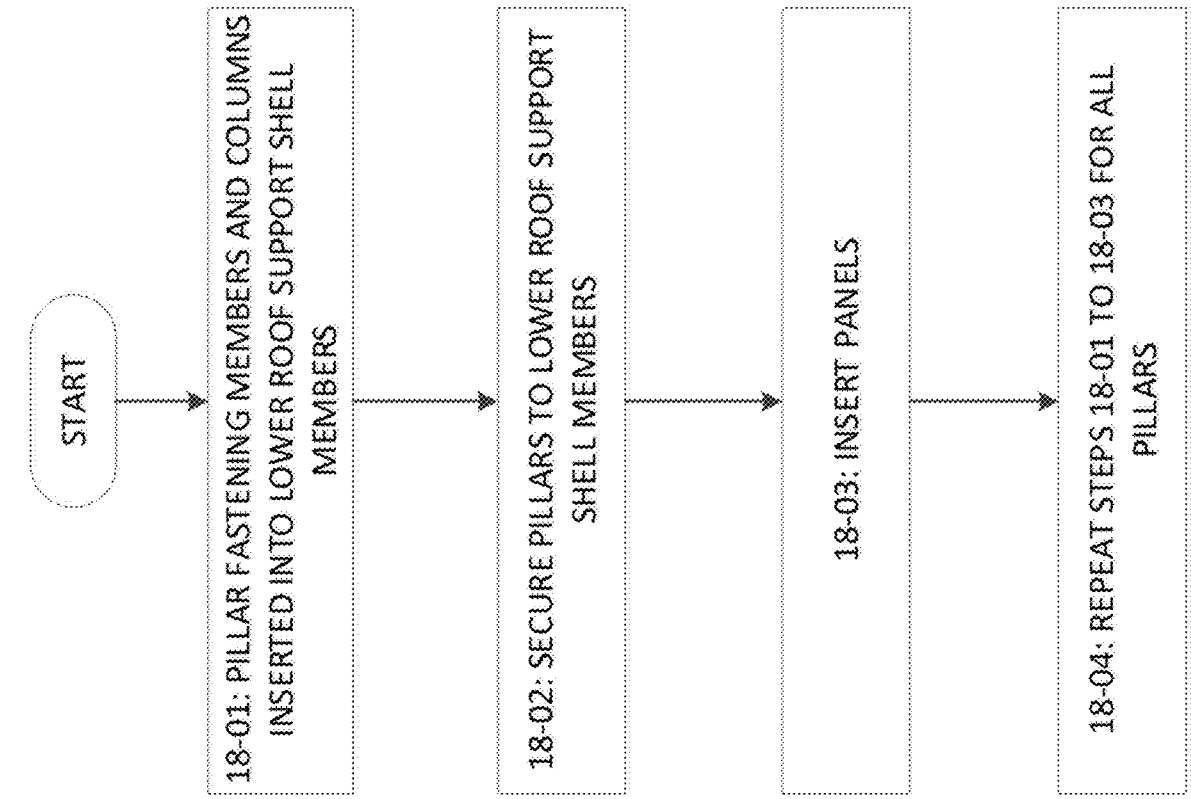
FIG. 18 illustrates a flowchart for coupling a pillar to lower roof support shell members.
Figure 19:
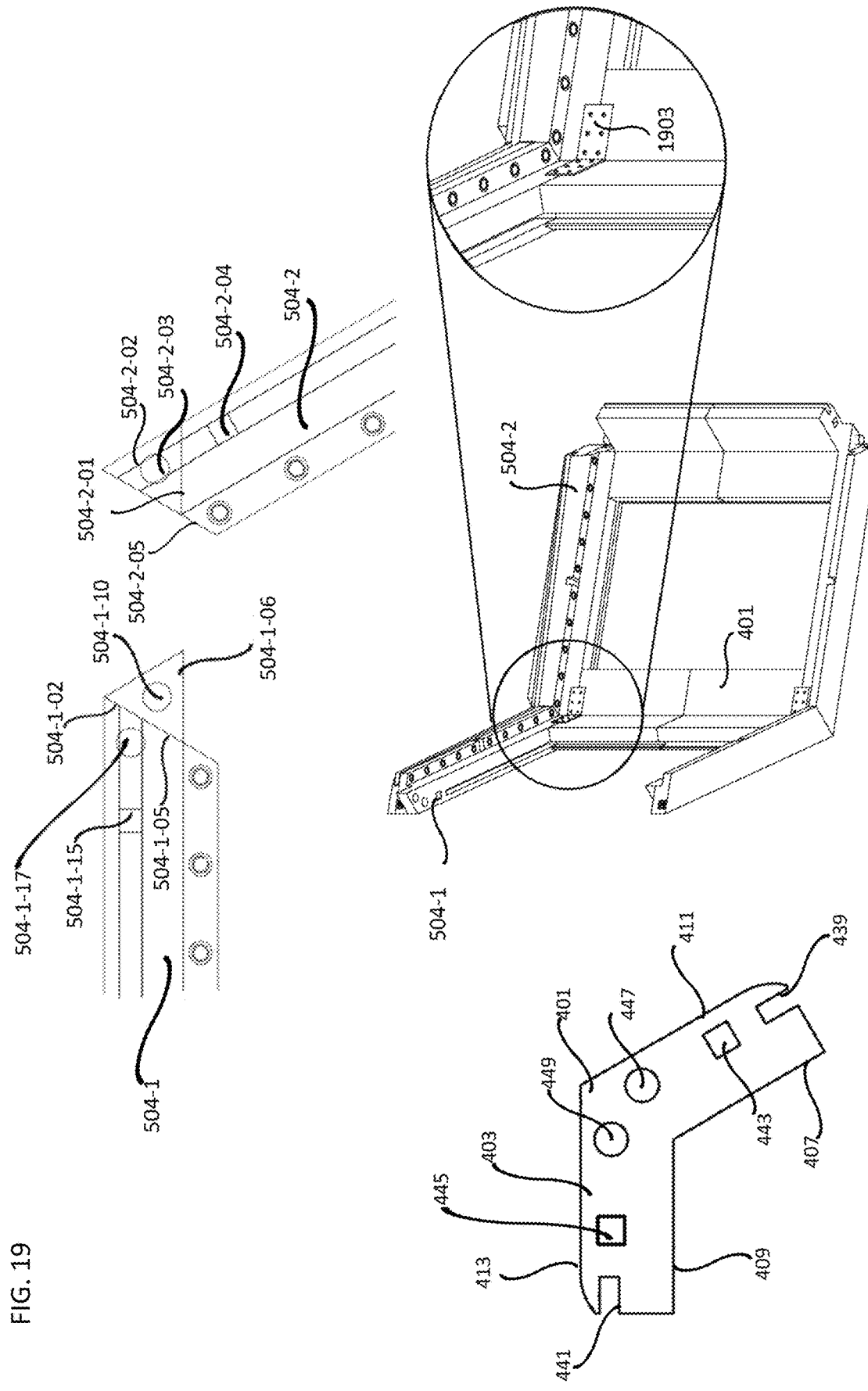
FIG. 19 illustrates a securing member to secure a pillar to lower roof support shell members.

In step 18-01 of FIG. 18, the pillar fastening members and the columns from the set of pillars which were coupled to the base 101, are inserted into lower roof support shell members. With reference to FIGS. 4B and 19, this comprises the following:

For pillar 401, pillar fastening members in the form of dowels 449 and 447 are inserted into their corresponding openings in lower roof support shell members 504-1 and 504-2. Dowel 449 is placed into the opening belonging to pillar connection member 504-1-17, and occupies the space which is part of member 504-1-17. Dowel 447 is inserted into the pillar connection member formed by the aligned pillar insertion receiving members 504-1-10 and 504-2-03.

Column 451 which is protruding from opening 443 is inserted into the space belonging to column connection member 504-1-15, so as to contact outer support beam 505-1. Similarly, column 453 protruding from opening 445 is inserted to occupy the space belonging to column connection member 504-2-04 and enable coupling to outer support beam 505-2.

In step 18-02, pillar 401 is secured to the lower floor support shell members. This comprises:

Coupling the two columns 451 and 453 with outer support beam 505-1 and 505-2 using techniques known to those of skill in the art, such as screws.

As shown in FIG. 19, a securing member such as roof plate 1903 is used to secure the pillar 401 to the lower roof support shell members 504-1 and 504-2; and couple lower roof support shell members 504-1 and 504-2 together.

In step 18-03, the horizontal edge of the panel at the top of the pillar is inserted into the appropriate space on a corresponding lower roof support shell member. For example, with reference to FIGS. 4C and 5C, horizontal edge 115-1-1 is inserted into panel insertion space 504-1-41 of lower roof support shell member 504-1.

In step 18-04, steps 18-01 to 18-03 are repeated for all the pillars.

In step 1105, the subsystems are installed. This step comprises installation of the water distribution subsystem, lighting and towers and one or more of the other subsystems previously listed and described and shown in FIG. 7. The installation of the water distribution subsystem comprises the installation of the lower water return distribution subsystem 810 and upper water return distribution subsystem 820 of FIGS. 8A, 8B and 8C. Once the water distribution subsystems are installed, the towers are screwed into the outlets such as outlet 808 shown in FIG. 8A. In embodiments where the tower is comprised of sections, such as tower 1001 of FIG. 10B, the lowest section such as section 10B-01 is screwed into an outlet. Then the next section, for example section 10B-02, is connected to this lowest section and so on, until the tower assembly is complete as explained previously. The vertical LEDs such as LED 901 of FIG. 9 are also installed. In the embodiments where LEDs are associated with towers, the LEDs are appropriately placed so as to result in the configuration shown in, for example, FIG. 10C.

In step 1106, the airlock door 600 is installed on the side of the enclosure 100 which has the highest point of the roof panel 107-1, as explained previously.

Coupling a Plurality of Enclosures Together

The benefit of the hexagonal shape of the enclosure is fully realized when more than one enclosure is coupled together. FIG. 20A shows side and isometric views of a connection apparatus 2000 to couple two enclosures 2002 and 2004 together.

With reference to the side view of apparatus 2000 shown in FIG. 20A: Apparatus 2000 comprises three (3) sections: side sections 2017 and 2015, and middle section 2011. Side section 2017 comprises a plurality of vertical fastening members 2013 for attachment to lower roof and lower floor support shell members. Side section 2017 also comprises a plurality of horizontal fastening members 2001 for attachment to pillars. Furthermore, side section 2017 comprises attachment member 2009 for attachment to pillars, lower roof and lower floor support shell members. Side section 2019 comprises a plurality of vertical fastening members 2003 for attachment to lower roof and lower floor support shell members. Side section 2019 also comprises a plurality of horizontal fastening members 2005 for attachment to pillars. Furthermore, side section 2015 comprises attachment member 2007 for attachment to pillars, lower roof and lower floor support shell members. Middle section 2011 serves to separate side sections 2017 and 2015 to enable coupling of connection apparatus 2000 to enclosures, as will be described below.

With reference to the isometric view of apparatus 2000 and enclosures 2002 and 2004 shown in FIG. 20A: In FIG. 20A, pillars 2105 and 2119, lower roof support shell member 2123 and lower floor support shell member 2115 belong to enclosure 2002. Pillar 2107 and 2117, lower floor support shell member 2111 and lower roof support shell member 2103 belong to enclosure 2004. Opening 2006 extends through side sections 2017 and 2019 and middle section 2011 of apparatus 2000.

Figure 20B:
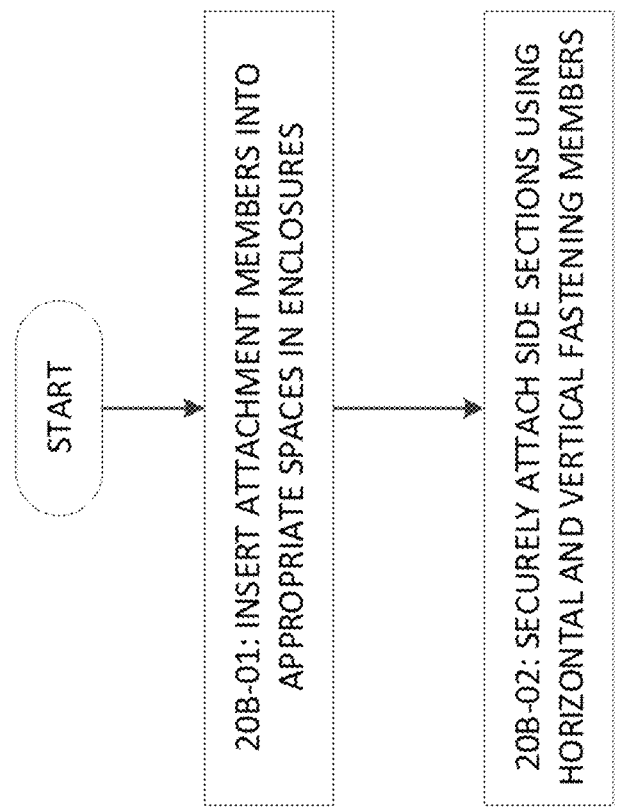
FIG. 20B illustrates a flowchart for connecting two enclosures together using a connection apparatus.

A process to connect the two enclosures together is shown in FIG. 20B. In step 20B-01, the attachment member 2009 is inserted into appropriate spaces for the enclosures:

grooves belonging to the pillars such as groove 2121 of pillar 2119, and panel insertion spaces belonging to the lower roof support shell member 2123 and lower floor support shell members 2115, such as panel insertion space 2125 of lower roof support shell member 2123.

Similar operations are carried out for side section 2015 with regard to enclosure 2004, and using attachment member 2007.

In step 20B-02, the horizontal fastening members and vertical fastening members are used to securely attach the side sections to the respective enclosures. For example, the plurality of vertical fastening members 2013 are used to securely attach side section 2017 to lower roof support shell member 2123 and lower floor support shell member 2115 of enclosure 2002. The plurality of horizontal fastening members 2001 are used to securely attach side section 2017 to pillars 2105 and 2119. Similar operations are carried out for side section 2015 using plurality of vertical fastening members 2003 and plurality of horizontal fastening members 2005 with regard to pillars 2107 and 2117, lower floor support shell member 2111 and lower roof support shell member 2103.

Once this is completed, users can move between enclosures 2002 and 2004 using opening 2006.

Figure 21:
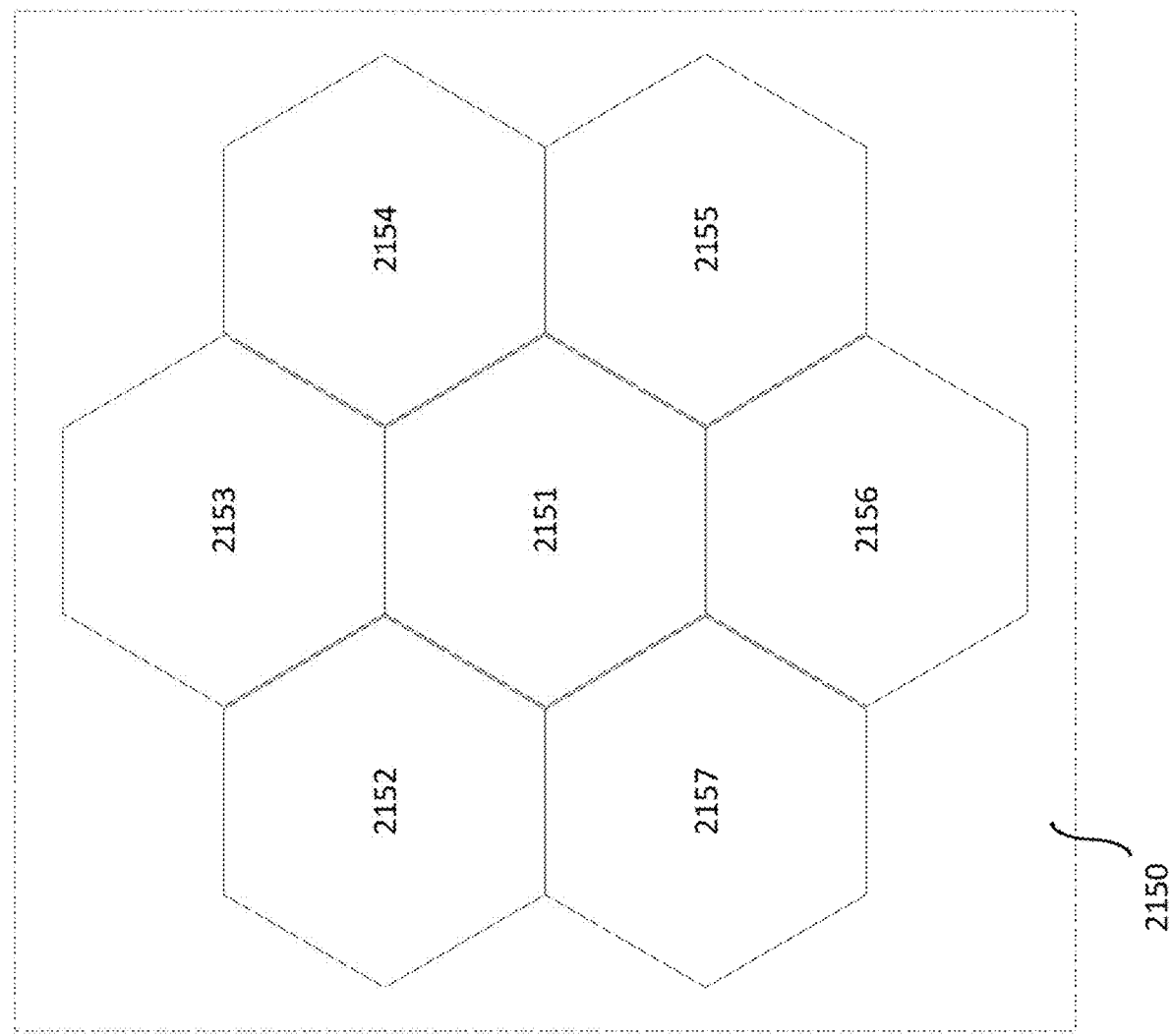
FIG. 21 illustrates a cluster of enclosures in a flower configuration.

In some embodiments, the plurality of enclosures comprises a cluster of enclosures. In some of these embodiments, the cluster comprises a central enclosure with one or more surrounding enclosures. Then the central enclosure is a control center, and the surrounding enclosures are grow units, that is, units where growth of hydroponic crops takes place. FIG. 21 shows an example of a cluster 2150 comprising seven (7) enclosures arranged in a "flower" configuration. Cluster 2150 has central enclosure 2151 and surrounding enclosures 2152-2157. In some of these embodiments, central enclosure 2151 is a control center, and surrounding enclosures 2152-2157 are grow units. Then, in some of these embodiments, at least some part of the subsystems necessary for the operation of surrounding enclosures are located at the central enclosure. With reference to FIG. 7, examples of this are:

HVAC subsystem 702,
Water distribution system 710,
Lighting subsystem 712,
Communication subsystem 714,
Security subsystem 718,
Growth subsystem 719,
Interconnections 720, and
Power supply 722.

Configurations other than the honeycomb configuration are also possible depending on the shape of the space which is to be occupied by the cluster. For example, enclosures can be connected in a V-shape or in a line.

In additional embodiments, central enclosure 2151 comprises a storage unit to store equipment.

Figure 22:
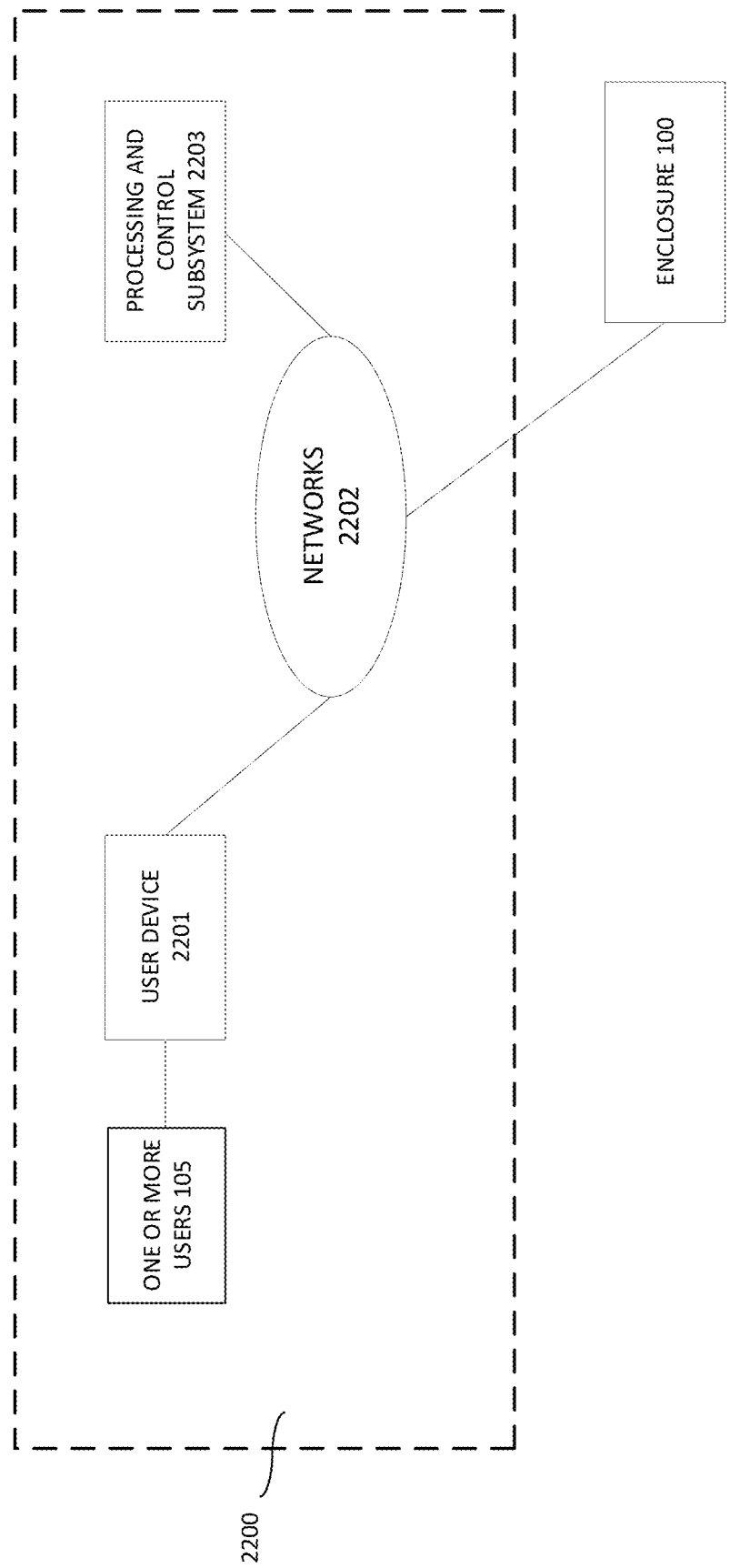
FIG. 22 illustrates a system for monitoring and operating an enclosure or a plurality of enclosures using an enclosure monitoring application.

In some embodiments, the enclosure or plurality of enclosures are monitored and operated using an enclosure monitoring application or "app" running on a user device. An example is shown in system 2200 of FIG. 22. In FIG. 22, user device 2201 is associated with one or more users 105. User device 2201 is coupled to enclosure 100 and processing and control subsystem 2203 via network 2202. Networks 2202 can be implemented using a variety of networking and communications technologies. In some embodiments, networks 2202 are implemented using wired technologies such as Firewire, Universal Serial Bus (USB), Ethernet and optical networks. In some embodiments, networks 1202 are implemented using wireless technologies such as WiFi, BLUETOOTH®, NFC, 3G, 5G, satellite, radio frequency (RF) technologies, and LTE. In some embodiments, networks 2202 comprise at least one public network. In some embodiments, networks 2202 comprise at least one private network. In some embodiments, networks 2202 comprise one or more subnetworks.

Figure 23:
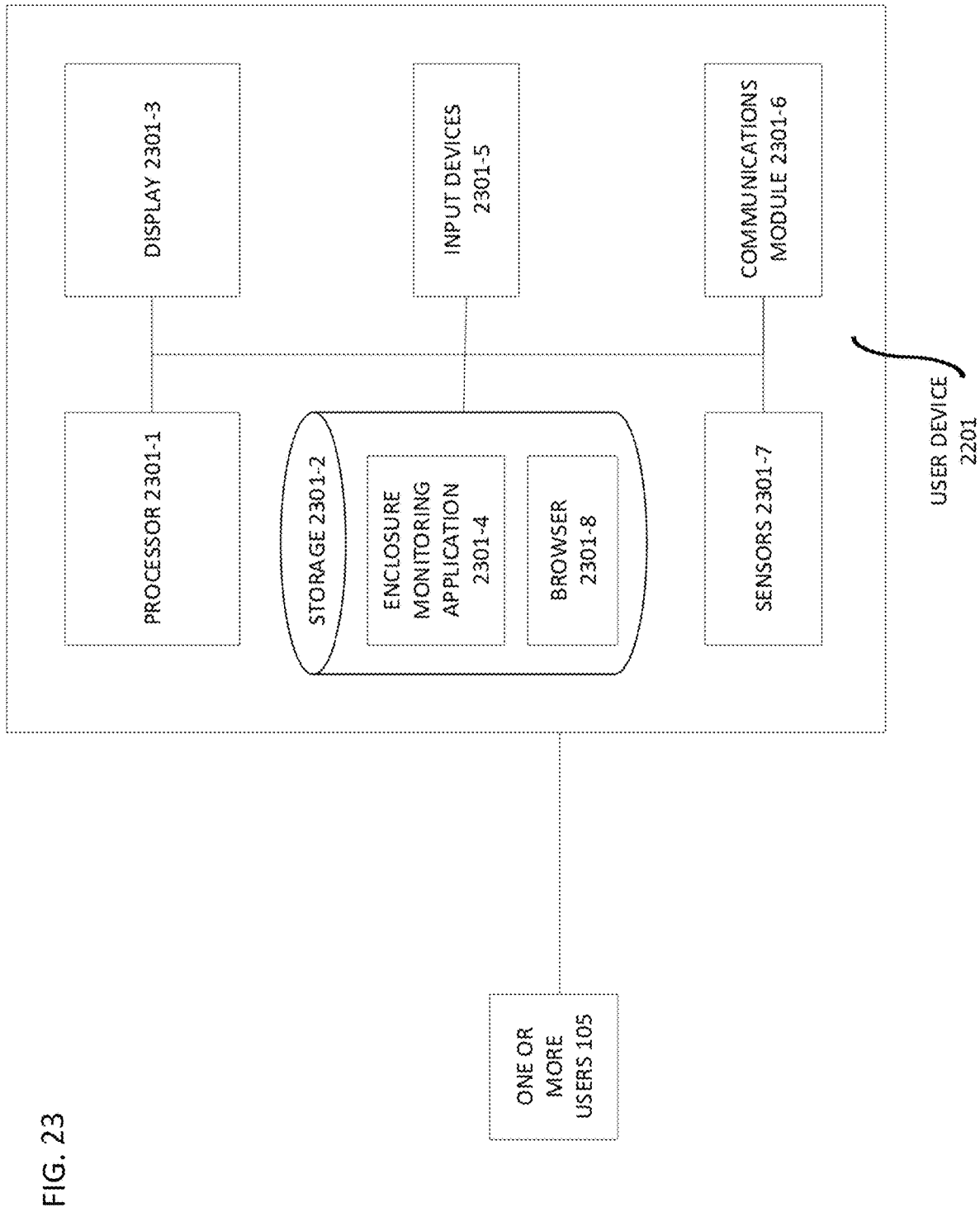
FIG. 23 illustrates an example embodiment of a user device.

User device 2201 is, for example a smartwatch, smartphone, tablet, laptop, or any appropriate computing and network-enabled device. An embodiment of user device 2201 is shown in FIG. 23. Processor 2301-1 performs processing functions and operations necessary for the operation of user device 2301, using data and programs stored in storage 2301-2. An example of such programs are enclosure monitoring application 2301-4 which will be discussed in more detail below, and browser 2301-8. Display 2301-3 performs the function of displaying data and information for user 101. Input devices 2301-5 allow user 101 to enter information. This includes, for example, devices such as a touch screen, mouse, keypad, keyboard, microphone, camera, video camera and so on. In one embodiment, display 2301-3 is a touchscreen which means it is also part of input devices 2301-5. Communications module 2301-6 allows user device 2201 to communicate with devices and networks external to user device 1201. This includes, for example, communications via BLUETOOTH®, Wi-Fi, Near Field Communications (NFC), Radio Frequency Identification (RFID), 3G, Long Term Evolution (LTE), Universal Serial Bus (USB) and other protocols known to those of skill in the art. The components of user device 2201 are coupled to each other as shown in FIG. 23.

Enclosure monitoring application 2301-4 allows user device 2201 to interact with processing and control subsystem 2203 and enclosure 100 over networks 2202 to perform various functions and operations.

In some embodiments, the enclosure monitoring application 2301-4 comprises sensor interface functionality to allow user device 2201 to interact either directly or indirectly with sensors 716. In one embodiment this interaction is performed using, for example, processing and control subsystem 2203. This functionality allows, for example, a user to monitor the previously described growth conditions or parameters using user device 2201 remotely. As explained previously, examples of growth parameters which are tracked and recorded include:

pH,
electrical conductivity,
enclosure interior temperature,
humidity,
water levels and flow rates,
nutrient levels and rates of change,
lighting levels,
$CO_2$ levels,
door open/closed,
power consumption,
solar conditions, wind conditions,
water temperature,
battery level, and
generator fuel level.

In addition to the sensor interface functionality, the enclosure monitoring application 2301-4 enables the user to monitor and operate subsystems. Examples of subsystems which can be monitored and operated include:

HVAC subsystem 702: The enclosure monitoring application enables monitoring and operation of the devices and systems which are part of HVAC subsystem 702. For example, using the app, heaters and AC units can be controlled to set the temperature accordingly. Vents can be opened or closed to change, for example, the $CO_2$ levels.

Water distribution subsystem 710: The app allows monitoring and operation of the devices and systems which form part of water distribution subsystem 710. For example, water pumps can be turned on and off Lighting subsystem 712: The app allows monitoring and operation of the devices and systems which form part of lighting subsystem 612. For example, using the app, lights can be turned on and off or brightened and dimmed in different areas.

Security subsystem 718: The app allows for monitoring and operation of the devices and systems which are part of security subsystem 718. For example, users can use security cameras to view the interior and exterior of the enclosure.

Growth subsystem 719: The app allows for monitoring and operations of the devices and systems which are part of growth subsystem 719. For example, users can control the rate at which a conveyor belt operates.

Power supply 722: The app allows for monitoring and operation of the devices and systems which are part of power supply 722.

In addition, the enclosure monitoring application 2301-4 comprises a user interface to perform the sensor interface and subsystem operation and monitoring functionalities. In one embodiment, the user interface is displayed on display 2301-3 of user device 2201. Then, a user can enter commands for the user interface via input devices 2301-5 of user device 2201, such as via a mobile device touchscreen, or a mouse, or a keyboard, or a microphone.

Browser 2301-8 is used to interface with the World Wide Web. As will be discussed below, in some embodiments, browser 2301-8 communicates with a website interface to processing and control subsystem 2203.

In other embodiments, users are able to share data with each other. Each user is able to input what each tower in is growing and through the sharing portion, other users will be able to see what other habitats are growing and for what cost.

Processing and control subsystem 2203 performs several different functions such as collecting data from sensors 716, receiving commands from user device 2201 and supplying data collected from sensors 716 in response to commands received, and processing data collected from sensors 716.

Figure 24:
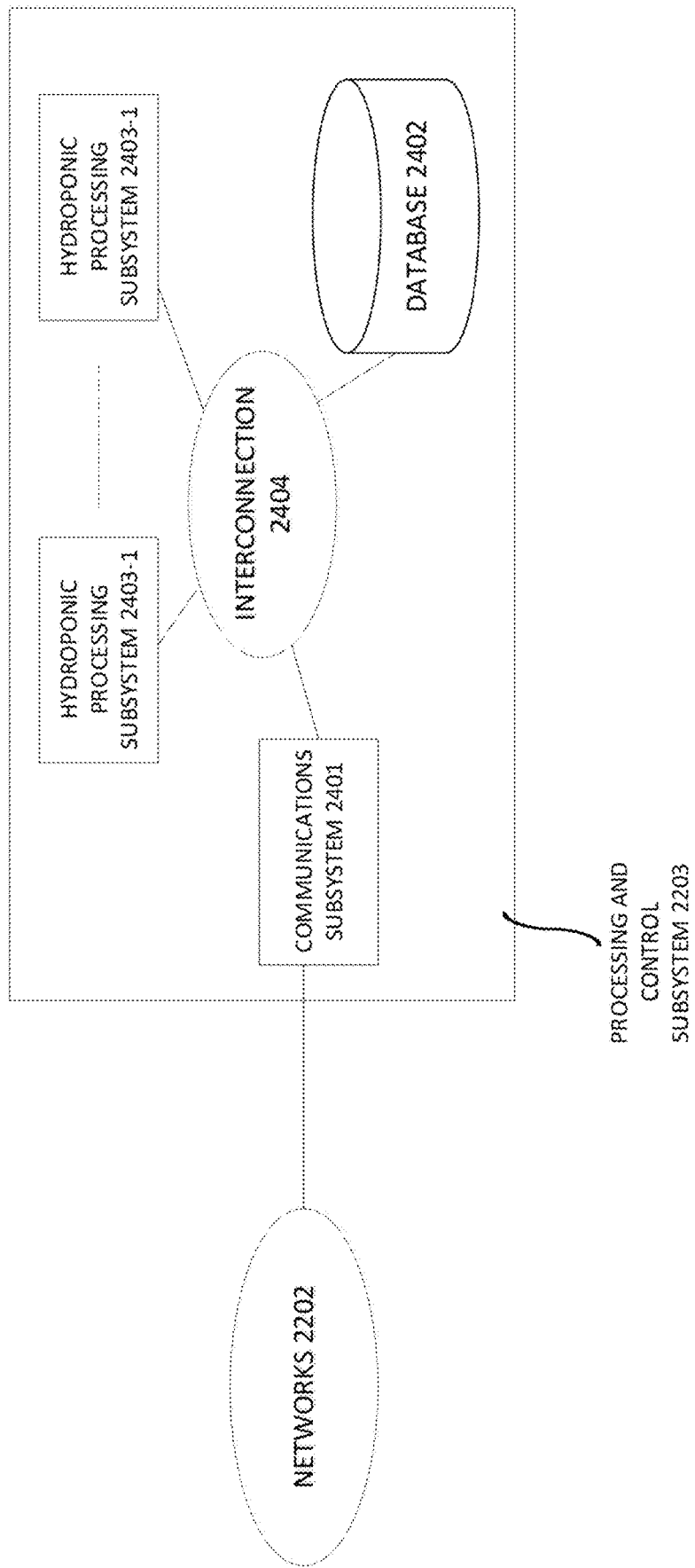
FIG. 24 illustrates an example embodiment of a processing and control subsystem.

Processing and control subsystem 2203 is described in more detail in FIG. 24. In FIG. 24, communications subsystem 2401 is coupled to networks 2202. Communication subsystem 2401 receives information from, and transmits information to networks 2202.

Database 2402 stores information and data for use by processing and control subsystem 2203. This includes, for example:

data collected from sensors 716, one or more algorithms and programs necessary to perform processing of received data, and other data as needed, such as intermediate and final results from carrying out processing operations.

In some embodiments, database 2402 further comprises a database server. The database server receives one or more commands from, for example, hydroponic processing subsystem 2403-1 to 2403-N and communications subsystem 2401 and translates these commands into appropriate database language commands to retrieve and store data into database 1302. In some embodiments, database 2402 is implemented using one or more database languages known to those of skill in the art, including, for example, Structured Query Language (SQL). In a further embodiment, database 2402 stores data for a plurality of users. Then, there may be a need to keep the set of data related to each user separate from the data relating to the other users. In some embodiments, database 2402 is partitioned so that data related to each user is separate from the other users. In some embodiments, each user has an account with a login and a password or other appropriate security measures to ensure that they are only able to access their data, and unauthorized access of their data is prohibited. In further embodiments, when data is entered into database 2402, associated metadata is added so as to make it more easily searchable. In a further embodiment, the associated metadata comprises one or more tags. In yet another embodiment, database 2402 presents an interface to enable the entering of search queries. In some embodiments, the data stored within database 2402 is encrypted for security reasons. In further embodiments, other privacy-enhancing data security techniques are employed to protect database 2402.

Hydroponic processing subsystems 2403-1 to 2403-N perform processing, analysis and control within processing and control subsystem 2203 using one or more algorithms and programs residing on database 2402. These algorithms and programs are stored in, for example, database 2402 as explained above, or within hydroponic processing subsystems 2403-1 to 2403-N.

Examples of processing performed by hydroponic processing subsystems 2403-1 to 2403-N include:

Implementations of algorithms used in processing of the data received from sensors 716, Performing analytics based on crops grown within enclosure 100 to provide one or more users with feedback, and Providing data to one or more users 105 to enable one or more users to visualize results on, for example, user device 2201.

In some embodiments, hydroponic processing subsystems 2403-1 to 2403-N implement artificial intelligence (AI), machine learning (ML) and deep learning algorithms to facilitate optimization of growth parameters, energy consumption, water consumption, and improve overall growth of hydroponic crops. This data allows for users such as farmers to learn how to better utilize the enclosure or plurality of enclosures to improve on current practices. In further embodiments, hydroponic processing subsystems 2403-1 to 2403-N implement big data processing techniques and statistical processing techniques.

Interconnection 2404 connects the various components of processing and control subsystem 2203 to each other. In one embodiment, interconnection 2404 is implemented using, for example, network technologies known to those in the art. These include, for example, wireless networks, wired networks, Ethernet networks, local area networks, metropolitan area networks and optical networks. In one embodiment, interconnection 2404 comprises one or more subnetworks. In another embodiment, interconnection 2404 comprises other technologies to connect multiple components to each other including, for example, buses, coaxial cables, USB connections and so on.

Various implementations are possible for processing and control subsystem 2203 and its components. In some embodiments, processing and control subsystem 2203 is implemented using a cloud-based approach. In other embodiments, processing and control subsystem 2203 is implemented across one or more facilities, where each of the components are located in different facilities and interconnection 2404 is then a network-based connection. In further embodiments, processing and control subsystem 2203 is implemented using one or more servers or computers. In other embodiments, processing and control subsystem 2203 is implemented in software. In other embodiments, processing and control subsystem 2203 is implemented using a combination of software and hardware. In further embodiments, processing and control subsystem 2203 is implemented via a third party hosting operation. In some of the embodiments described above where the plurality of enclosures comprises a cluster of enclosures with a central enclosure being a control center and surrounding enclosures being grow units, at least some part of processing and control subsystem 2203 is implemented within the central enclosure.

In other embodiments, a website is used to interact with the enclosure 100 and processing and control subsystem 2203. One or more users 105 can interact with website using, for example, browser program 2301-8 running on user device 2201.

In additional embodiments, a digital marketplace to allow users to sell produce that they produce via each enclosure or each plurality of enclosures is created. Such a marketplace would provide a sustainable solution that also allows for community bonding and social enterprise/digital farmer's market. The digital marketplace allows users to buy, sell and trade their harvest via the enclosure monitoring application 2301-4 or by using the website in conjunction with browser program 2301-8. In some embodiments, growers are able to post their production details, and time of harvest online. Then buyers will be able to view this information and place orders for the amount they want to purchase. At harvest time the app will notify the buyer that their purchase is either ready for pick up, or delivery via existing methods. Buyers also comprise, for example, local grocery stores.

While the above describes the use of the enclosure for hydroponics, one of skill in the art would know that there are other possible uses for such an enclosure. For example, it could be used for temporary housing, quarantining, storage and other purposes as necessary.

It would also be understood by one of skill in the art that, the modular nature of the enclosure detailed above means that it can be provided or sold as a kit for assembly by either one or more users 105 or a third party such as a contractor. The connection apparatus detailed above and in FIG. 20A can also be provided or sold for use by either one or more users 105 or a third party such as a contractor.

Although the processes described above including those with reference to the foregoing flow charts have been described separately, one of skill in the art would understand that any two or more of the processes disclosed herein can be combined in any combination.

Any of the methods, algorithms, implementations, or procedures described herein can include machine-readable instructions for execution by: (a) a processor, (b) a controller, and/or (c) any other suitable processing device.

While particular implementations and applications of the present disclosure have been illustrated and described, it is to be understood that the present disclosure is not limited to the precise construction and compositions disclosed herein and that various modifications, changes, and variations can be apparent from the foregoing descriptions without departing from the spirit and scope of an invention as defined in the appended claims.

What is claimed is:

1. A modular enclosure, wherein:
the modular enclosure is a hydroponic enclosure, further wherein:
the modular enclosure comprises:
a hexagonally shaped base, wherein:
the base comprises a hexagonally shaped lower floor support shell, further wherein:
the lower floor support shell comprises one or more lower floor support shell members,
each of the one or more lower floor support shell members comprise a first and a second extrusion, wherein:
each of the first and second extrusion comprises a pillar insertion receiving member, and
the first extrusion is positioned higher relative to the second extrusion,
the lower floor support shell members comprise a first lower floor support shell member coupled to a second lower floor support shell member, and
the pillar insertion receiving member corresponding to the first extrusion corresponding to the first lower floor support shell member is vertically aligned with the pillar insertion receiving member corresponding to the second extrusion corresponding to the second lower floor support shell member,
a growth subsystem comprising a tower having a top and a bottom, further wherein:
the tower comprises a plurality of pods, and
each of the plurality of pods holds a plant, and
a set of pillars attached to the hexagonally shaped base and to a hexagonally shaped roof, wherein the set of pillars support the roof.

2. The enclosure of claim 1, wherein the modular enclosure comprises:
a water distribution subsystem further comprising:
an upper water return distribution subsystem to feed water to the top of the tower, and
a lower water return distribution subsystem coupled to the bottom of the tower.

3. The enclosure of claim 2, wherein the growth subsystem comprises a nutrient delivery system.

4. The enclosure of claim 1, wherein the modular enclosure comprises:
a communications subsystem; and
one or more subsystems other than the growth subsystem and the communications subsystem, further wherein:
the communications subsystem is communicatively coupled to a user device via a network,
the other one or more subsystems and the growth subsystem are communicatively coupled to the communications subsystem, and
the other one or more subsystems and the growth subsystem are monitored and operated by an enclosure monitoring application running on the user device.

5. The enclosure of claim 4, wherein the other one or more subsystems comprise one or more sensors.

6. The enclosure of claim 5, wherein:
a processing and control subsystem is communicatively coupled to the network; and
the processing and control subsystem:
collects data from the one or more sensors; and
processes the collected data.

7. The enclosure of claim 6, wherein:
the processing and control subsystem comprises a hydroponic processing subsystem; and
the hydroponic processing subsystem processes the collected data using one of:
a machine learning algorithm,
an artificial intelligence algorithm, and
a deep learning algorithm.

8. The enclosure of claim 4, wherein:
the enclosure monitoring application allows a user associated with the user device to perform one of buying, selling or trading produce harvested from the enclosure via a digital marketplace.

9. The enclosure of claim 2, wherein:
the lower water return distribution subsystem comprises a return water pipe;
the return water pipe is coupled to the bottom of the tower; and
the return water pipe comprises segments coupled to each other to form a hexagon shape.

10. The enclosure of claim 2, wherein:
the lower water return distribution subsystem comprises a water tank;
the water tank is coupled to the upper water distribution subsystem via a pipe; and
the water tank comprises a sump pump to distribute water to the upper water distribution subsystem via the pipe.

11. A modular enclosure, wherein:
the modular enclosure is a hydroponic enclosure, further wherein:
the modular enclosure comprises:
a hexagonally shaped base,
a growth subsystem comprising a tower having a top and a bottom, further wherein:
the tower comprises a plurality of pods, and
each of the plurality of pods holds a plant, and
a set of pillars attached to the hexagonally shaped base and to a hexagonally shaped roof, wherein:
the set of pillars support the roof,
the roof comprises a hexagonally shaped lower roof support shell,
the lower roof support shell comprises one or more lower roof support shell members, and
each of the one or more lower roof support shell members comprise a first and a second extrusion, wherein:
each of the first and second extrusion comprises a pillar insertion receiving member, and
the first extrusion is positioned higher relative to the second extrusion.

12. The enclosure of claim 11, wherein:
the lower roof support shell members comprise a first lower roof support shell member coupled to a second lower roof support shell member; and
the pillar insertion receiving member corresponding to the first extrusion corresponding to the first lower roof support shell member is vertically aligned with the pillar insertion receiving member corresponding to the second extrusion corresponding to the second lower roof support shell member.

13. The enclosure of claim 11, wherein the base comprises a hexagonally shaped floor.

14. The enclosure of claim 11, wherein the modular enclosure comprises:
a water distribution subsystem further comprising:
an upper water return distribution subsystem to feed water to the top of the tower, and
a lower water return distribution subsystem coupled to the bottom of the tower.

15. The enclosure of claim 11, wherein the growth subsystem comprises a nutrient delivery system.

16. The enclosure of claim 11, wherein the modular enclosure comprises:
a communications subsystem; and
one or more subsystems other than the growth subsystem and the communications subsystem, further wherein:
the communications subsystem is communicatively coupled to a user device via a network, and
the other one or more subsystems and the growth subsystem are communicatively coupled to the communications subsystem.

17. The enclosure of claim 16, wherein at least one of the other one or more subsystems is monitored and operated by an enclosure monitoring application running on the user device.

18. The enclosure of claim 16, wherein the growth subsystem is monitored and operated by an enclosure monitoring application running on the user device.

19. The enclosure of claim 16, wherein:
the other one or more subsystems comprise one or more sensors;
a processing and control subsystem comprising a hydroponic processing subsystem is communicatively coupled to the network;
the processing and control subsystem collects data from the one or more sensors; and
the hydroponic processing subsystem processes the collected data using one of:
a machine learning algorithm,
an artificial intelligence algorithm, and
a deep learning algorithm.

20. The enclosure of claim 16, wherein the other one or more subsystems comprise at least one of:
one or more sensors,
a heating, ventilation and air conditioning subsystem,
a water distribution subsystem,
a lighting subsystem,
a security subsystem,
a lighting subsystem, and
a power supply.

* * * * *